United States Patent
Babaei et al.

(10) Patent No.: US 11,330,627 B2
(45) Date of Patent: *May 10, 2022

(54) MULTI-CARRIER DETECTION IN A WIRELESS NETWORK

(71) Applicant: Comcast Cable Communications, LLC, Philadelphia, PA (US)

(72) Inventors: Alireza Babaei, Fairfax, VA (US); Esmael Hejazi Dinan, McLean, VA (US)

(73) Assignee: Comcast Cable Communications, LLC, Philadelphia, PA (US)

( * ) Notice: Subject to any disclaimer, the term of this patent is extended or adjusted under 35 U.S.C. 154(b) by 12 days.

This patent is subject to a terminal disclaimer.

(21) Appl. No.: 16/922,783

(22) Filed: Jul. 7, 2020

(65) Prior Publication Data

US 2020/0337087 A1 Oct. 22, 2020

Related U.S. Application Data

(63) Continuation of application No. 16/378,165, filed on Apr. 8, 2019, now Pat. No. 10,708,951, which is a continuation of application No. 15/425,992, filed on Feb. 6, 2017, now Pat. No. 10,257,855.

(60) Provisional application No. 62/291,399, filed on Feb. 4, 2016, provisional application No. 62/291,387, filed on Feb. 4, 2016.

(51) Int. Cl.
*H04W 4/00* (2018.01)
*H04W 74/08* (2009.01)
*H04W 72/12* (2009.01)
*H04W 72/14* (2009.01)

(Continued)

(52) U.S. Cl.
CPC ... *H04W 74/0808* (2013.01); *H04W 72/1289* (2013.01); *H04W 72/14* (2013.01); *H04W 74/006* (2013.01); *H04W 74/0891* (2013.01); *H04W 88/10* (2013.01)

(58) Field of Classification Search
None
See application file for complete search history.

(56) References Cited

U.S. PATENT DOCUMENTS 9,319,194 B2  4/2016  Dinan
9,736,795 B2  8/2017  Dinan
(Continued)

FOREIGN PATENT DOCUMENTS

| WO | 2013/179590 A1 | 12/2013 |
| WO | 2016157797 A1 | 10/2016 |
| WO | 2017030487 A1 | 2/2017 |

OTHER PUBLICATIONS

3GPP TR 36.889 V1.0.1 (Jun. 2015), Technical Report, 3rd Generation Partnership Project; Technical Specification Group Radio Access Network; Study on Licensed-Assisted Access to Unlicensed Spectrum; (Release 13).

(Continued)

*Primary Examiner* — Clemence S Han
(74) *Attorney, Agent, or Firm* — Banner & Witcoff, Ltd.

(57) ABSTRACT

Methods, apparatuses, and systems are described for wireless communications. A wireless device may perform listen before talk (LBT) procedures for licensed assisted access (LAA) cells. The LBT procedures may use different monitoring periods. The wireless device may transmit transport blocks (TBs) via the LAA cells.

58 Claims, 22 Drawing Sheets

(51) Int. Cl.
*H04W 74/00* (2009.01)
*H04W 88/10* (2009.01)

(56) References Cited

U.S. PATENT DOCUMENTS

| | | | |
|---|---|---|---|
| 9,781,712 B2 | 10/2017 | Nory et al. | |
| 9,872,336 B2 | 1/2018 | Dinan | |
| 9,894,681 B2 | 2/2018 | Dinan | |
| 9,900,836 B2* | 2/2018 | Axen | H04W 76/15 |
| 10,200,992 B2 | 2/2019 | Dinan | |
| 10,257,855 B2* | 4/2019 | Babaei | H04W 74/006 |
| 10,708,951 B2* | 7/2020 | Babaei | H04W 74/006 |
| 2011/0134774 A1 | 6/2011 | Pelletier et al. | |
| 2011/0243016 A1 | 10/2011 | Zhang et al. | |
| 2011/0268029 A1 | 11/2011 | Tseng | |
| 2012/0069802 A1 | 3/2012 | Chen et al. | |
| 2012/0082088 A1 | 4/2012 | Dalsgaard et al. | |
| 2012/0182879 A1 | 7/2012 | Tamura et al. | |
| 2012/0213163 A1 | 8/2012 | Lee et al. | |
| 2012/0257570 A1 | 10/2012 | Jang et al. | |
| 2012/0329461 A1 | 12/2012 | Teyeb et al. | |
| 2013/0010619 A1 | 1/2013 | Fong et al. | |
| 2013/0028198 A1 | 1/2013 | Yamada | |
| 2013/0094392 A1 | 4/2013 | Kim et al. | |
| 2013/0114398 A1 | 5/2013 | Wang | |
| 2013/0188612 A1 | 7/2013 | Dinan | |
| 2013/0195057 A1 | 8/2013 | Dinan | |
| 2013/0208587 A1 | 8/2013 | Bala et al. | |
| 2013/0215848 A1 | 8/2013 | Kato et al. | |
| 2013/0235768 A1 | 9/2013 | Earnshaw et al. | |
| 2013/0272233 A1 | 10/2013 | Dinan | |
| 2013/0279433 A1 | 10/2013 | Dinan | |
| 2013/0301446 A1 | 11/2013 | Chen et al. | |
| 2014/0016593 A1 | 1/2014 | Park et al. | |
| 2014/0036664 A1 | 2/2014 | Han et al. | |
| 2014/0050113 A1 | 2/2014 | Rosa et al. | |
| 2014/0056220 A1 | 2/2014 | Poitau et al. | |
| 2014/0161117 A1 | 6/2014 | Sebire et al. | |
| 2014/0269595 A1 | 9/2014 | Lee et al. | |
| 2015/0003418 A1 | 1/2015 | Rosa et al. | |
| 2015/0016350 A1 | 1/2015 | Moulsley et al. | |
| 2015/0036614 A1 | 2/2015 | Lee et al. | |
| 2015/0078286 A1 | 3/2015 | Kim et al. | |
| 2015/0087315 A1* | 3/2015 | Lu | H04L 5/0098 455/438 |
| 2015/0087316 A1* | 3/2015 | Bostrom | H04L 5/001 455/438 |
| 2015/0117342 A1 | 4/2015 | Loehr et al. | |
| 2015/0124670 A1 | 5/2015 | Park | |
| 2015/0146588 A1 | 5/2015 | Park | |
| 2015/0181453 A1 | 6/2015 | Chen et al. | |
| 2015/0181590 A1 | 6/2015 | Park | |
| 2015/0189574 A1 | 7/2015 | Ng et al. | |
| 2015/0215079 A1 | 7/2015 | Park | |
| 2015/0215977 A1 | 7/2015 | Yamazaki | |
| 2015/0223213 A1 | 8/2015 | Moon et al. | |
| 2015/0245219 A1 | 8/2015 | Wei | |
| 2015/0245307 A1 | 8/2015 | Chen et al. | |
| 2015/0256303 A1 | 9/2015 | Belghoul et al. | |
| 2015/0271811 A1 | 9/2015 | Kim et al. | |
| 2015/0289179 A1 | 10/2015 | Liu et al. | |
| 2015/0312930 A1 | 10/2015 | Han et al. | |
| 2016/0044617 A1 | 2/2016 | Vajapeyam et al. | |
| 2016/0044655 A1 | 2/2016 | Park et al. | |
| 2016/0044737 A1 | 2/2016 | Kwon | |
| 2016/0066284 A1 | 3/2016 | Kwon et al. | |
| 2016/0080126 A1 | 3/2016 | Dinan | |
| 2016/0095114 A1 | 3/2016 | Kim et al. | |
| 2016/0135148 A1 | 5/2016 | Novlan et al. | |
| 2016/0143014 A1* | 5/2016 | Mukherjee | H04L 5/0039 370/330 |
| 2016/0150485 A1 | 5/2016 | Yi et al. | |
| 2016/0174247 A1 | 6/2016 | Ruiz Delgado et al. | |
| 2016/0192388 A1 | 6/2016 | Ekpenyong et al. | |
| 2016/0204905 A1 | 7/2016 | Lee et al. | |
| 2016/0205681 A1 | 7/2016 | Kim et al. | |
| 2016/0227417 A1 | 8/2016 | Yerramalli et al. | |
| 2016/0227428 A1 | 8/2016 | Novlan et al. | |
| 2016/0227541 A1 | 8/2016 | Damnjanovic et al. | |
| 2016/0242153 A1 | 8/2016 | Chen et al. | |
| 2016/0262118 A1 | 9/2016 | Kim et al. | |
| 2016/0277987 A1 | 9/2016 | Chen et al. | |
| 2016/0278050 A1 | 9/2016 | Nory et al. | |
| 2016/0285716 A1 | 9/2016 | Pelletier et al. | |
| 2016/0302177 A1 | 10/2016 | Kwon et al. | |
| 2016/0302228 A1 | 10/2016 | Kazmi et al. | |
| 2016/0337112 A1 | 11/2016 | Suzuki et al. | |
| 2016/0345206 A1 | 11/2016 | Yerramalli et al. | |
| 2016/0365959 A1 | 12/2016 | Dinan | |
| 2016/0366675 A1 | 12/2016 | Dinan | |
| 2016/0366681 A1 | 12/2016 | Dinan | |
| 2016/0374082 A1 | 12/2016 | Nguyen et al. | |
| 2016/0381681 A1 | 12/2016 | Nogami et al. | |
| 2017/0013469 A1 | 1/2017 | Larsson et al. | |
| 2017/0041059 A1 | 2/2017 | Yi et al. | |
| 2017/0041805 A1 | 2/2017 | Chandrasekhar et al. | |
| 2017/0041905 A1 | 2/2017 | Chen et al. | |
| 2017/0048718 A1 | 2/2017 | Kim et al. | |
| 2017/0048880 A1 | 2/2017 | Anderson et al. | |
| 2017/0055242 A1 | 2/2017 | Kusashima et al. | |
| 2017/0055263 A1 | 2/2017 | Tomeba et al. | |
| 2017/0055293 A1 | 2/2017 | Yang et al. | |
| 2017/0086172 A1 | 3/2017 | Dinan | |
| 2017/0086194 A1* | 3/2017 | Tavildar | H04L 67/104 |
| 2017/0094681 A1* | 3/2017 | Takeda | H04L 5/2613 |
| 2017/0099633 A1* | 4/2017 | Axen | H04L 5/0098 |
| 2017/0117997 A1 | 4/2017 | Park et al. | |
| 2017/0118658 A1 | 4/2017 | Hwang et al. | |
| 2017/0127414 A1 | 5/2017 | Yi et al. | |
| 2017/0135023 A1 | 5/2017 | Jung et al. | |
| 2017/0135127 A1 | 5/2017 | Nogami et al. | |
| 2017/0164361 A1* | 6/2017 | Park | H04W 72/0446 |
| 2017/0181143 A1* | 6/2017 | Kim | H04W 72/14 |
| 2017/0195099 A1 | 7/2017 | Kahtava et al. | |
| 2017/0195935 A1 | 7/2017 | Xu et al. | |
| 2017/0196020 A1 | 7/2017 | Mukherjee et al. | |
| 2017/0201308 A1 | 7/2017 | Park et al. | |
| 2017/0201985 A1 | 7/2017 | Wang | |
| 2017/0202022 A1* | 7/2017 | Chendamarai Kannan | H04W 72/14 |
| 2017/0223677 A1 | 8/2017 | Dinan et al. | |
| 2017/0251454 A1 | 8/2017 | Yang et al. | |
| 2017/0265225 A1* | 9/2017 | Takeda | H04W 74/0808 |
| 2017/0280430 A1 | 9/2017 | Yin et al. | |
| 2017/0311206 A1 | 10/2017 | Ryoo et al. | |
| 2017/0311322 A1 | 10/2017 | Kim et al. | |
| 2017/0325258 A1 | 11/2017 | Nogami et al. | |
| 2017/0339580 A1 | 11/2017 | Martin et al. | |
| 2017/0339607 A1* | 11/2017 | Lu | H04W 36/0061 |
| 2017/0339717 A1 | 11/2017 | Futaki | |
| 2017/0339721 A1* | 11/2017 | Mukherjee | H04W 74/0816 |
| 2017/0353912 A1 | 12/2017 | Einhaus et al. | |
| 2017/0353965 A1 | 12/2017 | Zhang | |
| 2017/0373914 A1* | 12/2017 | Harada | H04J 11/0069 |
| 2018/0007708 A1* | 1/2018 | Ke | H04L 27/0006 |
| 2018/0014291 A1 | 1/2018 | Takeda et al. | |
| 2018/0041989 A1 | 2/2018 | Shimezawa et al. | |
| 2018/0048498 A1 | 2/2018 | Stern-Berkowitz et al. | |
| 2018/0049221 A1* | 2/2018 | Park | H04W 74/0808 |
| 2018/0049241 A1* | 2/2018 | Heo | H04L 27/2626 |
| 2018/0049271 A1 | 2/2018 | Bagheri et al. | |
| 2018/0077581 A1* | 3/2018 | Ahn | H04W 74/08 |
| 2018/0077688 A1 | 3/2018 | Yi et al. | |
| 2018/0092073 A1 | 3/2018 | Nogami et al. | |
| 2018/0092118 A1 | 3/2018 | Kim et al. | |
| 2018/0098334 A1 | 4/2018 | Tie et al. | |
| 2018/0110045 A1 | 4/2018 | You et al. | |
| 2018/0115981 A1 | 4/2018 | Kim et al. | |
| 2018/0139701 A1 | 5/2018 | Wang et al. | |
| 2018/0139767 A1 | 5/2018 | Lee et al. | |
| 2018/0220303 A1 | 8/2018 | Futaki | |
| 2018/0242264 A1 | 8/2018 | Pelletier et al. | |
| 2018/0242357 A1 | 8/2018 | Khirallah et al. | |
| 2018/0288826 A1 | 10/2018 | Chiba | |

(56) References Cited

U.S. PATENT DOCUMENTS

| | | |
|---|---|---|
| 2018/0295609 A1 | 10/2018 | Shimezawa et al. |
| 2018/0324604 A1 | 11/2018 | Yang et al. |
| 2019/0029047 A1 | 1/2019 | Zhu et al. |
| 2019/0289635 A1 | 9/2019 | Wang et al. |

OTHER PUBLICATIONS

R1-143396, 3GPP TSG RAN WG1 Meeting #78, Dresden, Germany, Aug. 18-22, 2014, Source: Ericsson, Title: Summary of email discussion [77-08]:Small cell on/off transition lime reduction.

R1-152869, 3GPP TSG RAN WG1 #81, Fukuoka, Japan, May 25-29, 2015, Source: Samsung, Title: Discussion on carrier selection for LAA.

R1-153230, 3GPP TSG RAN WG1 Meeting #81, Fukuoka, Japan, May 25-29, 2015, Source: Huawei, HiSilicon, Title: Design of fast carrier switching for LAA.

R1-153646, 3GPP TSG RAN WG1 Meeting #81, Fukuoka, Japan, May 25-29, 2015, Source: Huawei, HiSilicon, Title: Draft text proposal on fast carrier selection/switching for LAA.

R1-153788, 3GPP TSG RAN WG1 Meeting #82, Beijing, China, Aug. 24-28, 2015, Source: Huawei, HiSilicon, Title: Support for UE synchronization on a LAA SCell.

R1-154020, 3GPP TSG RAN WG1 Meeting #82, Beijing, China, Aug. 24-28, 2015, Source: Panasonic, Title: AGC and lime/frequency synchronization for transmission burst.

R1-154149, 3GPP TSG RAN WG1 #82, Beijing, China, Aug. 24-28, 2015, Source: Samsung, Title: LAA fast carrier selection.

R1-154267, 3GPP TSG RAN WG1 meeting #82, Beijing, China, Aug. 24-28, 2015, Source: LG Electronics, Title: DL synchronization and AGC issues in LAA.

R1-154324, 3GPP TSG RAN WG1 Meeting #82, Beijing, China, Aug. 24-28, 2015, Source: Huawei, HiSilicon, Title: Support for carrier selection/switching in CA enhancement.

R1-154326, 3GPP TSG RAN WG1 Meeting #82, Beijing, China, Aug. 24-28, 2015, Source: Huawei, HiSilicon, Title: L1 indication for UE support of fast carrier selection.

R1-154347, 3GPP TSG RAN WG1 Meeting #82, Beijing, China, Aug. 24-28, 2015, Source: Huawei, HiSilicon, Title: Carrier configuration for UE support of carrier selection.

R1-154593, 3GPP TSG RAN WG1#82, Aug. 24-28, 2015, Beijing, China, Source: Motorola Mobility, Title: Activation/Deactivation procedures for LAA SCells.

R1-154635, 3GPP TSG RAN WG1 Meeting #82, Beijing, China, Aug. 24-28, 2015, Source: Ericsson, Title: Carrier Selection for LAA.

R1-154974, 3GPP TSG RAN WG1 Meeting #82, Beijing, China, Aug. 24-28, 2015, Title: WF on LAA cell selection and synchronization.

R2-152226, 3GPP TSG-RAN WG2#90, Fukuoka, Japan, May 25-29, 2015, Source: Samsung Title: LAA SCell Activation and Deactivation.

R2-152347, 3GPP TSG-RAN WG2 meeting #90, Fukuoka, Japan, May 25-29, 2015, Source: ZTE, Title: Initial Thoughts on (De)activation for LAA SCell.

R2-152362, revision of R2-151652, 3GPP TSG-RAN WG2 Meeting #90, Fukuoka, Japan, May 25-May 29, 2015, Source: LG Electronics Inc., Title: Consideration on DL MAC for unlicensed band.

R2-153163, revision of R2-152362, 3GPP TSG-RAN WG2 Meeting #91 Beijing, China, Aug. 24-Aug. 28, 2015, Source: LG Electronics Inc., Title: Consideration on DL MAC for unlicensed band.

R2-153313, 3GPP TSG-RAN WG2 Meeting #91, Beijing, China, Aug. 24-28, 2015, Source: Huawei, HiSilicon, Title: Supported functionalities and parameters for LAA cell.

R2-153431, 3GPP TSG-RAN WG2 #91, Beijing, China, Aug. 24-28, 2015, Source: ETRI, Title: Discussion on Activation/Deactivation for LAA.

R2-153523, 3GPP TSG-RAN WG2#91, Beijing, China, Aug. 24-28, 2015, Source: ZTE, Title: Further Thoughts on (De)activation of LAA SCell.

R2-153569, 3GPP TSG-RAN WG2 #91, Aug. 24-28, 2015, Beijing, China, Source: NTT Docomo, Inc., Title: Discussion on deactivation for LAA.

R2-153779, 3GPP TSG-RAN WG2#91, Beijing, China, Aug. 24-28, 2015, Source: Samsung, Title: LAA SCell Aclivation and Deactivation.

R2-153799, 3GPP TSG-RAN WG2 Meeting #91, Beijing, China, Aug. 24-28, 2015, Source: KT Corp., Title: Discussion on LAA SCell Activation and Deactivation.

R1-151297, 3GPP TSG RAN WG1 Meeting #80bis, Belgrade, Serbia, Apr. 20-24, 2015, Source: Huawei, HiSilicon, Title: Evaluation results of LAA fast carrier scheduling.

R1-153071, 3GPP TSG RAN WG1 Meeting #81, Fukuoka, Japan, May 25-29, 2015, Source: Ericsson, Title: Carrier Selection for CA enhancement.

R1-154009, 3GPP TSG RAN WG1 Meeting #82, Beijing, China, Aug. 24-28, 2015, Source: Kyocera, Title: DL Transmission Design for LAA.

R1-154146, 3GPP TSG RAN WG1 #82, Beijing, China, Aug. 24-28, 2015, Source: Samsung, Title: LAA synchronization.

R1-154327, 3GPP TSG RAN WG1 82 Meeting, Beijing, China, Aug. 24-28, 2015, Source: Huawei, HiSilicon, Title: UE support of carrier selection for LAA.

3GPP TSG RAN WG1 Meeting #80bis, R1-151302, Belgrade, Serbia, Apr. 20-24, 2015, Source: Huawei, HiSilicon, Title: Support of UL transmission for LAA.

3GPP TSG RAN WG1 #80bis, R1-151404, Apr. 20-24, 2015, Belgrade, Serbia, Source: Qualcomm Incorporated, Title: Adaptive Frame Structure and DL-UL configuration for LAA.

3GPP TSG RAN WG1 Meeting #80bis, R1-151464, Belgrade, Serbia, Apr. 20-24, 2015, Source: Kyocera, Title: LAA UL Design.

3GPP TSG RAN WG1 meeting #80bis, R1-151516, Belgrade, Serbia, Apr. 20-24, 2015, Source: LG Electronics, Title: LBT operation for LAA UL.

3GPP TSG RAN WG1 Meeting #80bis, R1-151627, Belgrade, Serbia, Apr. 20-24, 2015, Source: Samsung, Title: Discussion on UL transmission for LAA.

3GPP TSG RAN WG1 Meeting #80bis, R1-151675, Belgrade, Serbia, Apr. 20-24, 2015, Source: Panasonic, Title: Discussion on UL transmission in LAA.

3GPP TSG RAN WG1 Meeting #80bis, R1-151719, Belgrade, Serbia, Apr. 20-24, 2015, Source: ZTE, Title: Potential design for LAA UL transmission.

3GPP TSG-RAN WG1 #80bis, R1-151750, Belgrade, Serbia, Apr. 20-24, 2015, Source: NVIDIA, Title: Flexible UL-DL transmission for LAA.

3GPP TSG-RAN WG1 Meeting #80bis, R1-151841, Belgrade, Serbia, Apr. 20-24, 2015, Source: Nokia Networks Title: On the PHY options for LAA UL operation.

3GPP TSG-RAN WG1 Meeting #80bis, R1-151842, Belgrade, Serbia, Apr. 20-24, 2015, Source: Nokia Networks, Title: UL LBT and Configurable Frame Structure for UL/DL operation.

3GPP TSG RAN WG1 Meeting #80bis, R1-151958, Belgrade, Serbia, Apr. 20-24, 2015, Source: NTT Docomo, Inc., Title: Discussion on issues related to UL transmission in LAA.

3GPP TSG RAN WG1 meeting #80bis, R1-151973, Belgrade, Serbia, Apr. 20-24, 2015, Source: Institute for Information Industry (III), Title: On the Design of LAA Uplink Transmission.

3GPP TSG RAN WG1 Meeting #80-bis, R1-152094, Belgrade, Serbia, Apr. 20-24, 2015 Source: ETRI, Title: Discussion on the UL transmission for LAA and the potential solution thereof.

3GPP TSG RAN WG1 Meeting #81, R1-152470, Fukuoka, Japan, May 25-29, 2015 Source: Huawei, HiSilicon, Title: Frame structure for LAA DL and UL transmission operation.

3GPP TSG RAN WG1 Meeting #81, R1-152579, Fukuoka, Japan, May 25-29, 2015, Source: CATT, Title: Frequency reuse for LBE.

3GPP TSG RAN WG1 Meeting #81, R1-152580, Fukuoka, Japan, May 25-29, 2015, Source: CATT, CATR, Title: Frame structure considerations for LAA.

(56) References Cited

OTHER PUBLICATIONS

3GPP TSG RAN WG1 Meeting #81, R1-152649, Fukuoka, Japan, May 25-29, 2015, Source: Intel Corporation, Title: On the LAA UL: LBT, scheduling, and sub-frame structure.
3GPP TSG RAN WG1 meeting #81, R1-152737, Fukuoka, Japan, May 25-29, 2015, Source: LG Electronics, Title: Indication of DL/UL TX burst structure.
3GPP TSG RAN WG1 #81, R1-152783, May 25-29, 2015, Fukuoka, Japan, Source: Qualcomm Incorporated, Title: Adaptive Frame Structure and DL-UL configuration for LAA.
3GPP TSG RAN WG1 #81, R1-152786, May 25-29, 2015, Fukuoka, Japan Source: Qualcomm Incorporated, Title: UE procedure for receiving DL transmissions in LAA.
R1-164572 3GPP TSG RAN WG1 Meeting #85, Nanjing, China, May 23-27, 2016, Source: ZTE, Title: HARQ for UL LAA.
3GPP TS 36.211 V14.0.0 (Sep. 2016); Technical Specification; 3rd Generation Partnership Project; Technical Specification Group Radio Access Network; Evolved Universal Terrestrial Radio Access (E-UTRA); Physical channels and modulation (Release 14).
3GPP TS 36.212 V14.0.0 (Sep. 2016); Technical Specification; 3rd Generation Partnership Project; Technical Specification Group Radio Access Network; Evolved Universal Terrestrial Radio Access (E-UTRA); Multiplexing and channel coding (Release 14).
3GPP TS 36.213 V14.0.0 (Sep. 2016); Technical Specification; 3rd Generation Partnership Project; Technical Specification Group Radio Access Network; Evolved Universal Terrestrial Radio Access (E-UTRA); Physical layer procedures (Release 14).
3GPP TS 36.300 V14.0.0 (Sep. 2016), Technical Specification, 3rd Generation Partnership Project; Technical Specification Group Radio Access Network; Evolved Universal Terrestrial Radio Access (E-UTRA) and Evolved Universal Terrestrial Radio Access Netowrk (E-UTRAN); Overall description; Stage 2 (Release 14).
3GPP TS 36.321 V14.0.0 (Sep. 2016); Technical Specification; 3rd Generation Partnership Project; Technical Specification Group Radio Access Network; Evolved Universal Terrestrial Radio Access (E-UTRA); Medium Access Control (MAC) protocol specification (Release 14).
3GPP TS 36.331 V14.0.0 (Sep. 2016); Technical Specification; 3rd Generation Partnership Project; Technical Specification Group Radio Access Network; Evolved Universal Terrestrial Radio Access (E-UTRA); Radio Resource Control (RRC); Protocol specification (Release 14).
IEEE 802 Interim Session, Atlanta, USA, Jan. 11-16, 2015, Source: Dino Flore, Qualcomm Technologies Inc., Title: 3GPP & Unlicensed Spectrum.
R1-160358 3GPP TSG RAN WG1 Meeting #84, St. Julian's, Malta, Feb. 15-19, 2016, Source: CATT, Title: Support of PRACH for LAA Scell.
R1-160564 3GPP TSG RAN WG1 Meeting #84, St. Julian's, Malta, Feb. 15-19, 2016, Source: Samsung, Title: Discussion on RA procedure for UL LAA.
R1-160565 3GPP TSG RAN WG1 Meeting #84, St. Julian's, Malta, Feb. 15-19, 2016, Source: Samsung, Title: Discussion on PRACH for UL LAA.
R1-160625 3GPP TSG RAN WG1 Meeting #84, St. Julian's, Malta, Feb. 15-19, 2016, Source: LG Electronics, Title: Random Access in LAA.
R1-160797 3GPP TSG RAN WG1 Meeting #84, St. Julian's, Malta, Feb. 15-19, 2016, Source: Panasonic, Title: PRACH on Unlicensed Carriers.
R1-160883 3GPP TSG RAN WG1 Meeting #84, St. Julian's, Malta, Feb. 15-19, 2016, Source: Qualcomm Incorporated, Title: Random Access Channel Design.
R1-160950 3GPP TSG RAN WG1 Meeting #84, St. Julian's, Malta, Feb. 15-19, 2016, Source: NTT Docomo, Inc., Title: Discussion on PRACH for eLAA UL.
R1-160961 3GPP TSG RAN WG1 Meeting #84, St. Julian's, Malta, Feb. 15-19, 2016, Source: Coolpad, Title: Discussion on PUSCH and PRACH for eLAA.
R1-160975 3GPP TSG RAN WG1 Meeting #84, St. Julian's, Malta, Feb. 15-19, 2016, Source: MediaTek Inc., Title: Considerations on PRACH for LAA.
R1-160999 3GPP TSG RAN WG1 Meeting #84, St. Julian's, Malta, Feb. 15-19, 2016, Source: Ericsson, Title: PRACH Design for Enhanced LAA.
R1-162132 3GPP TSG RAN WG1 Meeting #84bis, Busan, Korea, Apr. 11-15, 2016, Source: Huawei, HiSilicon, Title: PRACH for eLAA.
R1-162145 3GPP TSG RAN WG1 Meeting #84bis, Busan, Korea, Apr. 11-15, 2016, Source: Huawei, HiSilicon, Title: Overview of Radio Access Mechanism for 5G.
R1-162263 3GPP TSG RAN WG1 Meeting #84bis, Busan, Korea, Apr. 11-15, 2016, Source: CATT, Title: Support of PRACH for Rel-14 eLAA.
R1-162326 3GPP TSG RAN WG1 Meeting #84bis, Busan, Korea, Apr. 11-15, 2016, Source: ZTE Microelectronics Technology, Nubia Technology, Title: PRACH Design for LAA.
R1-162358 3GPP TSG RAN WG1 Meeting #84bis, Busan, Korea, Apr. 11-15, 2016, Source: Intel Corporation, Title: PRACH Design for eLAA.
R1-162470 3GPP TSG RAN WG1 Meeting #84bis, Busan, Korea, Apr. 11-15, 2016, Source: LG Electronics, Title: Random access preamble in LAA.
R1-162471 3GPP TSG RAN WG1 Meeting #84bis, Busan, Korea, Apr. 11-15, 2016, Source: LG Electronics, Title: Random access procedure in LAA.
R1-162527 3GPP TSG RAN WG1 Meeting #84bis, Busan, Korea, Apr. 11-15, 2016, Source: HTC, Title: Discussion on PRACH design for LAA.
R1-162619 3GPP TSG RAN WG1 Meeting #84bis, Busan, Korea, Apr. 11-15, 2016, Source: Huawei, HiSilicon, Title: PRACH enhancement in high speed scenario.
R1-162668 3GPP TSG RAN WG1 Meeting #84bis, Busan, Korea, Apr. 11-15, 2016, Source: Samsung, Title: PRACH Transmission Aspects.
R1-162803 3GPP TSG RAN WG1 Meeting #84bis, Busan, Korea, Apr. 11-15, 2016, Source: NTT Docomo, Inc., Title: Discussion on PRACH for eLAA ULL.
R1-162919 3GPP TSG RAN WG1 Meeting #84bis, Busan, Korea, Apr. 11-15, 2016, Source: Nokia, Alcatel-Lucent Shanghai Bell, Title: Discussion on PRACH design for eLAA.
R1-162940 3GPP TSG RAN WG1 Meeting #84bis, Busan, Korea, Apr. 11-15, 2016, Source: MediaTek Inc., Title: PRACH design in eLAA.
R1-162995 3GPP TSG RAN WG1 Meeting #84bis, Busan, Korea, Apr. 11-15, 2016, Source: Coolpad, Title: Discussion on PRACH for eLAA.
R1-163026 3GPP TSG RAN WG1 Meeting #84bis, Busan, Korea, Apr. 11-15, 2016, Source: Qualcomm Incorporated, Title: PRACH design details.
R1-163821 3GPP TSG RAN WG1 Meeting #84bis, Busan, Korea, Apr. 11-15, 2016, Source: Ericsson, Title: On Performance of PRACH for Enhanced LAA.
R2-162231 3GPP TSG RAN WG2 Meeting #93bis, Dubrovnik, Croatia, Apr. 11-15, 2016, Source: IAESI, Thales, Fairspectrum, Title: High level view of 5G access architecture.
R2-162300 3GPP TSG RAN WG2 Meeting #93bis, Dubrovnik, Croatia, Apr. 11-15, 2016, Source: Samsung, Title: Preliminary View on Initial Access in 5G.
R2-162367 3GPP TSG RAN WG2 Meeting #93bis, Dubrovnik, Croatia, Apr. 11-15, 2016, Source: Samsung, Title: Preliminary View on Initial Access in 5G.
R2-162393 3GPP TSG RAN WG2 Meeting #93bis, Dubrovnik, Croatia, Apr. 11-15, 2016, Source: Samsung, Title: Random Access for eLAA.
R2-162428 3GPP TSG RAN WG2 Meeting #93bis, Dubrovnik, Croatia, Apr. 11-15, 2016, Source: Huawei, HiSilicon, Title: Considerations on RACH for LAA SCell.
R2-162471 3GPP TSG RAN WG2 Meeting #93bis, Dubrovnik, Croatia, Apr. 11-15, 2016, Source: Intel Corporation, Title: RACH procedure for UL LAA.

(56) References Cited

OTHER PUBLICATIONS

R2-162745 3GPP TSG RAN WG2 Meeting #93bis, Dubrovnik, Croatia, Apr. 11-15, 2016, Source: Ericsson, Title: Impact on Random Access due to LBT.
R2-162763 3GPP TSG RAN WG2 Meeting #93bis, Dubrovnik, Croatia, Apr. 11-15, 2016, Source: Ericsson, Title: Initial Consideations on NR system access.
R2-162895 3GPP TSG RAN WG2 Meeting #93bis, Dubrovnik, Croatia, Apr. 11-15, 2016, Source: LG Electronics, Inc., Title: Random access aspect in LAA.
R2-162911 3GPP TSG RAN WG2 Meeting #93bis, Dubrovnik, Croatia, Apr. 11-15, 2016, Source: Qualcomm Incorporated, Title: RACH Procedure for Enhanced LAA.
3GPP TSG-RAN WG2 Meeting #72bis, Dublin, Ireland, Jan. 17-21, 2011, R2-110113, Agenda item: 7.1.4, Source: Huawei, Title: CQI Reporting at Activation.
3GPP TSG-RAN WG2 Meeting #87, Aug. 18-22, 2014, Dresden, Germany, R2-143117, Agenda Item: 6.1.2, Source: Samsung, Title: Discussion on PHR triggering due to SCell activation.
3GPP TSG-RAN WG2 Meeting #89 R2-150186, Athens, Greece, Feb. 9-13, 2015, Source: Nokia Corporation, Nokia Networks, Title: PUCCH SCell RLM and activation/deactivation.
3GPP TSG-RAN WG2 Meeting #89 R2-150277, Athens, Greece, Feb. 9-13, 2015, Source: KT Corp., Title: Activation/deactivation of SCell carrying PUCCH.
3GPP TSG-RAN WG2 Meeting#89 R2-150238, Athens, Greece, Feb. 9-13, 2015, Agenda Item: 7.2, Source: Fujitsu, Title: Discussion on the PUCCH support on SCell.
3GPP TSG-RAN WG4 Meeting #68, Barcelona, Spain, Aug. 19-23, 2013, R4-134045, Agenda item: 5.2.3, Source: NSN, Nokia Corporation, Title: Remaining issues on SCell Activation Delay Requirements.
3GPP TSG-RAN1#63bis meeting R1-110069, Dublin, Ireland, Jan. 17-21, 2011, Agenda Item: 6.2.1, Source: Samsung, Title: CSI reporting and SRS timing upon SCell activation/deactivation.
3GPP TSG-RAN1#64 meeting R1-110721, Taipei, Taiwan, Feb. 21-25, 2011, Agenda item: 4, Source: Samsung, Title: CQi reporting at SCell activation.
3GPP TSG-RAN WG2 Meeting #89 R2-150380, Athens, Greece, Feb. 9-Feb. 13, 2015, Source: LG Electronics Inc., Title: Potential issues in MAC for CA enhancement.
3GPP TSG RAN WG1 #80 R1-150358, Athens, Greece, Feb. 9-13, 2015, Agenda item: 7.2.2.2.1, Source: Samsung, Title: Necessary mechanisms for supporting CA with up to 32 CCs.
3GPP TSG RAN WG1 #80 R1-150359, Athens, Greece, Feb. 9-13, 2015, Agenda item: 7.2.2.2.2, Source: Samsung, Title: Enhancements to DL control signaling for CA with up to 32 CCs.
3GPP TSG RAN WG1 Meeting #80 R1-150104, Athens, Greece, Feb. 9-13, 2015, Source: CATT, Title: Enhancements to DL control signaling for Rel-13 CA.
3GPP TSG RAN WG1 Meeting #80 R1-150137, Athens, Greece, Feb. 9-13, 2015, Source: ZTE, Title: PDCCH/EPDCCH enhancements for Carrier Aggregation.
3GPP TSG RAN WG1 Meeting #80 R1-150169, Athens, Greece, Feb. 9-13, 2015, Agenda item: 7.2.2.2.2, Source: Alcatel-Lucent Shanghai Bell, Alcatel-Lucent, Title: Enhancements to DL control signalling for up to 32 component carriers.
3GPP TSG RAN WG1 Meeting #80 R1-150170, Athens, Greece, Feb. 9-13, 2015, Source: Alcatel-Lucent Shanghai Bell, Alcatel-Lucent, Title: DL PHICH enhancement to support up to 32 carriers aggregation.
3GPP TSG RAN WG1 Meeting #80 R1-150277, Athens, Greece, Feb. 9-13, 2015, Source: Sharp, Title: Considerations on DL Control Signaling for Rel-13 CA.
3GPP TSG RAN WG1 Meeting #80 R1-150293, Athens, Greece, Feb. 9-13, 2015, Agenda item: 7.2.2.2.2, Source: NEC, Title: Discussion on DL control signaling enhancements.
3GPP TSG RAN WG1 Meeting #80 R1-150315, Athens, Greece, Feb. 9-13, 2015, Source: Panasonic, Title: identified DL aspects for CA beyond 5 carriers.

3GPP TSG RAN WG1 Meeting #80 R1-150437, Athens, Greece, Feb. 9-13, 2015, Source: CMCC, Title: Design principle to support CA up to 32 carriers.
3GPP TSG RAN WG1 Meeting #80 R1-150523, Athens, Greece, Feb. 9-13, 2015, Agenda item: 7.2.2.2.2, Source: HTC, Title: DL control signaling for CA up to 32 CCs.
3GPP TSG RAN WG1 Meeting #80 R1-150593, Athens, Greece, Feb. 9-13, 2015, Source: NTT Docomo, Inc., Title: Necessary enhancements to enable LTE CA of up to 32CCs for DL and UL.
3GPP TSG RAN WG1 Meeting #80 R1-150824, Athens, Feb. 9-13, 2015, Title: Observations on Necessary Enhancements to DL control signaling, Source: Nokia Corporation, Nokia Networks, NTT Docomo.
3GPP TSG RAN WG2 Meeting #89 R2-150038, Athens, Greece, Feb. 9-13, 2015, Title: LS on RAN1 agreements on PUCCH on SCell for CA, Release: Rel-13, Work Item: LTE_CA_enh_b5C-Core, Source: TSG RAN WG1.
3GPP TSG-RAN WG1 Meeting #80 R1-150495, Athens, Greece, Feb. 9-13, 2015, Agenda item: 7.2.2.2.2, Source: Nokia Corporation, Nokia Networks, Title: On DL control signalling for up to 32 component carriers.
3GPP TSG-RAN WG1#80 R1-150323, Athens, Greece, Feb. 9-13, 2015, Source: Ericsson, Title: DL control signaling enhancements for up to 32 CCs.
3GPP TSG-RAN WG2 meeting #89 R2-150149, Athens, Greece, Feb. 9-13, 2015, Source: ZTE, Title: The principle of grouping PUCCH cell.
3GPP TSG-RAN2 #89 Meeting R2-150289, Athens, Greece, Feb. 9-13, 2015, Source: MediaTek Inc., Title: Cross-carrier scheduling for CA enhancement beyond 5CCs.
3GPP TSG-RAN2 #89 Meeting R2-150290, Athens, Greece, Feb. 9-13, 2015, Source: MediaTek Inc., Title: PUCCH on SCell for CA enhancement beyond 5CCs.
3GPP TSG RAN WG1 #80 R1-150357, Athens, Greece, Feb. 9-13, 2015, Agenda item: 7.2.2.1, Source: Samsung, Title: PUCCH Transmission on SCell for CA.
3GPP TSG RAN WG1 #80 R1-150361, Athens, Greece, Feb. 9-13, 2015, Agenda item: 7.2.2.2.3, Source: Samsung, Title: CSI Transmission for Enhanced CA.
3GPP TSG RAN WG1 #80 R1-150468, Feb. 9-Feb. 13, 2015, Athens, Greece, Agenda item: 7.2.2.1, Source: Qualcomm Incorporated, Title: PUCCH on SCell.
3GPP TSG RAN WG1 #80 R1-150473, Feb. 9-Feb. 13, 2015, Athens, Greece, Agenda item: 7.2.2.2.3, Source: Qualcomm Incorporated, Title: CSI feedback for up to 32 component carriers.
3GPP TSG RAN WG1 #80 R1-150742, Feb. 9-Feb. 13, 2015, Athens, Greece, Agenda item: 7.2.2.2.3, Source: Qualcomm Incorporated, Title: HARQ ACK for up to 32 DL Carriers.
3GPP TSG RAN WG1 #80 R1-150823, Athens, Greece, Feb. 9-13, 2015, Title: WF on PUCCH on SCell for CA, Source: NTT Docomo, NEC, Sharp, Softbank Mobile, Intel, Ericsson, KDDI.
3GPP TSG RAN WG1 #80, Athens, Greece, Feb. 9-13, 2015, R1-150822, Title: Way Forward on PUCCH on SCell for CA, Source: Ericsson, NEC, Sharp, NTT Docomo, ZTE.
3GPP TSG RAN WG1 #80, Athens, Greece, Feb. 9-13, 2015, R1-150926, Title: WF on target scenarios for UCI feedback design, Source: Ericsson, CATT.
3GPP TSG RAN WG1 Meeting #80 R1-150101, Athens, Greece, Feb. 9-13, 2015, Source: CATT, Title: PUCCH on SCell for Rel-13 CA.
3GPP TSG RAN WG1 Meeting #80 R1-150103, Athens, Greece, Feb. 9-13, 2015, Source: CATT, Title: Enhancements to support carrier aggregation with up to 32 component carriers.
3GPP TSG RAN WG1 Meeting #80 R1-150106, Athens, Greece, Feb. 9-13, 2015, Source: CATT, Title: Periodic CSI feedback for Rel-13 CA.
3GPP TSG RAN WG1 Meeting #80 R1-150135, Athens, Greece, Feb. 9-13, 2015, Source: ZTE, Title: Further CA enhancement to support PUCCH on SCell.
3GPP TSG RAN WG1 Meeting #80 R1-150168, Athens, Greece, Feb. 9-13, 2015, Source: Alcatel-Lucent Shanghai Bell, Alcatel-Lucent, Title: CA enhancement to support up to 32 carrier aggregation.

(56) References Cited

OTHER PUBLICATIONS

3GPP TSG RAN WG1 Meeting #80 R1-150171, Athens, Greece, Feb. 9-13, 2015, Agenda item: 7.2.2.2.2, Source: Alcatel-Lucent Shanghai Bell, Alcatel-Lucent, Title: Enhancements to UL control signalling for up to 32 component carriers.
3GPP TSG RAN WG1 Meeting #80 R1-150207, Athens, Greece, Feb. 9-13, 2015, Agenda Item: 7.2.2.2.1, Source: LG Electronics, Title: Necessary mechanisms and enhancements to support CA of up to 32 carriers.
3GPP TSG RAN WG1 Meeting #80 R1-150276, Athens, Greece, Feb. 9-13, 2015, Source: Sharp, Title: Considerations on PUCCH for Rel-13 CA.
3GPP TSG RAN WG1 Meeting #80 R1-150294, Athens, Greece, Feb. 9-13, 2015, Agenda item: 7.2.2.2.3, Source: NEC, Title: Discussion on UL control signaling enhancements.
3GPP TSG RAN WG1 Meeting #80 R1-150390, Athens, Greece, Feb. 9-13, 2015, Agenda Item: 7.2.2.2.1, Source: Huawei, HiSilicon, Title: On CA enhancements supporting up to 32 component carriers.
3GPP TSG RAN WG1 Meeting #80 R1-150412, Athens, Greece, Feb. 9-13, 2015, Agenda Item: 7.2.2.2.3, Source: Huawei, HiSilicon, Title: CSI feedback enhancement for carrier aggregation enhancement beyond 5 carriers.
3GPP TSG RAN WG1 Meeting #80 R1-150489, Athens, Greece, Nov. 17-21, 2014, Source: ITL Inc., Title: Uplink control signaling enhancements for b5C CA.
3GPP TSG RAN WG1 Meeting #80 R1-150509, Athens, Greece, Feb. 9-13, 2015, Source: NTT Docomo, NC., Title: PUCCH on SCell for UEs supporting UL-CA.
3GPP TSG RAN WG1 Meeting #80 R1-150510, Athens, Greece, Feb. 9-13, 2015, Source: NTT Docomo, NC., Title: Initial views on CA enhancements to support up to 32 component carriers.
3GPP TSG RAN WG1 Meeting #83 R1-157531, Anaheim, USA, Nov. 16-20, 2015, Source: Ericsson, Title: On Energy Detection Threshold for LAA.
3GPP TS 36.211 V13.0.0 (Dec. 2015), Technical Specification, 3rd Generation Partnership Project; Technical Specification Group Radio Access Network; Evolved Universal Terrestrial Radio Access (E-UTRA); Physical channels and modulation (Release 13).
3GPP TS 36.212 V13.0.0 (Dec. 2015), Technical Specification, 3rd Generation Partnership Project; Technical Specification Group Radio Access Network; Evolved Universal Terrestrial Radio Access (E-UTRA); Multiplexing and channel coding, (Release 13).
3GPP TS 36.213 V13.0.1 (Jan. 2016), Release 13, Technical Specification (TS).
3GPP TS 36.300 V13.2.0 (Dec. 2015), Technical Specification, 3rd Generation Partnership Project; Technical Specification Group Radio Access Network; Evolved Universal Terrestrial Radio Access (E-UTRA) and Evolved Universal Terrestrial Radio Access Network, (E-UTRAN); Overall description; Stage 2 (Release 13).
3GPP TS 36.321 V13.0.0 (Dec. 2015), Technical Specification, 3rd Generation Partnership Project; Technical Specification Group Radio Access Network; Evolved Universal Terrestrial Radio Access (E-UTRA); Medium Access Control (MAC) protocol specification, (Release 13).
3GPP TS 36.331 V13.0.0 (Dec. 2015), Technical Specification, 3rd Generation Partnership Project; Technical Specification Group Radio Access Network; Evolved Universal Terrestrial Radio Access (E-UTRA); Radio Resource Control (RRC); Protocol specification (Release 13).
3GPP TSG RAN WG1 #82, R1-154139, Beijing, China, Aug. 24-28, 2015, Title: CCA threshold and transmission power for LAA.
3GPP TSG RAN WG1 #82bis R1-155460, Malmo, Sweden, Oct. 5-9, 2015, Source: Samsung, Title: LAA energy detection adaptation.
3GPP TSG RAN WG1 #82bis, R1-155721, Oct. 5-9, 2015, Malmo, Sweden, Agenda item: 7.2.3.1, Source: Qualcomm Incorporated Title: Adaptive ED threshold setting.
3GPP TSG RAN WG1 #82bis, R1-155722, Oct. 5-9, 2015, Malmo, Sweden, Agenda item: 7.2.3.1, Source: Qualcomm Incorporated Title: Remaining details of UL LBT operation.
3GPP TSG RAN WG1 #82bis, R1-155724, Oct. 5-9, 2015, Malmo, Sweden, Agenda item: 7.2.3.1, Source: Qualcomm Incorporated, Title: Multi-carrier LBT operation.
3GPP TSG RAN WG1 #83 R1-156489, Nov. 15-22, 2015, Anaheim, USA, Agenda item: 6.2.3.1, Source: Cisco Systems, Title: Views on Energy Detection Threshold Adaptation.
3GPP TSG RAN WG1 #83 R1-156490, Nov. 15-22, 2015, Anaheim, USA, Agenda item: 6.2.3.1, Source: Cisco Systems, Title: Views on Multi-Channel Access for LAA.
3GPP TSG RAN WG1 #83 R1-156763, Anaheim, California, US, Nov. 15-22, 2015, Agenda item: 6.2.3.1, Source: Samsung, Title: LAA Multi-Channel LBT.
3GPP TSG RAN WG1 #83 R1-157036, Nov. 14-22, 2015, Anaheim, USA, Agenda item: 6.2.3.1, Source: Qualcomm Incorporated, Title: Adaptive ED threshold setting.
3GPP TSG RAN WG1 #83 R1-157039, Nov. 14-22, 2015, Anaheim, USA, Agenda item: 6.2.3.1, Source: Qualcomm Incorporated, Title: Multicarrier LBT operation.
3GPP TSG RAN WG1 82bis Meeting, R1-155096, Malmo, Sweden, Oct. 5-9, 2015, Title: Evaluations for energy detection threshold.
3GPP TSG RAN WG1 82bis Meeting, R1-155097, Malmo, Sweden, Oct. 5-9, 2015, Title: Adaptation rules of energy detection threshold.
3GPP TSG RAN WG1 83 Meeting R1-156914, Anaheim, USA, Nov. 15-22, 2015, Agenda Item: 6.2.3.1, Source: Huawei, HiSilicon, Title: Remaining LBT parameters for LAA DL.
3GPP TSG RAN WG1 83 Meeting, R1-156437, Anaheim, USA, Nov. 15-22, 2015, Agenda Item: 6.2.3.1, Source: Huawei, HiSilicon, Title: Adaptation rules of energy detection threshold.
3GPP TSG RAN WG1 Meeting #81, R1-152581, Fukuoka, Japan, May 25-29, 2015, Source: CATT, Title: Discontinuous transmission for LAA.
3GPP TSG RAN WG1 Meeting #81, R1-152816, Fukuoka, Japan, May 25-29, 2015, Source: Nokia Networks, Title: On the remaining PHY issues for LAA UL operation.
3GPP TSG RAN WG1 Meeting #81, R1-152970, Fukuoka, Japan, May 25-29, 2015, Source: ZTE, Title: Overview on LAA UL.
3GPP TSG RAN WG1 Meeting #82b R1-156981, Anaheim, CA, Nov. 15-22, 2015, Agenda item: 6.2.3.1, Source: CableLabs, Title: Limitations of Multi-carrier Allocation Scheduling.
3GPP TSG RAN WG1 Meeting #82bis, R1-155592, Malmo, Sweden, Oct. 5-9, 2015, Agenda item: 7.2.3.1, Source: HTC, Title: Discussion on Adaptation Rules of the Maximum Energy Detection Threshold in LAA Coexistence.
3GPP TSG RAN WG1 Meeting #82bis, R1-155310, Malmö, Sweden, Oct. 5-9, 2015, Agenda Item: 7.2.3.1, Title: Energy detection threshold for LAA.
3GPP TSG RAN WG1 meeting #82bis, R1-155385, Malmö, Sweden, Oct. 5-9, 2015, Title: Energy detection threshold in LAA.
3GPP TSG RAN WG1 Meeting #82bis, R1-155626, Malmö, Sweden, Oct. 5-9, 2015, Agenda item: 7.2.3.1, Source: Alcatel-Lucent Shanghai Bell, Alcatel-Lucent, Title: Multi-carrier LBT operation for LAA.
3GPP TSG RAN WG1 Meeting #82bis, R1-155816, Malmö, Sweden, Oct. 5-9, 2015, Agenda Item: 7.2.3.1, Source: Lenovo, Title: Multi-carrier LBT operation for LAA.
3GPP TSG RAN WG1 Meeting #82bis, R1-155898, Malmö, Sweden, Oct. 5-9, 2015, Source: NTT Docomo, Inc., Title: Views on LBT for multiple carriers.
3GPP TSG RAN WG1 Meeting #82bis, R1-156033, Malmö, Sweden, Oct. 5-9, 2015, Source: Ericsson, Title: On Channel Access Solutions for LAA Multi-Carrier Transmission.
3GPP TSG RAN WG1 Meeting #82bis, R1-156037, Malmö, Sweden, Oct. 5-9, 2015, Source: Ericsson, Title: On Adaptation of the Energy Detection Threshold for LAA.
3GPP TSG RAN WG1 Meeting #83 R1-156510, Anaheim, USA, Nov. 15-22, 2015, Agenda item: 6.2.3.1, Source: Intel Corporation, Title: Remaining Details on LBT.
3GPP TSG RAN WG1 Meeting #83 R1-156574, Anaheim, USA, Nov. 15-22, 2015, Source: CATT, Title: Remaining details of DL LBT for LAA.

(56) References Cited

OTHER PUBLICATIONS

3GPP TSG RAN WG1 Meeting #83 R1-156576, Anaheim, USA, Nov. 15-22, 2015, Source: CATT, Title: DL LBT for LAA multi-carrier transmission.
3GPP TSG RAN WG1 Meeting #83 R1-156762, Anaheim, USA, Nov. 15-22, 2015, Agenda Item: 6.2.3.1, Source: Samsung, Title: ED threshold adaptation for LAA.
3GPP TSG RAN WG1 Meeting #83 R1-156768, Anaheim, USA, Nov. 15-22, 2015, Agenda item: 6.2.3.1, Source: Samsung, Title: Discussion on LBT for UL transmission.
3GPP TSG RAN WG1 meeting #83 R1-156857, Anaheim, USA, Nov. 15-22, 2015, Agenda Item: 6.2.3.1, Source: LG Electronics, Title: Multi-carrier DL TX in LAA.
3GPP TSG RAN WG1 Meeting #83 R1-157014, Anaheim, USA, Nov. 15-22, 2015, Title: Multi-carrier LBT operation for LAA, Source: Alcatel-Lucent Shanghai Bell, Alcatel-Lucent.
3GPP TSG RAN WG1 Meeting #83 R1-157172, Anaheim, USA, Nov. 15-22, 2015, Agenda Item: 6.2.3.1, Source: Intel Corporation, Title: On the LAA ED threshold.
3GPP TSG RAN WG1 Meeting #83 R1-157255, Anaheim, USA, Nov. 16-20, 2015, Source: Ericsson, Title: On Energy Detection Threshold for LAA.
3GPP TSG RAN WG1 Meeting #83 R1-157258, Anaheim, USA, Nov. 16-20, 2015, Source: Ericsson, Title: On Channel Access Solutions for LAA Multi-Carrier Transmission.
3GPP TSG RAN WG1 Meeting #83 R1-157281, Anaheim, USA, Nov. 15-22, 2015, Agenda item: 6.2.3.1, Source: HTC, Title: Discussion on Adaptation Rules of the Maximum Energy Detection Threshold in LAA Coexistence.
3GPP TSG RAN WG1 Meeting #83 R1-157330, Anaheim, USA, Nov. 15-22, 2015, Source: WILUS Inc., Title: Consideration on Multicarrier LBT for LAA.
3GPP TSG RAN WG1 Meeting 83 R1-156702, Anaheim, USA, Nov. 16-20, 2015, Source: SONY, Title: LAA energy detection adaptation rules.
3GPP TSG RAN WG1, Meeting #82bis, R1-155386, Malmö, Sweden, Oct. 5-9, 2015, Title: UL LBT design in LAA.
3GPP TSG-RAN WG1 Meeting #82bis, R1-155914, Malmö, Sweden, Oct. 5-9, 2015, Agenda item: 7.2.3.1, Source: Institute for Information Industry (III)Title: Considerations on Energy Detection Threshold Adaptation.
3GPP TSG-RAN WG1 Meeting #83 R1-157009, Anaheim, USA, Nov. 15-22, 2015, Agenda item: 6.2.3.1, Source: Broadcom Corporation, Title: Further Discussion on LAA DL Multi-channel LBT.
3GPP TSG-RAN WG1 Meeting #83 R1-157306, Anaheim, USA, Nov. 15-22, 2015, Agenda item: 6.2.3.1, Source: Nokia Networks, Title: Multi-carrier LBT for DL LAA.
R1-160561, 3GPP TSG RAN WG1 Meeting #84, St Julian's, Malta, Feb. 15-19, 2016, Agenda item: 7.3.1.1, Source: Samsung, Title: Discussion on UL power control for UL LAA.
R1-152739, 3GPP TSG RAN WG1 meeting #81, Fukuoka, Japan, May 25-29, 2015, Agenda Item: 6.2.4.3, Source: LG Electronics, Title: UL power control in LAA.
R1-155472, 3GPP TSG RAN WG1 #82bis, Malmo, Sweden, Oct. 5-9, 2015, Agenda item: 7.2.3.3, Source: Samsung, Title: Impact of LAA dynamic power control.
R1-160886, 3GPP TSG RAN WG1 #84, Feb. 15-19, 2016, St. Julian's, Malta, Agenda item: 7.3.1.1, Source: Qualcomm Incorporated, Title: PUSCH power control.
R1-162476, 3GPP TSG RAN WG1 meeting #84bis, Busan, Korea, Apr. 11-15, 2016, Agenda Item: 7.3.1.6, Source: LG Electronics, Title: Power control in LAA uplink.
R1-162662, 3GPP TSG RAN WG1 Meeting #84bis, Busan, Korea Apr. 11-15, 2016, Agenda Item: 7.3.1.1 Source: Samsung, Title: Discussion on UL power control for UL LAA.
R1-163023, 3GPP TSG RAN WG1 #84bis, Apr. 11-15, 2016, Busan, Korea, Agenda item: 7.3.1.1, Source: Qualcomm Incorporated, Title: PUSCH power control.

R1-163762, 3GPP TSG RAN WG1 #84bis, Busan, Korea, Apr. 11-15, 2016, Agenda item: 7.3.1.6, WF on uplink power control in LAA.
R1-164918, 3GPP TSG-RAN WG1 Meeting #85, Nanjing, China, May 23-27, 2016, Agenda item: 6.2.1.1, Source: Nokia, Alcatel-Lucent Shanghai Bell, Title: On PUSCH Transmit Power on LAA SCells.
R1-165557, 3GPP TSG RAN WG1 #85, Nanjing, China, May 23-27, 2016, Agenda item: 6.2.1.1, WF on uplink power control in LAA.
R1-167026, 3GPP TSG-RAN WG1 Meeting #86, Gothenburg, Sweden, Aug. 22-26, 2016, Agenda item: 7.2.1.1, Source: Nokia, Alcatel-Lucent Shanghai Bell, Title: Remaining Issues on LAA SCell PUSCH Transmit Power.
RP-141188, 3GPP TSG RAN Meeting #65, Edinburgh, Scotland, Sep. 9-12, 2014, Source: ZTE, Title: Supporting dual connectivity in LTE-U.
Samsung, "Text Proposal for PHR in dual connectivity", May 19-23, 2014, pp. 1-7, 3GPP TSG RAN WG2 #86, R2-142275, Seoul, Korea.
Japanese Office Action dated Jan. 30, 2018 in Japanese Patent Application No. 2017-546998.
R2-140066, 3GPP TSG RAN WG2 Meeting #85, Prague, Czech Republic, Feb. 10-14, 2014, Title: Consideration on PHR for TDD eiMTA.
3GPP TS 36.211 V12.4.0 (Dec. 2014), Technical Specification, 3rd Generation Partnership Project; Technical Specification Group Radio Access Network; Evolved Universal Terrestrial Radio Access (E-UTRA); Physical channels and modulation, 3GPP, Valbonne, France.
3GPP TS 36.212 V12.3.0 (Dec. 2014), Technical Specification, 3rd Generation Partnership Project; Technical Specification Group Radio Access Network; Evolved Universal Terrestrial Radio Access (E-UTRA); Multiplexing and channel coding, 3GPP, Valbonne, France.
3GPP TS 36.213 V12.4.0 (Dec. 2014), Technical Specification, 3rd Generation Partnership Project; Technical Specification Group Radio Access Network; Evolved Universal Terrestrial Radio Access (E-UTRA); Physical layer procedures, Valbonne, France.
3GPP TS 36.300 V12.4.0 (Dec. 2014), Technical Specification, 3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2, Valbonne, France.
3GPP TS 36.321 V12.4.0 (Dec. 2014), Technical Specification, 3rd Generation Partnership Project; Technical Specification Group Radio Access Network; Evolved Universal Terrestrial Radio Access (E-UTRA); Medium Access Control (MAC) protocol specification, Valbonne, France.
3GPP TS 36.331 V12.4.1 (Dec. 2014), Technical Specification, 3rd Generation Partnership Project; Technical Specification Group Radio Access Network; Evolved Universal Terrestrial Radio Access (E-UTRA); Radio Resource Control (RRC); Protocol specification, Valbonne, France.
3GPP TSG RAN meeting #67, Shanghai, China, Mar. 9-12, 2015, RP-150272, Status Report to TSG, Agenda item: 11.3.4, Title: LTE Carrier Aggregation Enhancement Beyond 5 Carriers.
3GPP TSG RAN WG1 Meeting #80 R1-150102, Athens, Greece, Feb. 9-13, 2015, Source: CATT, Title: Uplink power control to support PUCCH on SCell for Rel-13 CA.
3GPP TSG RAN WG1 Meeting #80bis R1-15xxxx, Belgrade, Serbia, Apr. 20-24, 2015, Source: MCC Support, Title: Draft Report of 3GPP TSG RAN WG1 #80 v0.2.0, Athens, Greece, Feb. 9-13, 2015.
3GPP TSG RAN WG2 Meeting #89 R2-150169, Athens, Greece, Feb. 9-13, 2015, Source: Intel Corporation, Title: Considerations for PUCCH on SCell in carrier aggregation.
3GPP TSG-RAN WG1 #80 R1-150085, Athens, Greece, Feb. 9-13, 2015, Source: Intel Corporation, Title: Support of PUCCH on SCell for CA.
3GPP TSG-RAN WG1#80 R1-150321, Athens, Greece, Feb. 9-13, 2015, Source: Ericsson, Title: PUCCH on SCell or carrier aggregation.

(56) References Cited

OTHER PUBLICATIONS

3GPP TSG-RAN WG2 #89 R2-150112, Feb. 9-13, 2015, Athens, Greece, Source: NTT Docomo, Inc., Title: Discussion on PUCCH on SCell.
3GPP TSG-RAN WG2 #89 Tdoc R2-150389, Athens, Greece, Feb. 9-13, 2015, Source: Ericsson, Title: PUCCH on SCell.
3GPP TSG-RAN WG2 Meeting #80 R1-150167, Athens, Greece, Feb. 9-13, 2015, Source: Alcatel-Lucent, Alcatel-Lucent Shanghai Bell, Title: PUCCH on SCell for CA enhancement.
3GPP TSG-RAN WG2 Meeting #89 R2-150527, Athens, Greece, Feb. 9-13, 2015, Source: Qualcomm Incorporated, Title: General principles for the support of PUCCH on SCell.
3GPP TSG-RAN WG2 Meeting #89 R2-150151, Athens, Greece, Feb. 9-13, 2015, Source: ZTE, Title: Discussion on the impact for the support of PUCCH on SCell, Agenda item: 7.2.
3GPP TSG-RAN WG2 Meeting #89 R2-150406, Athens, Greece, Feb. 9-13, 2015, Source: Alcatel-Lucent, Alcatel-Lucent Shanghai Bell, Title: Considerations on PUCCH on SCell.
3GPP TSG-RAN WG2 Meeting #89 R2-150410, Athens, Greece, Feb. 9-13, 2015, Agenda item: 7.2, Source: Nokia Corporation, Nokia Networks, Title: PHR for SCell with PUCCH, WID/SID: LTE_CA_enh_b5G-Core-Release 13.
3GPP TSG RAN WG1 Meeting #80 R1-150291, Athens, Greece, Feb. 9-13, 2015, Agenda item: 7.2.2.1, Source: NEC, Title: Initial considerations on SCell PUCCH for CA.
3GPP TSG RAN WG1 Meeting #81 R1-153295, Fukuoka, Japan, May 25-29, 2015, Source: Institute for Information Industry (III), Title: Discussion on Dynamic Selection of SR PUCCH Resources.
3GPP TSG RAN WG2 Meeting #89 R2-150264, Athens, Greece, Feb. 9-13, 2015, Source: CATT, Title: Discussion on the functionality of PUCCH SCell.
3GPP TSG RAN WG2 Meeting RAN2#89, Athens, Greece, Feb. 9-13, 2015, R2-150403, Agenda Item: 7.2, Source: NEC, Title: PUCCH on SCell.
3GPP TSG-RAN WG2 Meeting #89 R2-150129, Athens, Greece, Feb. 9-13, 2015, Agenda Item: 7.2, Source: Nokia Networks, Nokia Corporation, Title: SR on SCell, WID/SID: LTE_CA_enh_b5C-Core Release 13.
3GPP TSG-RAN WG2 Meeting #89 R2-150278, Athens, Greece, Feb. 9-Feb. 13, 2015, Source: Microsoft Corporation, Title: SCell PUCCH for CA.
3GPP TSG-RAN WG2 Meeting #89 R2-150372, Athens, Greece, Feb. 9-13, 2015, Source: Huawei, HiSilicon, Title: Introduce PUCCH on SCell for CA beyond 5 carriers.
3GPP TSG-RAN WG2 Meeting #90 R2-152513, Fukuoka, Japan, May 25-29, 2015, Title: SR on PUCCH-SCell, Source to WG: Ericsson.
3GPP TSG-RAN2 Meeting #64bis, Ljubljana, Slovenia, Jan. 12-16, 2009, R2-090659, Title: S PRC Parameters for MAG and RLG, Source to WG: Nokia Siemens Networks, Nokia Corporation, Source to TSG: R2, Work item code: LTE-L23.
3GPP TSG-RAN2#72 meeting Tdoc XR2-106513, Jacksonville, U.S. Nov. 15-19, 2010, Agenda Item: 7.1.4.3, Source: Samsung, Title: SR handling in CA.
Jan. 24, 2018—Japanese Office Action—JP 2017-546843.
Apr. 5, 2018—Korean Office Action—KR 2017-7025399.
3GPP TS 36.133 V12.6.0 (Dec. 2014), Technical Specification, 3rd Generation Partnership Project; Technical Specification Group Radio Access Network; Evolved Universal Terrestrial Radio Access (E-UTRA); Requirements for support of radio resource management, Valbonne, France.
3GPP TSG RAN WG2 Meeting #89 R2-150150, Athens, Greece, Feb. 9-13, 2015, Source: ZTE, Title: Activation/Deactivation for SCell carrying PUCCH.
3GPP TSG-RAN WG2 Meeting #89 R2-150263, Athens, Greece, Feb. 9-13, 2015, Source: CATT, Title: Introduction of PUCCH Cell Group.
3GPP TSG-RAN WG2 #87, Aug. 18-22, 2014, Dresden, Germany, R2-143073, Update of R2-141967, Source: NTT Docomo, Inc, Title: Support of PUCCH on SCell for CA-RAN2 aspects.

3GPP TSG RAN WG1 Meeting #81, R1-152817, Fukuoka, Japan, May 25-29, 2015 Source: Nokia Networks, Title: UL LBT and Configurable Frame Structure for UL/DL operation.
3GPP TSG RAN WG1 Meeting #81, R1-152872, Fukuoka, Japan, May 25-29, 2015, Source: Samsung, Title: Discussion on UL transmission for LAA.
3GPP TSG RAN WG1 Meeting #81, R1-152971, Fukuoka, Japan, May 25-29, 2015, Source: ZTE, Title: Remaining Issues on LAA UL.
3GPP TSG RAN WG1 Meeting #81, R1-152990, Fukuoka, Japan, May 25-29, 2015, Title: LBT and Frame Structure Design for LAA with DL and UL Source: Alcatel-Lucent Shanghai Bell, Alcatel Lucent.
3GPP TSG-RAN WG1 Meeting #80bis, R1-151459, Belgrade, Serbia, Apr. 20-24, 2015, Source: InterDigital Communications, Title: UL transmission for LAA.
R1-162858, 3GPP TSG RAN WG1 Meeting #84bis, Busan, Korea Apr. 11-15, 2016, Source: CMCC, Title: Further discussion on issues related to PUSCH transmission for LAA.
R1-160388, 3GPP TSG RAN WG1 Meeting #84, St Julian's, Malta, Feb. 15-19, 2016, Agenda Item: 7.3.1.1, Source: NEC, Title: Discussion on LAA UL transmission.
R1-160796, 3GPP TSG-RAN WG1 Meeting 84, Feb. 15-19, 2016, St Julian's, Malta, Source: Panasonic, Title: Uplink Subframe Structure.
R1-160946, 3GPP TSG RAN WG1 Meeting #84, St Julian's, Malta, Feb. 15-19, 2016, Source: NTT Docomo, Inc., Title: Discussion on PUSCH design for eLAA UL.
R1-160947, 3GPP TSG RAN WG1 Meeting #84, St Julian's, Malta, Feb. 15-19, 2016, Source: NTT Docomo, Inc., Title: Discussion on UL scheduling design for eLAA.
R1-160996, 3GPP TSG RAN WG1 Meeting #84, St. Julian's, Malta, Feb. 15-19, 2016, Source: Ericsson, Title: On UL Channel Access and PUSCH Design for Enhanced LAA.
R1-161079, 3GPP TSG-RAN WG1 Meeting #84, St Julian's, Malta, Feb. 15-19, 2016, Agenda Item: 7.3.1.1, Source: InterDigital Communications, Title: On UL data transmission for eLAA.
R1-162130, 3GPP TSG RAN WG1 Meeting #84bis, Busan, Korea Apr. 11-15, 2016, Agenda Item: 7.3.1.1, Source: Huawei, HiSilicon, Title: Scheduling design for eLAA.
R1-162131, 3GPP TSG RAN WG1 Meeting #84bis, Busan, Korea, Apr. 11-15, 2016, Agenda Item: 7.3.1.1, Source: Huawei, HiSilicon, Title: Discussion on CCA gap and symbol position for PUSCH and SRS for eLAA.
R1-162259, 3GPP TSG RAN WG1 Meeting #84bis, Busan, Korea Apr. 11-15, 2016, Source: CATT, Title: PUSCH design for Rel-14 eLAA.
R1-162443, 3GPP TSG RAN WG1 Meeting #84bis, Busan, Korea Apr. 11-15, 2016, Agenda Item: 7.3.1.1, Source: NEC, Title: Discussion on LAA UL partial subframe transmission.
R1-162604, 3GPP TSG RAN WG1 Meeting #84bis, Busan, Korea Apr. 11-15, 2016, Agenda Item: 7.3.1.1, Source: Huawei, HiSilicon, Title: Design for frame structure 3 with DL and UL subframes for eLAA.
R1-162728, 3GPP TSG RAN WG1 Meeting #84bis, Busan, Korea Apr. 11-15, 2016, Agenda Item: 7.3.1.1, Source: Huawei, HiSilicon, Title: Summary on [84-14] PUSCH frame structure in eLAA.
R1-162799, 3GPP TSG RAN WG1 Meeting #84bis, Busan, Korea, Apr. 11-15, 2016, Source: NTT Docomo, Inc., Title: Discussion on PUSCH design for eLAA UL.
R1-162838, 3GPP TSG RAN WG1 Meeting #84bis, Busan, Korea, Apr. 11-15, 2016, Source: Sharp, Title: Uplink subframe structure in LAA carrier.
R1-162936, 3GPP TSG RAN WG1 Meeting #84bis, Busan, Korea, Apr. 11-15, 2016, Source: MediaTek Inc., Title: eLAA PUSCH design.
R1-163141, 3GPP TSG RAN WG1 Meeting #84bis, Busan, Korea, Apr. 11-15, 2016, Source: Ericsson, Title: On UL Subframe Structure for Enhanced LAA.
R1-163165, 3GPP TSG RAN WG1 Meeting #84bis, Busan, Korea, Apr. 11-15, 2016, Agenda Item: 7.3.1.1, Source: Xinwei, Title: Discussion on Partial Subframe Utilization for PUSCH.

(56) References Cited

OTHER PUBLICATIONS

R1-163207, 3GPP TSG-RAN WG1 Meeting 84bis, Apr. 11-15, 2016, Busan, Korea, Source: Panasonic, Title: Uplink Subframe Structure.
3GPP TS 36.211 V13.3.0 (Sep. 2016); Technical Specification; 3rd Generation Partnership Project; Technical Specification Group Radio Access Network; Evolved Universal Terrestrial Radio Access (E-UTRA); Physical channels and modulation (Release 13).
3GPP TS 36.212 V13.3.0 (Sep. 2016); Technical Specification; 3rd Generation Partnership Project; Technical Specification Group Radio Access Network; Evolved Universal Terrestrial Radio Access (E-UTRA); Multiplexing and channel coding (Release 13).
3GPP TS 36.213 V13.3.0 (Sep. 2016); Technical Specification; 3rd Generation Partnership Project; Technical Specification Group Radio Access Network; Evolved Universal Terrestrial Radio Access (E-UTRA); Physical layer procedures (Release 13).
3GPP TS 36.300 V13.5.0 (Sep. 2016), Technical Specification, 3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 13).
3GPP TS 36.321 V13.2.0 (Jun. 2016); Technical Specification; 3rd Generation Partnership Project; Technical Specification Group Radio Access Network; Evolved Universal Terrestrial Radio Access (E-UTRA); Medium Access Control (MAC) protocol specification (Release 13).
3GPP TS 36.331 V13.2.0 (Jun. 2016); Technical Specification; 3rd Generation Partnership Project; Technical Specification Group Radio Access Network; Evolved Universal Terrestrial Radio Access (E-UTRA); Radio Resource Control (RRC); Protocol specification (Release 13).
IEEE 802 Interim Session; Atlanta, USA; Jan. 11-16, 2015; Title: 3GPP & unlicensed spectrum.
RP-151725; 3GPP TSG RAN Meeting #70, Sitges, Spain, Dec. 7-10, 2015; Source: ZTE, Xinwei; Title: Supporting dual connectivity in LAA.
RP-151978, 3GPP TSG RAN Meeting #70; Sitges, Spain, Dec. 7-10, 2015; revision of RP-yynnnn, Source: Ericsson, Huawei, Title: New Work Item on enhanced LAA for LTE.
RP-151979; 3GPP TSG RAN Meeting #70; Sitges, Spain, Dec. 7-10, 2015; Agenda item 14.1.1; Motivation For Enhanced Licensed Assisted Access Form LTE In Rel-14.
RP-160926; 3GPP TSG RAN Meeting #72; Busan, Korea, Jun. 13-17, 2016; Source: ZTE; Title: Discussion on further enhancement of LAA for LTE.
RP-161036; 3GPP TSG RAN Meeting #72; Busan, Korea, Mar. 13-16, 2016; Title: Motivation for New Work Item for Enhancing Utilization of CA for LTE; Source: Nokia, Alcatel-Lucent Shanghai Bell.
RP-161150; 3GPP TSG RAN Meeting #72; Busan, Korea, Jun. 13-16, 2016; Source: Qualcomm Incorporated; Title: New WI proposal on LTE standalone and dual connectivity operation in unlicensed spectrum.
RP-161701; 3GPP TSG RAN Meeting #73; New Orleans, Sep. 19-22, 2016; Source: ZTE; Title: New WI proposal Further enhancement on FeLAA.
RP-161702; 3GPP TSG RAN Meeting #73; New Orleans, USA, Sep. 19-22, 2016; Motivation for New WI Further Enhancement on FeLAA.
Jan. 24, 2017—International Search Report and Written Opinion—PCT/US2016/057420.
Vu, Long Hoang et al., "Multi-Carrier listen Before Talk Mechanism for LTE in Unlicensed Spectrum," 2016 Annual Conference of the Korean Institute of Communication Sciences, 2016, pp. 388-389.
R1-153228, 3GPP TSG RAN WG1 Meeting #81, Fukuoka, Japan, May 25-29, 2015, Source: Huawei, HiSilicon, Title: UL transmission design for LAA.
R1-153135, 3GPP TSG RAN WG1 Meeting #81, Fukuoka, Japan, May 25-29, 2015, Source: Ericsson, Title: On Scheduling in LAA with Downlink and Uplink Transmissions.
Jul. 12, 2018—Korean Office Action—KR 2018-7010708.
3GPP TSG RAN WG1 Meeting #71 R1-124676 New Orleans, USA, Nov. 12-16, 2012 Final Report of 3GPP TSG RAN WG1 #70.
Jul. 23, 2018—Japanese Office Action—JP 2018-512586.
Aug. 30, 2019—Japanese Office Action—JP 2018-247389.
R1-164598 3GPP TSG RAN WG1 Meeting #85, Nanjing, China, May 23-27, 2016, Source: ZTE, Title: Discussion on UCI transmission on an LAA SCell.
R1-162669 3GPP TSG RAN WG1 Meeting #84bis, Busan, Korea, Apr. 11-15, 2016, Source: Samsung, Title: Discussion on enhanced random access procedure for UL LAA.
R1-164573 3GPP TSG RAN WG1 Meeting #85, Nanjing, China, May 23-27, 2016, Source: ZTE, Title: Consideration of LBT failure in LAA UL HARQ operation.
3GPP TSG RAN WG1 Meeting #80 R1-150699, Athens, Greece, Feb. 9-13, 2015, Agenda item: 7.2.2.2.2, Source: Alcatel-Lucent Shanghai Bell, Alcatel-Lucent, Title: Enhancements to UL control signalling for up to 32 component carriers.
3GPP TSG RAN WG1 Meeting #80 R1-150825, Athens, Feb. 9-13, 2015, Title: Observations on Necessary Enhancements to UL control signaling, Source: Nokia Networks, Nokia Corporation, NTT Docomo.
3GPP TSG-RAN WG1 #80 R1-150086, Athens, Greece, Feb. 9-13, 2015, Source: Intel Corporation, Title: Discussion on CA enhancement for release 13.
3GPP TSG-RAN WG1 #80 R1-150537, Athens, Greece, Feb. 9-13, 2015, Agenda Item: 7.2.2.2.1, Source: InterDigital Communications, Title: Enabling LTE carrier aggregation of up to 32 component carriers.
3GPP TSG-RAN WG1 Meeting #80 R1-150454, Athens, Greece, Feb. 9-13, 2015, Agenda item: 7.2.2.2.3, Source: Nokia Networks, Nokia Corporation, Title: PUCCH Enhancements for Carrier Aggregation Enhancement Beyond 5 Carriers.
3GPP TSG-RAN WG1 Meeting #80 R1-150455, Athens, Greece, Feb. 9-13, 2015, Agenda item: 7.2.2.2.3, Source: Nokia Networks, Nokia Corporation, Title: CSI reporting for Carrier Aggregation Enhancement Beyond 5 Carriers.
3GPP TSG-RAN WG1#80 R1-150324, Athens, Greece, Feb. 9-13, 2015, Source: Ericsson, Title: UL control signaling enhancements for up to 32 CCs.
3GPP TSG-RAN WG2 Meeting#89 R2-150134, Feb. 9-13, 2015, Athens, Greece, Source: Institute for Information Industry (III), Title: Partition UGI feedback.
3GPP TSG RAN WG2 #89 bis R2-151304, Apr. 20 to May 24, 2015, Bratislava, Slovakia, Source: ITRI, Title: Discussion on SR on PUCCH SCell.
3GPP TSG RAN WG2 #89bis R2-151637, Apr. 20 to 24, 2015, Bratislava, Slovakia, Source: Samsung, Title: SR support for CA enhancements.
3GPP TSG RAN WG2 #90 R2-152712, May 25 to 29, 2015, Fukuoka, Japan, Source: Samsung, Title: How to support SR in PUCCH SCell.
3GPP TSG RAN WG2 Meeting #89bis R2-151430, Bratislava, Slovakia, Apr. 20-24, 2015, Source: NEC, Title: SR on PUCCH SCell.
3GPP TSG RAN WG2 Meeting #89bis R2-151104, Bratislava, Slovakia, Apr. 20-24, 2015, Source: Intel Corporation, Title: Control plane aspects of support PUCCH on SCell.
3GPP TSG RAN WG2 Meeting #89bis R2-151342, Bratislava, Slovakia, Apr. 20-24, 2015, Source: CATT, Title: D-SR on PUCCH SCell.
3GPP TSG RAN WG2 Meeting #90 R2-152277, Fukuoka, Japan, May 25-29, 2015, Source: CATT, Title: D-SR on PUCCH SCell.
3GPP TSG RAN WG2 Meeting #90 R2-152512, Fukuoka, Japan, May 25-29, 2015, Source: NEC, Title: Potential issues of SR on PUCCH SCell.
3GPP TSG RAN2 Meeting #90 R2-152524, Fukuoka, Japan, May 25-29, 2015, Source: NEC, Title: Overlapping of D-SR resources.
3GPP TSG-RAN WG2 #89bis R2-151495, Bratislava, Slovakia, Apr. 20-24, 2015, Source: HTC, Title: PUCCH SCell management.

(56) References Cited

OTHER PUBLICATIONS

3GPP TSG-RAN WG2 #89bis Tdoc R2-151488, Bratislava, Slovakia, Apr. 20-24, 2015, Source: Ericsson, Title: SR on PUCCH SCell.
3GPP TSG-RAN WG2 #90 R2-152418, Fukouka, Japan, May 25-29, 2015, Source: HTC, Title: Managing PUCCH resources on a deactivated PUCCH SCell.
3GPP TSG-RAN WG2 #90 Tdoc R2-152530, Fukuoka, Japan, May 25-29, 2015, Source: Ericsson, Title: SR on PUCCH SCell.
3GPP TSG-RAN WG2 Meeting #89bis R2-151211, Bratislava, Slovakia, Apr. 20-24, 2015, Source: Nokia Networks, Title: SR on SCell.
3GPP TSG-RAN WG2 Meeting #89bis R2-151324, Bratislava, Slovakia, Apr. 20-24, 2015, Source: Huawei, HiSilicon, Title: Leftover issues for PUCCH on SCell.
3GPP TSG-RAN WG2 Meeting #89bis R2-151469, Bratislava, Slovakia, Apr. 20-24, 2015, Source: Alcatel-Lucent Shanghai Bell, Alcatel-Lucent, Title: SR transmissions on SCell PUCCH.
3GPP TSG-RAN WG2 Meeting #90 R2-152273, Fukuoka, Japan, May 25-29, 2015, Source: Huawei, HiSilicon, Title: Issues for SR on PUCCH SCell.
3GPP TSG-RAN WG2 Meeting #90 R2-152302, Fukuoka, Japan, May 25-29, 2015, Source: Nokia Networks, Title: SR on PUCCH SCell.
3GPP TSG-RAN WG2 Meeting #90 R2-152310, Fukuoka, Japan, May 25-29, 2015, Source: Nokia Networks, Title: PUCCH SCell pre-activation.
3GPP TSG-RAN WG2 Meeting #90 R2-152366, Fukuoka, Japan, May 25-May 29, 2015, Source: LG Electronics Inc., Title: SR for CA enhancement.
3GPP TSG-RAN WG2 Meeting #90 R2-152742, Fukuoka, Japan, May 25-29, 2015, Source: Qualcomm Incorporated, Title: Dual SR Procedures.
3GPP TSG-RAN2 #89bis Meeting R2-151252, Bratislava, Slovakia, Apr. 20-24, 2015, Source: MediaTek Inc., Title: Remaining issues for PUCCH on SCell.
3GPP TSG-RAN2 #90 Meeting R2-152138, Fukuoka, Japan, May 25-29, 2015, Source: MediaTek Inc., Title: Remaining UP issues for PUCCH on SCell.
3GPP TSG RAN WG1 Meeting #80 R1-150067, Athens, Greece, Feb. 9-13, 2015, Source: Huawei, HiSilicon, Title: Support of PUCCH on SCell based on dual connectivity mechanism.
R1-156047, 3GPP TSG RAN WG1 Meeting #82bis, Malmo, Sweden, Oct. 5-9, 2015, Source: Ericsson, Title: On Support of Multiple DL Data Transmission Starting Points.
R1-156043, 3GPP TSG RAN WG1 Meeting #82bis, Malmo, Sweden, Oct. 5-9, 2015, Source: Ericsson, Title: On Dynamic DL/UL Scheduling.
R1-155902, 3GPP TSG RAN WG1 Meeting #82bis, Malmo, Sweden, Oct. 5-9, 2015, Source: NTT Docomo, Inc., Title: Discussion on discontinuous transmission and scheduling design for LAA DL.
R1-155781, 3GPP TSG RAN WG1#82bis, Oct. 5-9, 2015, Malmo, Sweden, Source: Motorola Mobility, Title: PDSCH Transmission options for LAA.
R1-155629, 3GPP TSG RAN WG1 Meeting #82bis, Malmo, Sweden, Oct. 5-9, 2015, Source: Alcatel-Lucent, Alcatel-Lucent Shanghai Bell, Title: POSCH and DCI Transmissions in LAA.
R1-155570, 3GPP TSG RAN WG1 Meeting #82bis, Malmo, Sweden, Oct. 5-9, 2015, Source: Sharp, Title: Scheduling methods for LAA SCell.
R1-155569, 3GPP TSG RAN WG1 Meeting #82bis, Malmo, Sweden, Oct. 5-9, 2015, Source: Sharp, Title: Subframe structure for LAA discontinuous transmission.
R1-155531, 3GPP TSG RAN WG1 Meeting #82bis, Malmo, Sweden, Oct. 5-9, 2015, Source: Kyocera, Title: DL Transmission Design for partial subframe.
R1-155529, 3GPP TSG RAN WG1 Meeting #82bis, Malmo, Sweden, Oct. 5-9, 2015, Source: InterDigital Communications, Title: On LAA scheduling.
R1-155474, 3GPP TSG RAN WG1 #82bis, Malmo, Sweden, Oct. 5-9, 2015, Source: Samsung, Title: Partial subframe for LAA.
R1-155468, 3GPP TSG RAN WG1 #82bis, Malmo, Sweden, Oct. 5-9, 2015, Source: Samsung, Title: LAA transmission burst structure and signaling.
R1-155389, 3GPP TSG RAN WG1 meeting #82bis, Malmo, Sweden, Oct. 5-9, 2015, Source: LG Electronics, Title:DL transmission structure in LAA.
R1-155316, 3GPP TSG RAN WG1 Meeting #82bis, Malmo, Sweden, Oct. 5-9, 2015, Source: Intel Corporation, Title: DL sub-frame structure and (e)PDCCH.
R1-155103, 3GPP TSG RAN WG1 Meeting #82bis, Malmo, Sweden, Oct. 5-9, 2015, Source: Huawei, HiSilicon, Title: Candidate starting/ending positions of partial subframe and corresponding indication for LAA.
R1-154150, 3GPP TSG RAN WG1 #82, Beijing, China, Aug. 24-28, 2015, Source: Samsung, Title: Partial subframe for LAA.
R1-153787, 3GPP TSG RAN WG1 Meeting #82, Beijing, China, Aug. 24-28, 2015, Source: Huawei, HiSilicon, Title: Candidate starting positions of partial subframe and corresponding RS pattern for LAA.
R1-153786, 3GPP TSG RAN WG1 Meeting #82, Beijing, China, Aug. 24-28, 2015, Source: Huawei, HiSilicon, Title: Indication of DL transmission burst duration for LAA.
3GPP TS 36.213 V12.5.0 (Mar. 2015), Technical Specification, 3rd Generation Partnership Project; Technical Specification Group Radio Access Network; Evolved Universal Terrestrial Radio Access (E-UTRA); Physical layer procedures (Release 12).

\* cited by examiner

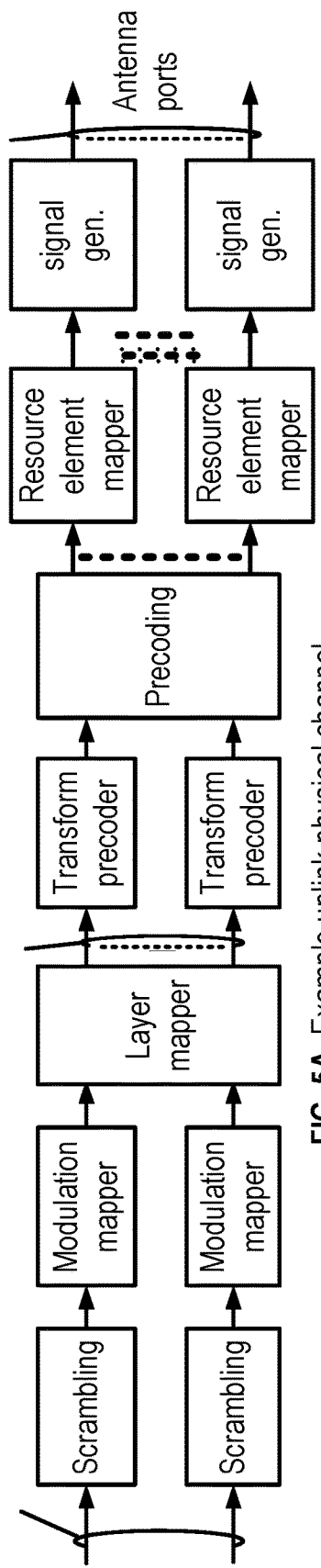
FIG. 5A Example uplink physical channel
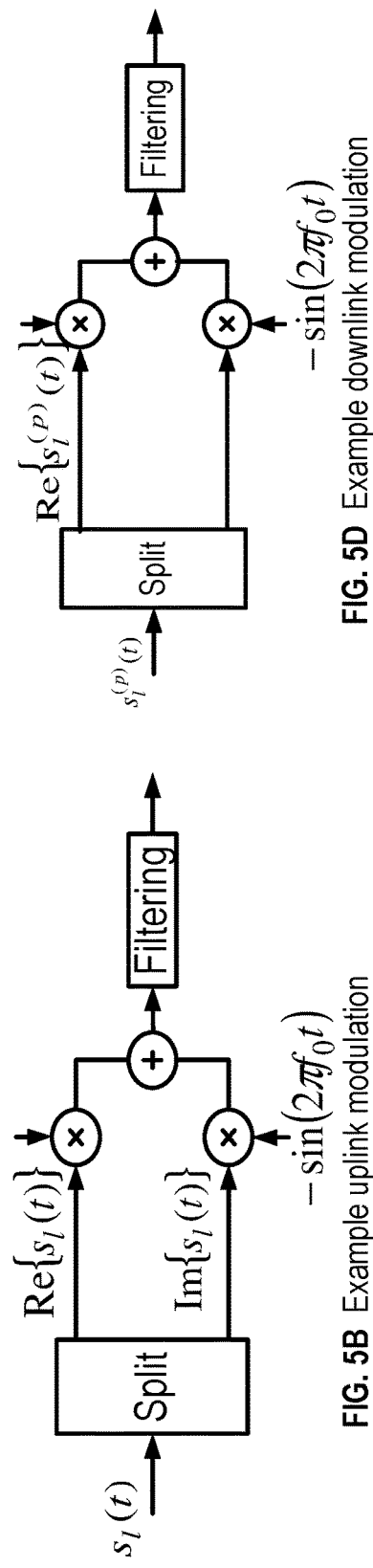
FIG. 5B Example uplink modulation
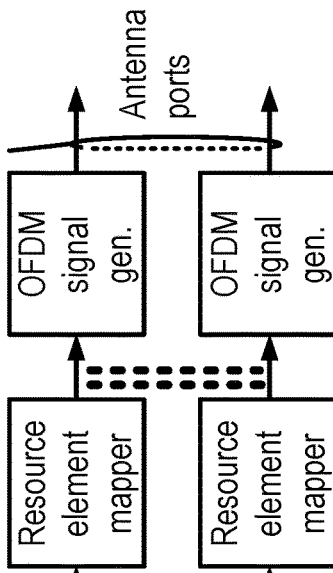
FIG. 5D Example downlink modulation
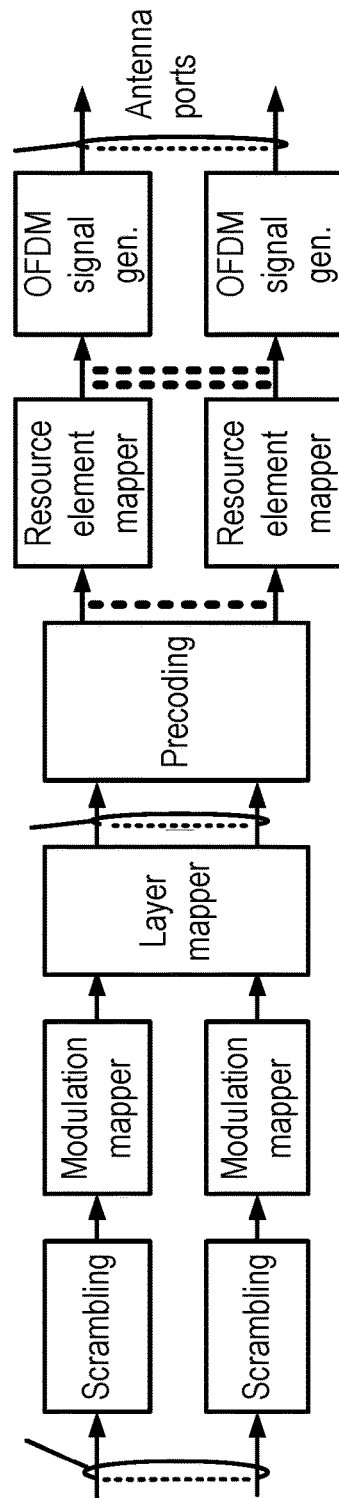
FIG. 5C Example downlink physical channel Dual-Connectivity at eNB FIG. 7  Dual-Connectivity- two MAC entities at UE side

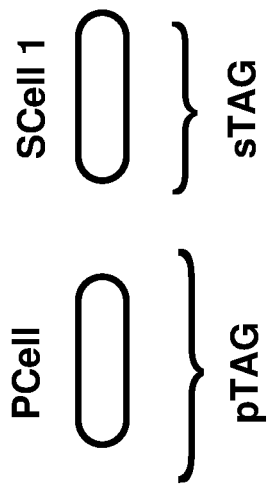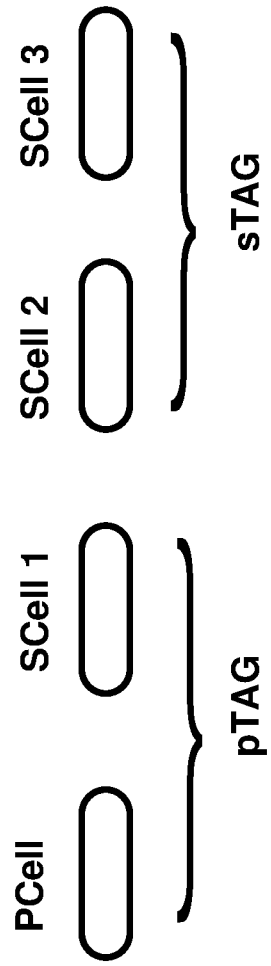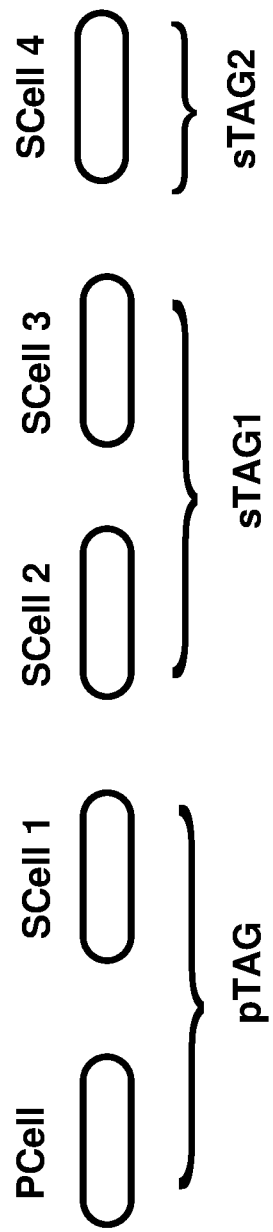
FIG. 8

Example configuration of special subframe (lengths of DwPTS/GP/UpPTS)

| Special Subframe configuration | Normal cyclic prefix in downlink | | | Extended cyclic prefix in downlink | | |
|---|---|---|---|---|---|---|
| | DwPTS | UpPTS | | DwPTS | UpPTS | |
| | | Normal cyclic prefix in downlink | Extended cyclic prefix in uplink | | Normal cyclic prefix in downlink | Extended cyclic prefix in uplink |
| 0 | $6592 \cdot T_s$ | $2192 \cdot T_s$ | $2560 \cdot T_s$ | $7680 \cdot T_s$ | $2192 \cdot T_s$ | $2560 \cdot T_s$ |
| 1 | $19760 \cdot T_s$ | | | $20480 \cdot T_s$ | | |
| 2 | $21952 \cdot T_s$ | | | $23040 \cdot T_s$ | | |
| 3 | $24144 \cdot T_s$ | | | $25600 \cdot T_s$ | | |
| 4 | $26366 \cdot T_s$ | | | $7680 \cdot T_s$ | $4384 \cdot T_s$ | $5120 \cdot T_s$ |
| 5 | $6592 \cdot T_s$ | $4384 \cdot T_s$ | $5120 \cdot T_s$ | $20480 \cdot T_s$ | | |
| 6 | $19760 \cdot T_s$ | | | $23040 \cdot T_s$ | | |
| 7 | $21952 \cdot T_s$ | | | $12800 \cdot T_s$ | | |
| 8 | $24144 \cdot T_s$ | | | - | - | - |
| 9 | $13168 \cdot T_s$ | | | - | - | - |

FIG. 11

MULTI-CARRIER DETECTION IN A WIRELESS NETWORK

CROSS-REFERENCE TO RELATED APPLICATIONS

This application is a continuation of U.S. application Ser. No. 16/378,165, filed Apr. 8, 2019, which is a continuation of U.S. application Ser. No. 15/425,992, filed Feb. 6, 2017, now U.S. Pat. No. 10,257,855, which claims the benefit of U.S. Provisional Application No. 62/291,387, filed Feb. 4, 2016, and U.S. Provisional Application No. 62/291,399, filed Feb. 4, 2016, each of which is hereby incorporated by reference in its entirety.

BRIEF DESCRIPTION OF THE SEVERAL VIEWS OF THE DRAWINGS

Examples of several of the various embodiments of the present disclosure are described herein with reference to the drawings.

FIG. 5A, FIG. 5B, FIG. 5C and FIG. 5D are example diagrams for uplink and downlink signal transmission as per an aspect of an embodiment of the present disclosure.

FIG. 8 shows example TAG configurations as per an aspect of an embodiment of the present disclosure.

FIG. 11 is an table showing example configuration of a subframe according to an embodiment of the present disclosure.

DETAILED DESCRIPTION OF EMBODIMENTS

Figure 1:
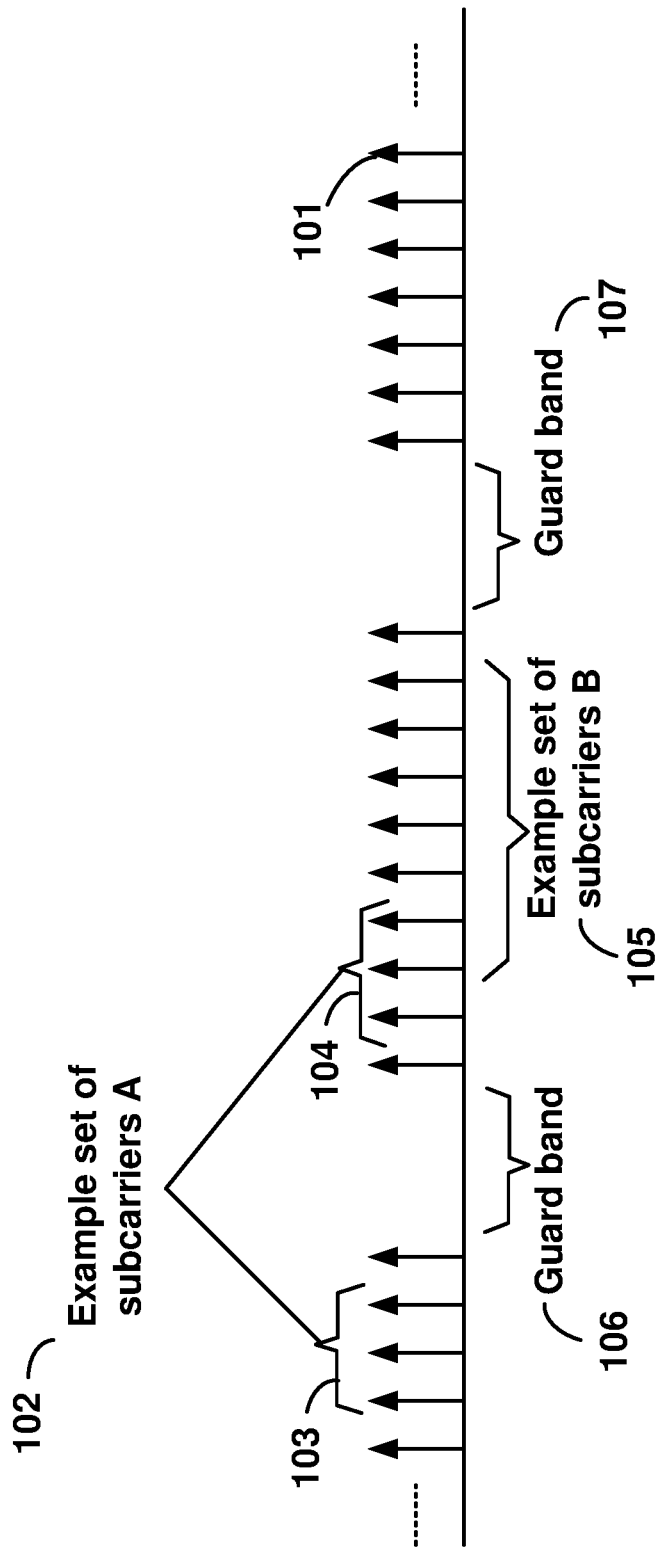
FIG. 1 is a diagram depicting example sets of OFDM subcarriers as per an aspect of an embodiment of the present disclosure.

Example embodiments of the present disclosure enable operation of carrier aggregation. Embodiments of the technology disclosed herein may be employed in the technical field of multicarrier communication systems.

The following Acronyms are used throughout the present disclosure:

ASIC application-specific integrated circuit
    BPSK binary phase shift keying
    CA carrier aggregation
    CSI channel state information
    CDMA code division multiple access
    CSS common search space
    CPLD complex programmable logic devices
    CC component carrier
    DL downlink
    DCI downlink control information
    DC dual connectivity
    EPC evolved packet core
    E-UTRAN evolved-universal terrestrial radio access network
    FPGA field programmable gate arrays
    FDD frequency division multiplexing
    HDL hardware description languages
    HARQ hybrid automatic repeat request
    IE information element
    LAA licensed assisted access
    LTE long term evolution
    MCG master cell group
    MeNB master evolved node B
    MIB master information block
    MAC media access control
    MME mobility management entity
    NAS non-access stratum
    OFDM orthogonal frequency division multiplexing
    PDCP packet data convergence protocol
    PDU packet data unit
    PHY physical
    PDCCH physical downlink control channel
    PHICH physical HARQ indicator channel
    PUCCH physical uplink control channel
    PUSCH physical uplink shared channel
    PCell primary cell
    PCC primary component carrier
    PSCell primary secondary cell
    pTAG primary timing advance group
    QAM quadrature amplitude modulation
    QPSK quadrature phase shift keying
    RBG Resource Block Groups
    RLC radio link control
    RRC radio resource control
    RA random access
    RB resource blocks SCC secondary component carrier
SCell secondary cell
Scell secondary cells
SCG secondary cell group
SeNB secondary evolved node B
sTAGs secondary timing advance group
SDU service data unit
S-GW serving gateway
SRB signaling radio bearer
SC-OFDM single carrier-OFDM
SFN system frame number
SIB system information block
TAI tracking area identifier
TAT time alignment timer
TDD time division duplexing
TDMA time division multiple access
TA timing advance
TAG timing advance group
TB transport block
UL uplink
UE user equipment
VHDL VHSIC hardware description language Example embodiments of the disclosure may be implemented using various physical layer modulation and transmission mechanisms. Example transmission mechanisms may include, but are not limited to: CDMA, OFDM, TDMA, Wavelet technologies, and/or the like. Hybrid transmission mechanisms such as TDMA/CDMA, and OFDM/CDMA may also be employed. Various modulation schemes may be applied for signal transmission in the physical layer. Examples of modulation schemes include, but are not limited to: phase, amplitude, code, a combination of these, and/or the like. An example radio transmission method may implement QAM using BPSK, QPSK, 16-QAM, 64-QAM, 256-QAM, and/or the like. Physical radio transmission may be enhanced by dynamically or semi-dynamically changing the modulation and coding scheme depending on transmission requirements and radio conditions.

FIG. 1 is a diagram depicting example sets of OFDM subcarriers as per an aspect of an embodiment of the present disclosure. As illustrated in this example, arrow(s) in the diagram may depict a subcarrier in a multicarrier OFDM system. The OFDM system may use technology such as OFDM technology, DFTS-OFDM, SC-OFDM technology, or the like. For example, arrow 101 shows a subcarrier transmitting information symbols. FIG. 1 is for illustration purposes, and a typical multicarrier OFDM system may include more subcarriers in a carrier. For example, the number of subcarriers in a carrier may be in the range of 10 to 10,000 subcarriers. FIG. 1 shows two guard bands 106 and 107 in a transmission band. As illustrated in FIG. 1, guard band 106 is between subcarriers 103 and subcarriers 104. The example set of subcarriers A 102 includes subcarriers 103 and subcarriers 104. FIG. 1 also illustrates an example set of subcarriers B 105. As illustrated, there is no guard band between any two subcarriers in the example set of subcarriers B 105. Carriers in a multicarrier OFDM communication system may be contiguous carriers, non-contiguous carriers, or a combination of both contiguous and non-contiguous carriers.

Figure 2:
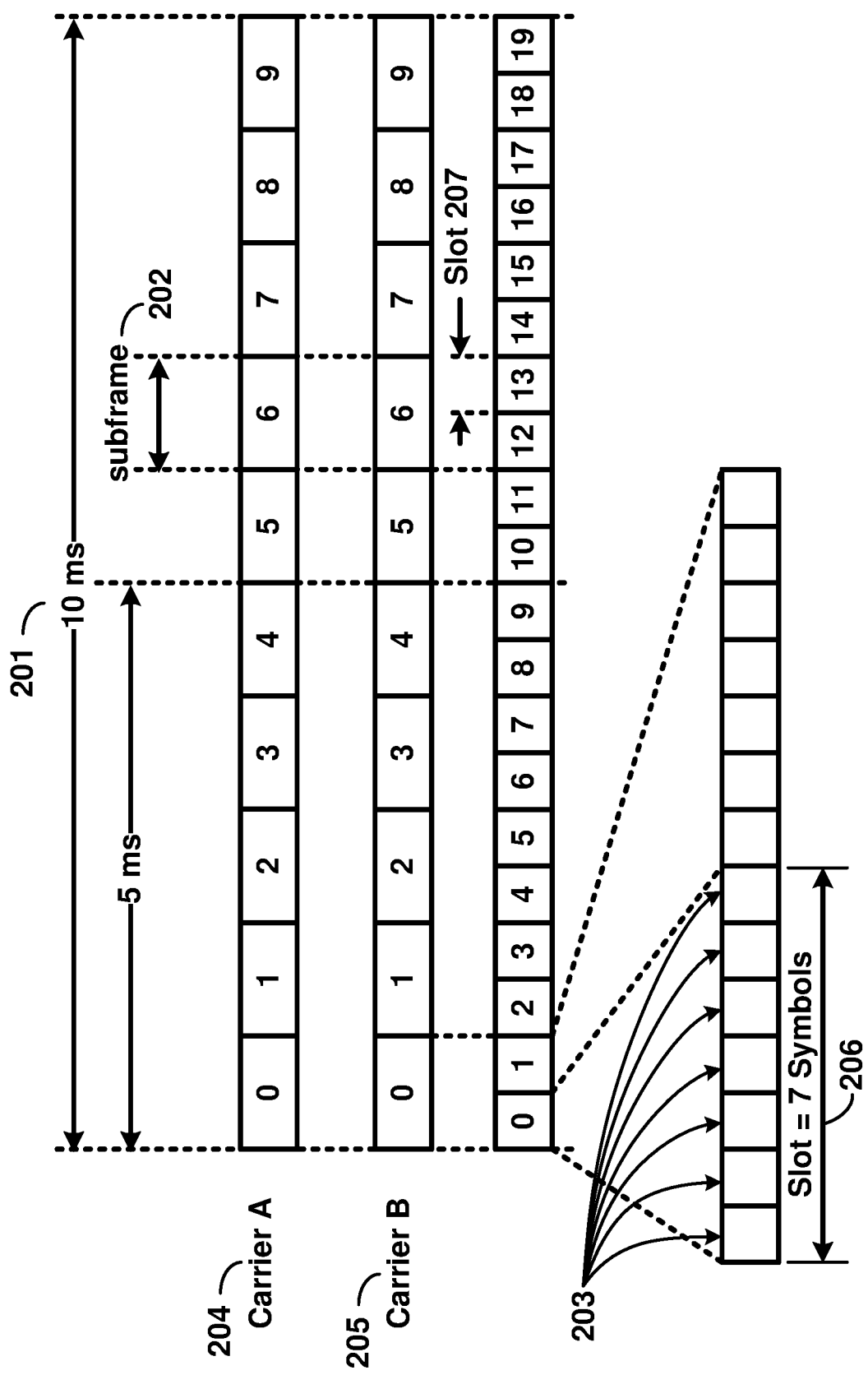
FIG. 2 is a diagram depicting an example transmission time and reception time for two carriers in a carrier group as per an aspect of an embodiment of the present disclosure.

FIG. 2 is a diagram depicting an example transmission time and reception time for two carriers as per an aspect of an embodiment of the present disclosure. A multicarrier OFDM communication system may include one or more carriers, for example, ranging from 1 to 10 carriers. Carrier A 204 and carrier B 205 may have the same or different timing structures. Although FIG. 2 shows two synchronized carriers, carrier A 204 and carrier B 205 may or may not be synchronized with each other. Different radio frame structures may be supported for FDD and TDD duplex mechanisms. FIG. 2 shows an example FDD frame timing. Downlink and uplink transmissions may be organized into radio frames 201. In this example, the radio frame duration is 10 msec. Other frame durations, for example, in the range of 1 to 100 msec may also be supported. In this example, each 10 ms radio frame 201 may be divided into ten equally sized subframes 202. Other subframe durations such as 0.5 msec, 1 msec, 2 msec, and 5 msec may also be supported. Subframe(s) may consist of two or more slots (for example, slots 206 and 207). For the example of FDD, 10 subframes may be available for downlink transmission and 10 subframes may be available for uplink transmissions in each 10 ms interval. Uplink and downlink transmissions may be separated in the frequency domain. Slot(s) may include a plurality of OFDM symbols 203. The number of OFDM symbols 203 in a slot 206 may depend on the cyclic prefix length and subcarrier spacing.

Figure 3:
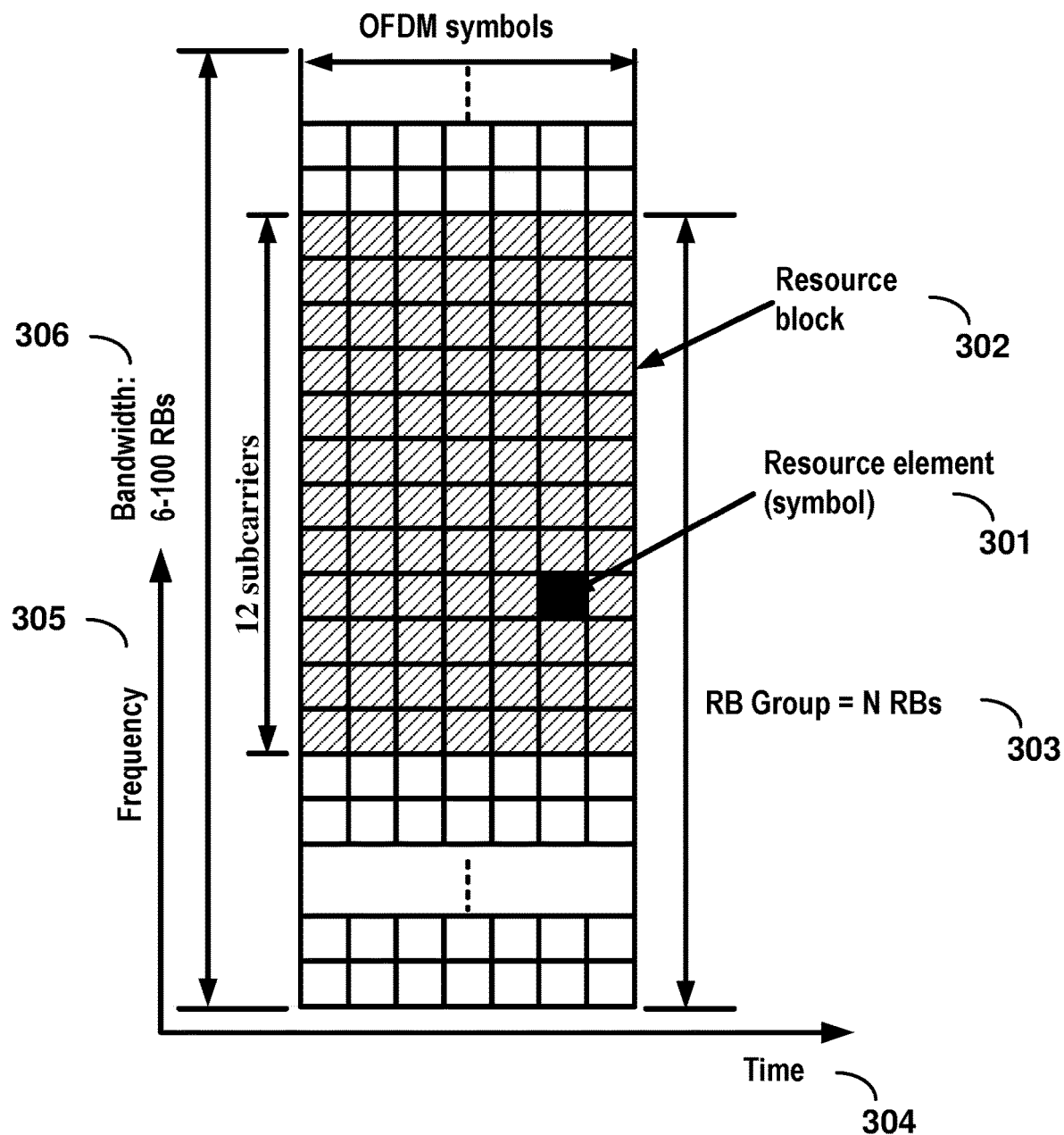
FIG. 3 is an example diagram depicting OFDM radio resources as per an aspect of an embodiment of the present disclosure.

FIG. 3 is a diagram depicting OFDM radio resources as per an aspect of an embodiment of the present disclosure. The resource grid structure in time 304 and frequency 305 is illustrated in FIG. 3. The quantity of downlink subcarriers or RBs (in this example 6 to 100 RBs) may depend, at least in part, on the downlink transmission bandwidth 306 configured in the cell. The smallest radio resource unit may be called a resource element (e.g. 301). Resource elements may be grouped into resource blocks (e.g. 302). Resource blocks may be grouped into larger radio resources called Resource Block Groups (RBG) (e.g. 303). The transmitted signal in slot 206 may be described by one or several resource grids of a plurality of subcarriers and a plurality of OFDM symbols. Resource blocks may be used to describe the mapping of certain physical channels to resource elements. Other pre-defined groupings of physical resource elements may be implemented in the system depending on the radio technology. For example, 24 subcarriers may be grouped as a radio block for a duration of 5 msec. In an illustrative example, a resource block may correspond to one slot in the time domain and 180 kHz in the frequency domain (for 15 KHz subcarrier bandwidth and 12 subcarriers).

FIG. 5A, FIG. 5B, FIG. 5C and FIG. 5D are example diagrams for uplink and downlink signal transmission as per an aspect of an embodiment of the present disclosure. FIG. 5A shows an example uplink physical channel. The baseband signal representing the physical uplink shared channel may perform the following processes. These functions are illustrated as examples and it is anticipated that other mechanisms may be implemented in various embodiments. The functions may comprise scrambling, modulation of scrambled bits to generate complex-valued symbols, mapping of the complex-valued modulation symbols onto one or several transmission layers, transform precoding to generate complex-valued symbols, precoding of the complex-valued symbols, mapping of precoded complex-valued symbols to resource elements, generation of complex-valued time-domain DFTS-OFDM/SC-FDMA signal for each antenna port, and/or the like.

Example modulation and up-conversion to the carrier frequency of the complex-valued DFTS-OFDM/SC-FDMA baseband signal for each antenna port and/or the complex-valued PRACH baseband signal is shown in FIG. 5B. Filtering may be employed prior to transmission.

An example structure for Downlink Transmissions is shown in FIG. 5C. The baseband signal representing a downlink physical channel may perform the following processes. These functions are illustrated as examples and it is anticipated that other mechanisms may be implemented in various embodiments. The functions include scrambling of coded bits in each of the codewords to be transmitted on a physical channel; modulation of scrambled bits to generate complex-valued modulation symbols; mapping of the complex-valued modulation symbols onto one or several transmission layers; precoding of the complex-valued modulation symbols on each layer for transmission on the antenna ports; mapping of complex-valued modulation symbols for each antenna port to resource elements; generation of complex-valued time-domain OFDM signal for each antenna port, and/or the like.

Example modulation and up-conversion to the carrier frequency of the complex-valued OFDM baseband signal for each antenna port is shown in FIG. 5D. Filtering may be employed prior to transmission.

Figure 4:
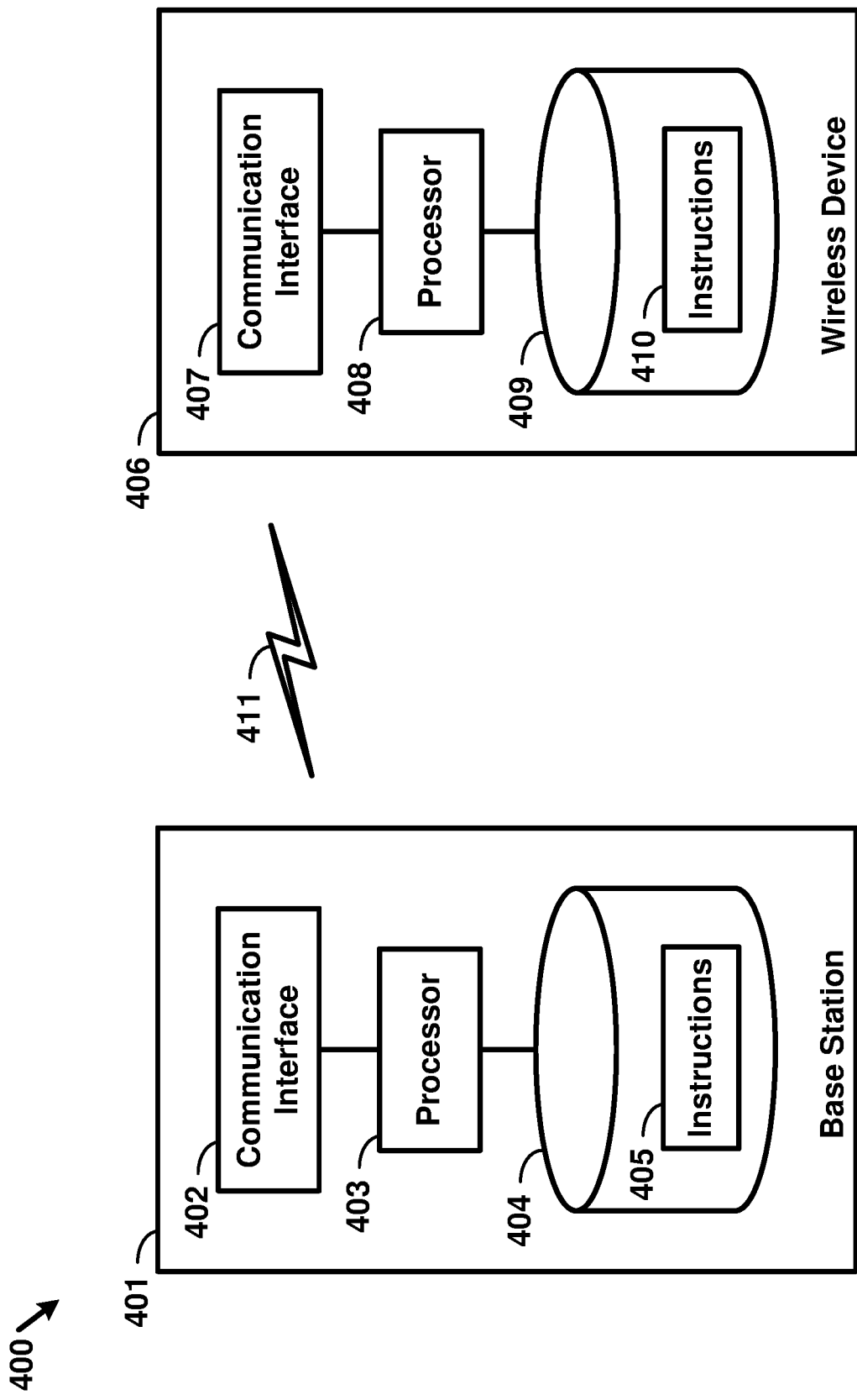
FIG. 4 is an example block diagram of a base station and a wireless device as per an aspect of an embodiment of the present disclosure.

FIG. 4 is an example block diagram of a base station 401 and a wireless device 406, as per an aspect of an embodiment of the present disclosure. A communication network 400 may include at least one base station 401 and at least one wireless device 406. The base station 401 may include at least one communication interface 402, at least one processor 403, and at least one set of program code instructions 405 stored in non-transitory memory 404 and executable by the at least one processor 403. The wireless device 406 may include at least one communication interface 407, at least one processor 408, and at least one set of program code instructions 410 stored in non-transitory memory 409 and executable by the at least one processor 408. Communication interface 402 in base station 401 may be configured to engage in communication with communication interface 407 in wireless device 406 via a communication path that includes at least one wireless link 411. Wireless link 411 may be a bi-directional link. Communication interface 407 in wireless device 406 may also be configured to engage in a communication with communication interface 402 in base station 401. Base station 401 and wireless device 406 may be configured to send and receive data over wireless link 411 using multiple frequency carriers. According to aspects of an embodiments, transceiver(s) may be employed. A transceiver is a device that includes both a transmitter and receiver. Transceivers may be employed in devices such as wireless devices, base stations, relay nodes, and/or the like. Example embodiments for radio technology implemented in communication interface 402, 407 and wireless link 411 are illustrated are FIG. 1, FIG. 2, FIG. 3, FIG. 5, and associated text.

An interface may be a hardware interface, a firmware interface, a software interface, and/or a combination thereof. The hardware interface may include connectors, wires, electronic devices such as drivers, amplifiers, and/or the like. A software interface may include code stored in a memory device to implement protocol(s), protocol layers, communication drivers, device drivers, combinations thereof, and/or the like. A firmware interface may include a combination of embedded hardware and code stored in and/or in communication with a memory device to implement connections, electronic device operations, protocol(s), protocol layers, communication drivers, device drivers, hardware operations, combinations thereof, and/or the like.

The term configured may relate to the capacity of a device whether the device is in an operational or non-operational state. Configured may also refer to specific settings in a device that effect the operational characteristics of the device whether the device is in an operational or non-operational state. In other words, the hardware, software, firmware, registers, memory values, and/or the like may be "configured" within a device, whether the device is in an operational or nonoperational state, to provide the device with specific characteristics. Terms such as "a control message to cause in a device" may mean that a control message has parameters that may be used to configure specific characteristics in the device, whether the device is in an operational or non-operational state.

According to various aspects of an embodiment, an LTE network may include a multitude of base stations, providing a user plane PDCP/RLC/MAC/PHY and control plane (RRC) protocol terminations towards the wireless device. The base station(s) may be interconnected with other base station(s) (for example, interconnected employing an X2 interface). Base stations may also be connected employing, for example, an S1 interface to an EPC. For example, base stations may be interconnected to the MME employing the S1-MME interface and to the S-G) employing the S1-U interface. The S1 interface may support a many-to-many relation between MMEs/Serving Gateways and base stations. A base station may include many sectors for example: 1, 2, 3, 4, or 6 sectors. A base station may include many cells, for example, ranging from 1 to 50 cells or more. A cell may be categorized, for example, as a primary cell or secondary cell. At RRC connection establishment/re-establishment/handover, one serving cell may provide the NAS (non-access stratum) mobility information (e.g. TAI), and at RRC connection re-establishment/handover, one serving cell may provide the security input. This cell may be referred to as the Primary Cell (PCell). In the downlink, the carrier corresponding to the PCell may be the Downlink Primary Component Carrier (DL PCC), while in the uplink, the carrier corresponding to the PCell may be the Uplink Primary Component Carrier (UL PCC). Depending on wireless device capabilities, Secondary Cells (SCells) may be configured to form together with the PCell a set of serving cells. In the downlink, the carrier corresponding to an SCell may be a Downlink Secondary Component Carrier (DL SCC), while in the uplink, it may be an Uplink Secondary Component Carrier (UL SCC). An SCell may or may not have an uplink carrier.

A cell, comprising a downlink carrier and optionally an uplink carrier, may be assigned a physical cell ID and a cell index. A carrier (downlink or uplink) may belong to only one cell. The cell ID or Cell index may also identify the downlink carrier or uplink carrier of the cell (depending on the context it is used). In the specification, cell ID may be equally referred to a carrier ID, and cell index may be referred to carrier index. In implementation, the physical cell ID or cell index may be assigned to a cell. A cell ID may be determined using a synchronization signal transmitted on a downlink carrier. A cell index may be determined using RRC messages. For example, when the specification refers to a first physical cell ID for a first downlink carrier, the specification may mean the first physical cell ID is for a cell comprising the first downlink carrier. The same concept may apply, for example, to carrier activation. When the specification indicates that a first carrier is activated, the specification may also mean that the cell comprising the first carrier is activated.

Embodiments may be configured to operate as needed. The disclosed mechanism may be performed when certain criteria are met, for example, in a wireless device, a base station, a radio environment, a network, a combination of the above, and/or the like. Example criteria may be based, at least in part, on for example, traffic load, initial system set up, packet sizes, traffic characteristics, a combination of the above, and/or the like. When the one or more criteria are met, various example embodiments may be applied. Therefore, it may be possible to implement example embodiments that selectively implement disclosed protocols.

A base station may communicate with a mix of wireless devices. Wireless devices may support multiple technologies, and/or multiple releases of the same technology. Wireless devices may have some specific capability(ies) depending on its wireless device category and/or capability(ies). A base station may comprise multiple sectors. When this disclosure refers to a base station communicating with a plurality of wireless devices, this disclosure may refer to a subset of the total wireless devices in a coverage area. This disclosure may refer to, for example, a plurality of wireless devices of a given LTE release with a given capability and in a given sector of the base station. The plurality of wireless devices in this disclosure may refer to a selected plurality of wireless devices, and/or a subset of total wireless devices in a coverage area which perform according to disclosed methods, and/or the like. There may be a plurality of wireless devices in a coverage area that may not comply with the disclosed methods, for example, because those wireless devices perform based on older releases of LTE technology.

Figure 6:
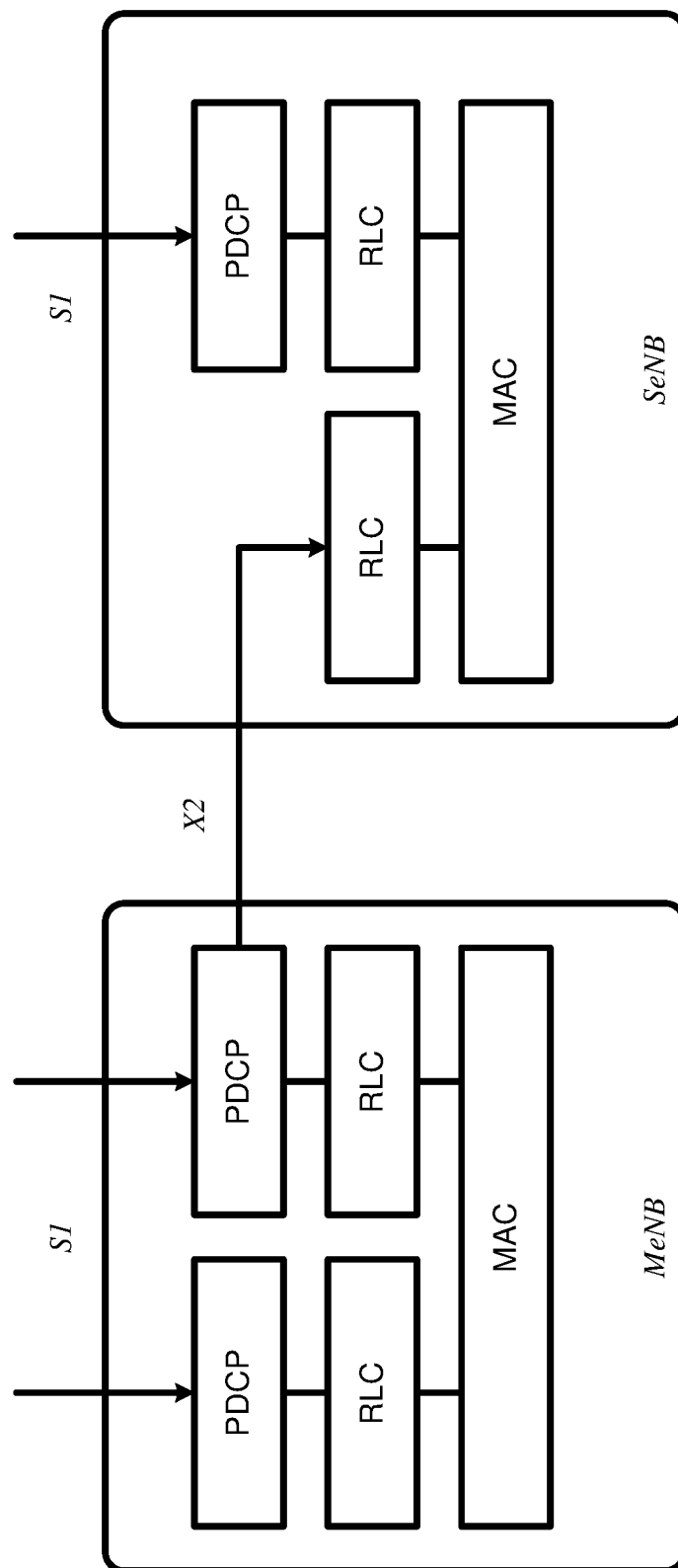
FIG. 6 is an example diagram for a protocol structure with CA and DC as per an aspect of an embodiment of the present disclosure.
Figure 7:
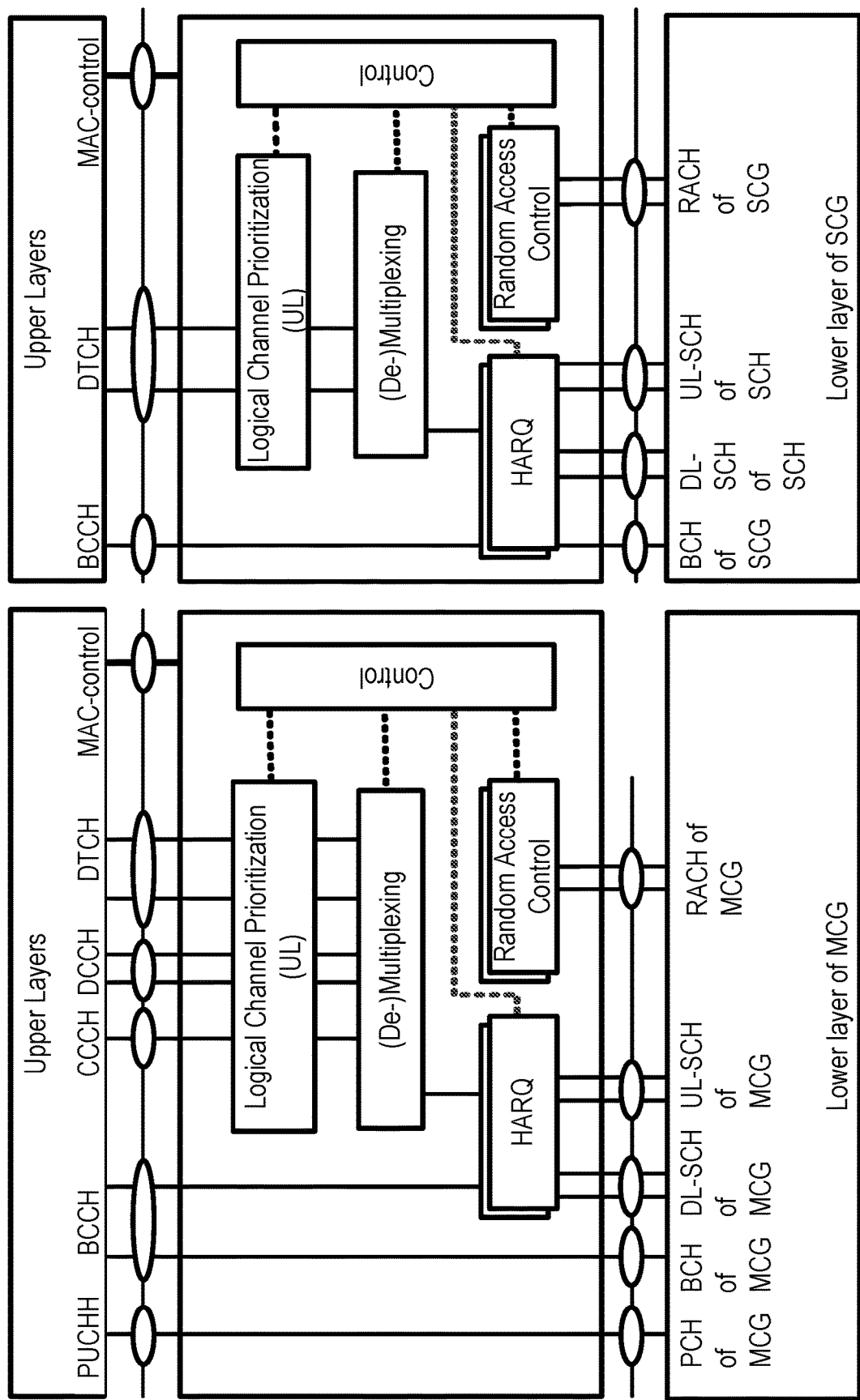
FIG. 7 is an example diagram for a protocol structure with CA and DC as per an aspect of an embodiment of the present disclosure.

FIG. 6 and FIG. 7 are example diagrams for protocol structure with CA and DC as per an aspect of an embodiment of the present disclosure. E-UTRAN may support Dual Connectivity (DC) operation whereby a multiple RX/TX UE in RRC_CONNECTED may be configured to utilize radio resources provided by two schedulers located in two eNBs connected via a non-ideal backhaul over the X2 interface. eNBs involved in DC for a certain UE may assume two different roles: an eNB may either act as an MeNB or as an SeNB. In DC a UE may be connected to one MeNB and one SeNB. Mechanisms implemented in DC may be extended to cover more than two eNBs. FIG. 7 illustrates one example structure for the UE side MAC entities when a Master Cell Group (MCG) and a Secondary Cell Group (SCG) are configured, and it may not restrict implementation. Media Broadcast Multicast Service (MBMS) reception is not shown in this figure for simplicity.

In DC, the radio protocol architecture that a particular bearer uses may depend on how the bearer is setup. Three alternatives may exist, an MCG bearer, an SCG bearer and a split bearer as shown in FIG. 6. RRC may be located in MeNB and SRBs may be configured as a MCG bearer type and may use the radio resources of the MeNB. DC may also be described as having at least one bearer configured to use radio resources provided by the SeNB. DC may or may not be configured/implemented in example embodiments of the disclosure.

In the case of DC, the UE may be configured with two MAC entities: one MAC entity for MeNB, and one MAC entity for SeNB. In DC, the configured set of serving cells for a UE may comprise two subsets: the Master Cell Group (MCG) containing the serving cells of the MeNB, and the Secondary Cell Group (SCG) containing the serving cells of the SeNB. For a SCG, one or more of the following may be applied. At least one cell in the SCG may have a configured UL CC and one of them, named PSCell (or PCell of SCG, or sometimes called PCell), may be configured with PUCCH resources. When the SCG is configured, there may be at least one SCG bearer or one Split bearer. Upon detection of a physical layer problem or a random access problem on a PSCell, or the maximum number of RLC retransmissions has been reached associated with the SCG, or upon detection of an access problem on a PSCell during a SCG addition or a SCG change: a RRC connection re-establishment procedure may not be triggered, UL transmissions towards cells of the SCG may be stopped, and a MeNB may be informed by the UE of a SCG failure type. For split bearer, the DL data transfer over the MeNB may be maintained. The RLC AM bearer may be configured for the split bearer. Like a PCell, a PSCell may not be de-activated. A PSCell may be changed with a SCG change (for example, with a security key change and a RACH procedure), and/or neither a direct bearer type change between a Split bearer and a SCG bearer nor simultaneous configuration of a SCG and a Split bearer may be supported.

With respect to the interaction between a MeNB and a SeNB, one or more of the following principles may be applied. The MeNB may maintain the RRM measurement configuration of the UE and may, (for example, based on received measurement reports or traffic conditions or bearer types), decide to ask a SeNB to provide additional resources (serving cells) for a UE. Upon receiving a request from the MeNB, a SeNB may create a container that may result in the configuration of additional serving cells for the UE (or decide that it has no resource available to do so). For UE capability coordination, the MeNB may provide (part of) the AS configuration and the UE capabilities to the SeNB. The MeNB and the SeNB may exchange information about a UE configuration by employing RRC containers (inter-node messages) carried in X2 messages. The SeNB may initiate a reconfiguration of its existing serving cells (for example, a PUCCH towards the SeNB). The SeNB may decide which cell is the PSCell within the SCG. The MeNB may not change the content of the RRC configuration provided by the SeNB. In the case of a SCG addition and a SCG SCell addition, the MeNB may provide the latest measurement results for the SCG cell(s). Both a MeNB and a SeNB may know the SFN and subframe offset of each other by OAM, (for example, for the purpose of DRX alignment and identification of a measurement gap). In an example, when adding a new SCG SCell, dedicated RRC signaling may be used for sending required system information of the cell as for CA, except for the SFN acquired from a MIB of the PSCell of a SCG.

In an example, serving cells may be grouped in a TA group (TAG). Serving cells in one TAG may use the same timing reference. For a given TAG, user equipment (UE) may use at least one downlink carrier as a timing reference. For a given TAG, a UE may synchronize uplink subframe and frame transmission timing of uplink carriers belonging to the same TAG. In an example, serving cells having an uplink to which the same TA applies may correspond to serving cells hosted by the same receiver. A UE supporting multiple TAs may support two or more TA groups. One TA group may contain the PCell and may be called a primary TAG (pTAG). In a multiple TAG configuration, at least one TA group may not contain the PCell and may be called a secondary TAG (sTAG). In an example, carriers within the same TA group may use the same TA value and/or the same timing reference. When DC is configured, cells belonging to a cell group (MCG or SCG) may be grouped into multiple TAGs including a pTAG and one or more sTAGs.

FIG. 8 shows example TAG configurations as per an aspect of an embodiment of the present disclosure. In Example 1, pTAG comprises a PCell, and an sTAG comprises SCell1. In Example 2, a pTAG comprises a PCell and SCell1, and an sTAG comprises SCell2 and SCell3. In Example 3, pTAG comprises PCell and SCell1, and an sTAG1 includes SCell2 and SCell3, and sTAG2 comprises SCell4. Up to four TAGs may be supported in a cell group (MCG or SCG) and other example TAG configurations may also be provided. In various examples in this disclosure, example mechanisms are described for a pTAG and an sTAG. Some of the example mechanisms may be applied to configurations with multiple sTAGs.

In an example, an eNB may initiate an RA procedure via a PDCCH order for an activated SCell. This PDCCH order may be sent on a scheduling cell of this SCell. When cross carrier scheduling is configured for a cell, the scheduling cell may be different than the cell that is employed for preamble transmission, and the PDCCH order may include an SCell index. At least a non-contention based RA procedure may be supported for SCell(s) assigned to sTAG(s).

Figure 9:
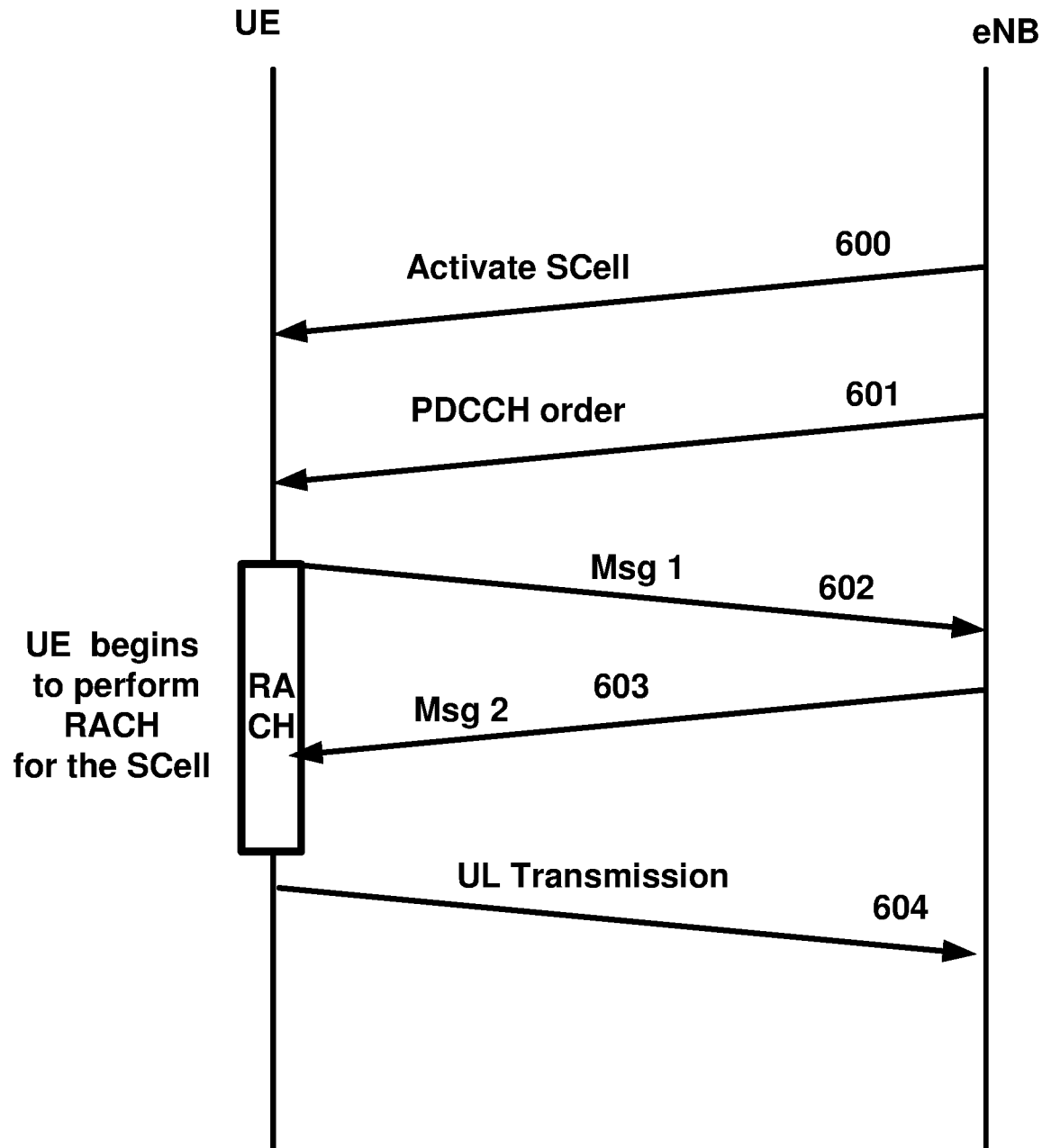
FIG. 9 is an example message flow in a random access process in a secondary TAG as per an aspect of an embodiment of the present disclosure.

FIG. 9 is an example message flow in a random access process in a secondary TAG as per an aspect of an embodiment of the present disclosure. An eNB transmits an activation command 600 to activate an SCell. A preamble 602 (Msg1) may be sent by a UE in response to a PDCCH order 601 on an SCell belonging to an sTAG. In an example embodiment, preamble transmission for SCells may be controlled by the network using PDCCH format 1A. Msg2 message 603 (RAR: random access response) in response to the preamble transmission on the SCell may be addressed to RA-RNTI in a PCell common search space (CSS). Uplink packets 604 may be transmitted on the SCell in which the preamble was transmitted.

According to an embodiment, initial timing alignment may be achieved through a random access procedure. This may involve a UE transmitting a random access preamble and an eNB responding with an initial TA command NTA (amount of timing advance) within a random access response window. The start of the random access preamble may be aligned with the start of a corresponding uplink subframe at the UE assuming NTA=0. The eNB may estimate the uplink timing from the random access preamble transmitted by the UE. The TA command may be derived by the eNB based on the estimation of the difference between the desired UL timing and the actual UL timing. The UE may determine the initial uplink transmission timing relative to the corresponding downlink of the sTAG on which the preamble is transmitted.

The mapping of a serving cell to a TAG may be configured by a serving eNB with RRC signaling. The mechanism for TAG configuration and reconfiguration may be based on RRC signaling. According to various aspects of an embodiment, when an eNB performs an SCell addition configuration, the related TAG configuration may be configured for the SCell. In an example embodiment, an eNB may modify the TAG configuration of an SCell by removing (releasing) the SCell and adding(configuring) a new SCell (with the same physical cell ID and frequency) with an updated TAG ID. The new SCell with the updated TAG ID may initially be inactive subsequent to being assigned the updated TAG ID. The eNB may activate the updated new SCell and start scheduling packets on the activated SCell. In an example implementation, it may not be possible to change the TAG associated with an SCell, but rather, the SCell may need to be removed and a new SCell may need to be added with another TAG. For example, if there is a need to move an SCell from an sTAG to a pTAG, at least one RRC message, (for example, at least one RRC reconfiguration message), may be send to the UE to reconfigure TAG configurations by releasing the SCell and then configuring the SCell as a part of the pTAG. When an SCell is added/configured without a TAG index, the SCell may be explicitly assigned to the pTAG. The PCell may not change its TA group and may be a member of the pTAG.

The purpose of an RRC connection reconfiguration procedure may be to modify an RRC connection, (for example, to establish, modify and/or release RBs, to perform handover, to setup, modify, and/or release measurements, to add, modify, and/or release SCells). If the received RRC Connection Reconfiguration message includes the sCell-ToReleaseList, the UE may perform an SCell release. If the received RRC Connection Reconfiguration message includes the sCellToAddModList, the UE may perform SCell additions or modification.

In LTE Release-10 and Release-11 CA, a PUCCH may only be transmitted on the PCell (PSCell) to an eNB. In LTE-Release 12 and earlier, a UE may transmit PUCCH information on one cell (PCell or PSCell) to a given eNB.

As the number of CA capable UEs and also the number of aggregated carriers increase, the number of PUCCHs and also the PUCCH payload size may increase. Accommodating the PUCCH transmissions on the PCell may lead to a high PUCCH load on the PCell. A PUCCH on an SCell may be introduced to offload the PUCCH resource from the PCell. More than one PUCCH may be configured for example, a PUCCH on a PCell and another PUCCH on an SCell. In the example embodiments, one, two or more cells may be configured with PUCCH resources for transmitting CSI/ACK/NACK to a base station. Cells may be grouped into multiple PUCCH groups, and one or more cell within a group may be configured with a PUCCH. In an example configuration, one SCell may belong to one PUCCH group. SCells with a configured PUCCH transmitted to a base station may be called a PUCCH SCell, and a cell group with a common PUCCH resource transmitted to the same base station may be called a PUCCH group.

In an example embodiment, a MAC entity may have a configurable timer timeAlignmentTimer per TAG. The timeAlignmentTimer may be used to control how long the MAC entity considers the Serving Cells belonging to the associated TAG to be uplink time aligned. The MAC entity may, when a Timing Advance Command MAC control element is received, apply the Timing Advance Command for the indicated TAG; start or restart the timeAlignmentTimer associated with the indicated TAG. The MAC entity may, when a Timing Advance Command is received in a Random Access Response message for a serving cell belonging to a TAG and/or if the Random Access Preamble was not selected by the MAC entity, apply the Timing Advance Command for this TAG and start or restart the timeAlignmentTimer associated with this TAG. Otherwise, if the timeAlignmentTimer associated with this TAG is not running, the Timing Advance Command for this TAG may be applied and the timeAlignmentTimer associated with this TAG started. When the contention resolution is considered not successful, a timeAlignmentTimer associated with this TAG may be stopped. Otherwise, the MAC entity may ignore the received Timing Advance Command.

In example embodiments, a timer is running once it is started, until it is stopped or until it expires; otherwise it may not be running A timer can be started if it is not running or restarted if it is running. For example, a timer may be started or restarted from its initial value.

Example embodiments of the disclosure may enable operation of multi-carrier communications. Other example embodiments may comprise a non-transitory tangible computer readable media comprising instructions executable by one or more processors to cause operation of multi-carrier communications. Yet other example embodiments may comprise an article of manufacture that comprises a non-transitory tangible computer readable machine-accessible medium having instructions encoded thereon for enabling programmable hardware to cause a device (e.g. wireless communicator, UE, base station, etc.) to enable operation of multi-carrier communications. The device may include processors, memory, interfaces, and/or the like. Other example embodiments may comprise communication networks comprising devices such as base stations, wireless devices (or user equipment: UE), servers, switches, antennas, and/or the like.

The amount of data traffic carried over cellular networks is expected to increase for many years to come. The number of users/devices is increasing and each user/device accesses an increasing number and variety of services, e.g. video delivery, large files, images. This may require not only high capacity in the network, but also provisioning very high data rates to meet customers' expectations on interactivity and responsiveness. More spectrum may therefore needed for cellular operators to meet the increasing demand. Considering user expectations of high data rates along with seamless mobility, it may be beneficial that more spectrum be made available for deploying macro cells as well as small cells for cellular systems.

Striving to meet the market demands, there has been increasing interest from operators in deploying some complementary access utilizing unlicensed spectrum to meet the traffic growth. This is exemplified by the large number of operator-deployed Wi-Fi networks and the 3GPP standardization of LTE/WLAN interworking solutions. This interest indicates that unlicensed spectrum, when present, may be an effective complement to licensed spectrum for cellular operators to help addressing the traffic explosion in some scenarios, such as hotspot areas. LAA may offer an alternative for operators to make use of unlicensed spectrum while managing one radio network, thus offering new possibilities for optimizing the network's efficiency.

In an example embodiment, Listen-before-talk (clear channel assessment) may be implemented for transmission in an LAA cell. In a listen-before-talk (LBT) procedure, equipment may apply a clear channel assessment (CCA) check before using the channel. For example, the CCA may utilize at least energy detection to determine the presence or absence of other signals on a channel in order to determine if a channel is occupied or clear, respectively. For example, European and Japanese regulations mandate the usage of LBT in the unlicensed bands. Apart from regulatory requirements, carrier sensing via LBT may be one way for fair sharing of the unlicensed spectrum.

In an example embodiment, discontinuous transmission on an unlicensed carrier with limited maximum transmission duration may be enabled. Some of these functions may be supported by one or more signals to be transmitted from the beginning of a discontinuous LAA downlink transmission. Channel reservation may be enabled by the transmission of signals, by an LAA node, after gaining channel access via a successful LBT operation, so that other nodes that receive the transmitted signal with energy above a certain threshold sense the channel to be occupied. Functions that may need to be supported by one or more signals for LAA operation with discontinuous downlink transmission may include one or more of the following: detection of the LAA downlink transmission (including cell identification) by UEs, time & frequency synchronization of UEs, and/or the like.

In an example embodiment, a DL LAA design may employ subframe boundary alignment according to LTE-A carrier aggregation timing relationships across serving cells aggregated by CA. This may not imply that the eNB transmissions can start only at the subframe boundary. LAA may support transmitting PDSCH when not all OFDM symbols are available for transmission in a subframe according to LBT. Delivery of necessary control information for the PDSCH may also be supported.

An LBT procedure may be employed for fair and friendly coexistence of LAA with other operators and technologies operating in an unlicensed spectrum. LBT procedures on a node attempting to transmit on a carrier in an unlicensed spectrum may require the node to perform a clear channel assessment to determine if the channel is free for use. An LBT procedure may involve at least energy detection to determine if the channel is being used. For example, regulatory requirements in some regions, for example, in Europe, may specify an energy detection threshold such that if a node receives energy greater than this threshold, the node assumes that the channel is not free. While nodes may follow such regulatory requirements, a node may optionally use a lower threshold for energy detection than that specified by regulatory requirements. In an example, LAA may employ a mechanism to adaptively change the energy detection threshold. For example, LAA may employ a mechanism to adaptively lower the energy detection threshold from an upper bound. Adaptation mechanism(s) may not preclude static or semi-static setting of the threshold. In an example a Category 4 LBT mechanism or other type of LBT mechanisms may be implemented.

Various example LBT mechanisms may be implemented. In an example, for some signals, in some implementation scenarios, in some situations, and/or in some frequencies, no LBT procedure may performed by the transmitting entity. In an example, Category 2 (for example, LBT without random back-off) may be implemented. The duration of time that the channel is sensed to be idle before the transmitting entity transmits may be deterministic. In an example, Category 3 (for example, LBT with random back-off with a contention window of fixed size) may be implemented. The LBT procedure may have the following procedure as one of its components. The transmitting entity may draw a random number N within a contention window. The size of the contention window may be specified by the minimum and maximum value of N. The size of the contention window may be fixed. The random number N may be employed in the LBT procedure to determine the duration of time that the channel is sensed to be idle before the transmitting entity transmits on the channel. In an example, Category 4 (for example, LBT with random back-off with a contention window of variable size) may be implemented. The transmitting entity may draw a random number N within a contention window. The size of the contention window may be specified by a minimum and maximum value of N. The transmitting entity may vary the size of the contention window when drawing the random number N. The random number N may be employed in the LBT procedure to determine the duration of time that the channel is sensed to be idle before the transmitting entity transmits on the channel.

LAA may employ uplink LBT at the UE. The UL LBT scheme may be different from the DL LBT scheme (for example, by using different LBT mechanisms or parameters), since the LAA UL may be based on scheduled access which affects a UE's channel contention opportunities. Other considerations motivating a different UL LBT scheme include, but are not limited to, multiplexing of multiple UEs in a single subframe.

In an example, a DL transmission burst may be a continuous transmission from a DL transmitting node with no transmission immediately before or after from the same node on the same CC. A UL transmission burst from a UE perspective may be a continuous transmission from a UE with no transmission immediately before or after from the same UE on the same CC. In an example, a UL transmission burst may be defined from a UE perspective. In an example, a UL transmission burst may be defined from an eNB perspective. In an example, in case of an eNB operating DL+UL LAA over the same unlicensed carrier, DL transmission burst(s) and UL transmission burst(s) on LAA may be scheduled in a TDM manner over the same unlicensed carrier. For example, an instant in time may be part of a DL transmission burst or an UL transmission burst.

Figure 10:
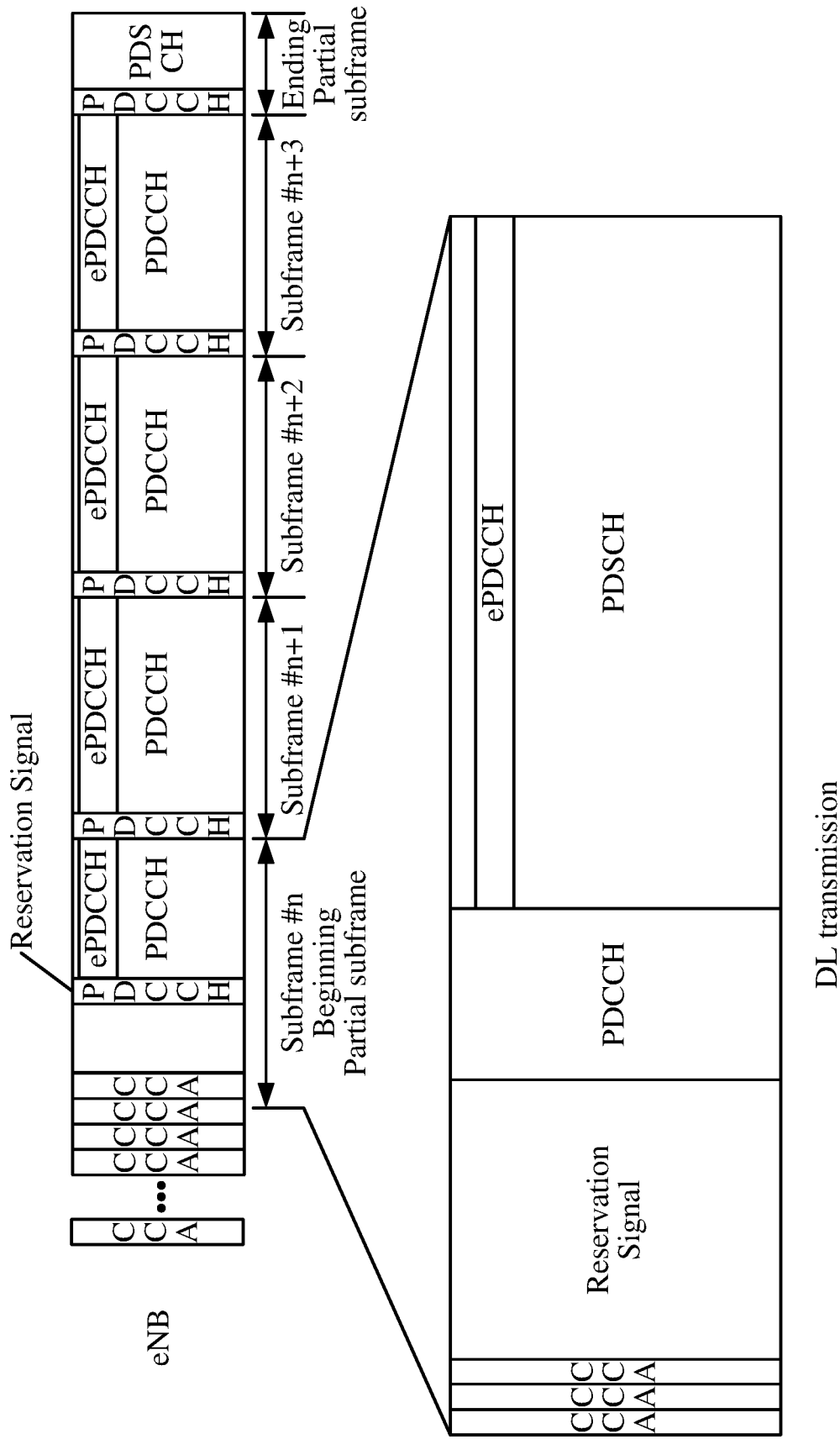
FIG. 10 is an example diagram depicting a downlink burst as per an aspect of an embodiment of the present disclosure.

In an example embodiment, in an unlicensed cell, a downlink burst may be started in a subframe. When an eNB accesses the channel, the eNB may transmit for a duration of one or more subframes. The duration may depend on a maximum configured burst duration in an eNB, the data available for transmission, and/or eNB scheduling algorithm. FIG. 10 shows an example downlink burst in an unlicensed (e.g. licensed assisted access) cell. The maximum configured burst duration in the example embodiment may be configured in the eNB. An eNB may transmit the maximum configured burst duration to a UE employing an RRC configuration message.

The wireless device may receive from a base station at least one message (for example, an RRC) comprising configuration parameters of a plurality of cells. The plurality of cells may comprise at least one license cell and at least one unlicensed (for example, an LAA cell). The configuration parameters of a cell may, for example, comprise configuration parameters for physical channels, (for example, a ePDCCH, PDSCH, PUSCH, PUCCH and/or the like).

An enhanced frame structure type 3 may be applicable to LAA secondary cell operation. LAA cells may employ normal cyclic prefix. In an example, a radio frame may be $T_f=307200 \cdot T_s=10$ ms long and comprises of 20 slots of length $T_{slot}=15360 \cdot T_s=0.5$ ms, numbered from 0 to 19. A subframe may be defined as two consecutive slots where subframe i comprises of slots $2i$ and $2i+1$.

Figure 12:
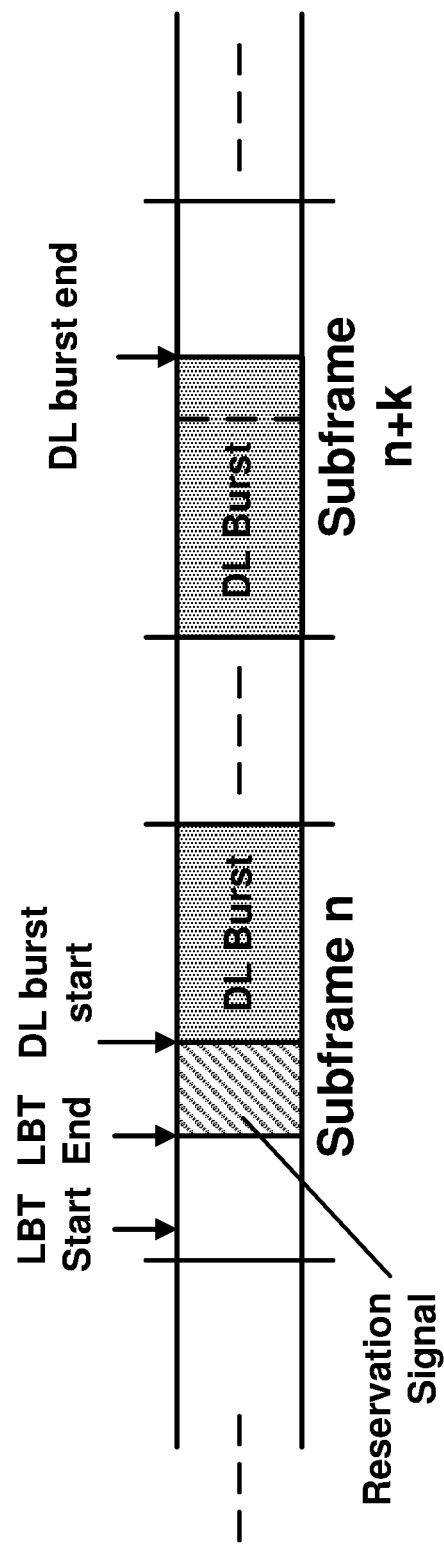
FIG. 12 is a diagram depicting an example listen before talk (LBT) procedure as per an aspect of an embodiment of the present disclosure.

The 10 subframes within a radio frame may be available for downlink transmissions. Downlink transmissions may occupy one or more consecutive subframes, starting anywhere within a subframe and ending with the last subframe either fully occupied or following one of the DwPTS durations in the table in FIG. 11 and downlink transmission in FIG. 12.

In an enhanced frame structure type 3 (equally may be called "frame structure type 3"), a subframe may be used for uplink transmission. An eNB operating LAA SCell(s) may configure and/or activate multiple LAA SCells for downlink and/or uplink transmissions. Example embodiments of the invention describes methods and systems for multi-carrier LBT in uplink and/or downlink of LAA.

As described in the specification, cells may be grouped. Mechanisms described in example embodiments may be applicable to cells in a group of one or more cell groups. For example, the timings related to UL transmissions, reservation signals, downlink signal reception and LBT process may be separately applied to cells of different groups. For example, LBT thresholds of a first cell in a first cell group may be configured (or adjusted) based on other transmissions of a second cell in the same cell group. For example, LBT thresholds of a first cell in a first cell group may be independent or follow a different rule when other transmissions of a second cell of a different group. Some of the example embodiments shown below are illustrated for cells in one cell group. The examples may be applied to multiple groups considering that the mechanisms in one cell group may not change the operations of cells of another cell group or may change (based on a different mechanism) the operations of cells of another cell group. For example, an uplink transmission in a first cell of a first cell group may cause a change in uplink LBT threshold and/or timing in a second cell in the first cell group, may impact the LBT threshold and/or timing differently for a third cell of a second group, or may not impact the LBT threshold and/or timing differently for a third cell of a second group.

The eNB may transmit one or more RRC message to a wireless device including parameters of LAA cells and group parameters. In an example, an RRC message may have grouping information. The RRC message may assign a cell to a cell group. For example, the RRC configuration parameters for a cell may include a group index assigning the cell to a group. In an example, the RRC message may comprise parameters on threshold and/or timing adjustment of LBT processes of different cells. For example, a first parameter may indicate a first adjustment for LBT of a first cell when other cells in the same group are transmitting. For example, a second parameter may indicate a second adjustment for LBT of a first cell when other cells in a different cell group are transmitting. In an example, an eNB may transmit to a UE an RRC message comprising one or more LBT configuration parameters of an LAA cell. The one or more LBT configuration parameters may comprise an LBT energy detection threshold offset value employed for adjusting an LBT threshold value. The UE may employ the offset value to offset a default maximum energy detection threshold value. The LBT threshold value may be employed by the UE to perform an LBT procedure and determine whether the channel is clear. In an example, the UE may perform an LBT procedure in response to receiving an uplink DCI from the eNB for transmission of one or more transport blocks. The UE may transmit one or more transport blocks when the LBT indicates a clear channel.

Example embodiments describe LBT mechanism, reservation signals, and uplink/downlink transmissions when multiple LAA cells are configured and activated. Example embodiments below are described for cells in a cell group of one or more cell groups.

The eNB may schedule the UE through self-scheduling (e.g., eNB may transmit the uplink grant(s) on the same carrier(s) that is(are) being scheduled) or through cross-carrier scheduling (e.g., eNB may transmit the uplink grant (s) on a licensed scheduling carrier).

Subframe timings shown in the diagrams may be the uplink subframe timing. It is understood that downlink subframe timing may be different due to N_TA adjustments.

Figure 13:
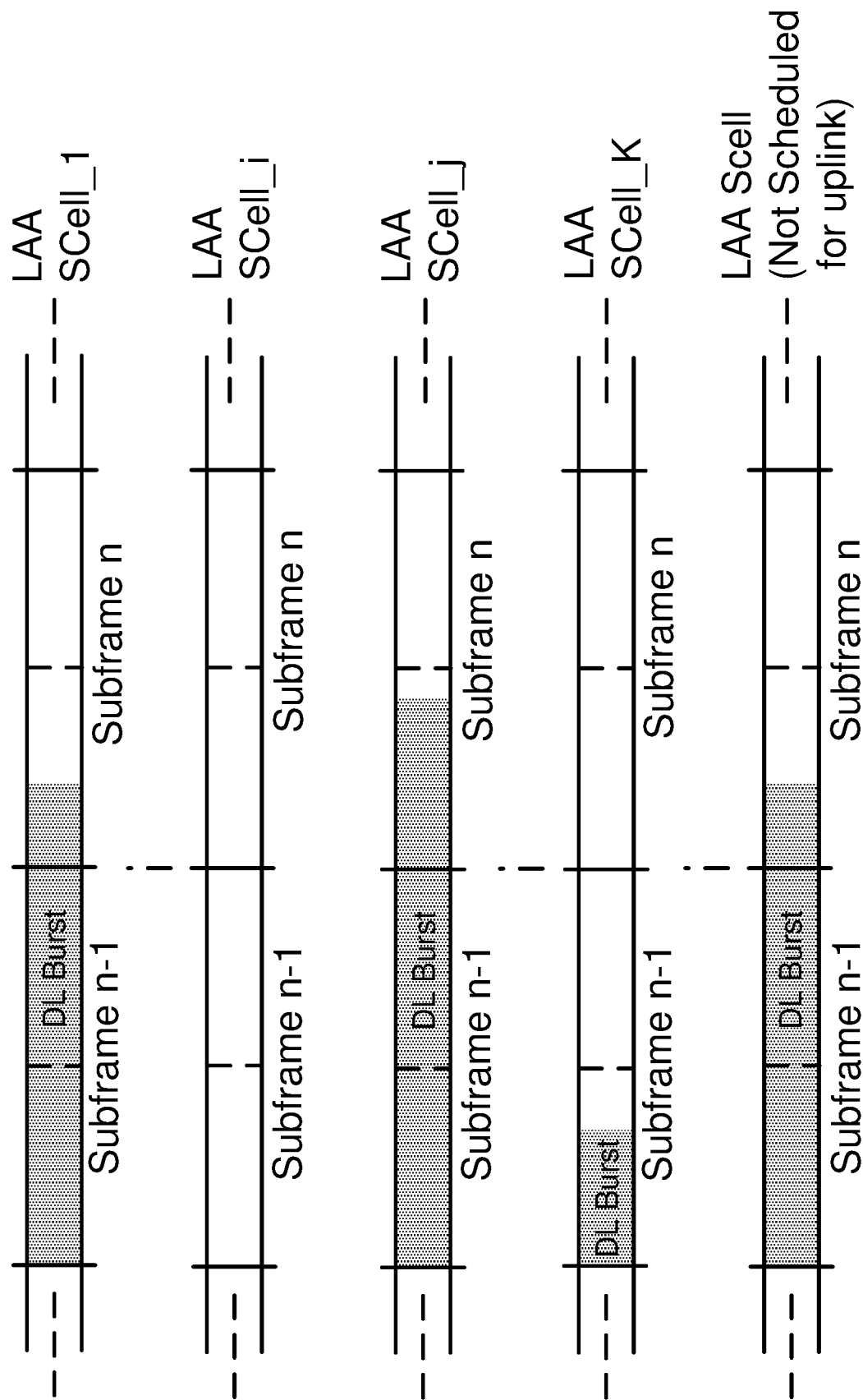
FIG. 13 is a diagram depicting an example multicarrier LBT procedure as per an aspect of an embodiment of the present disclosure.

An eNB may schedule a UE on K LAA SCells [SCell_1, . . . , SCell_K] at subframe n. The downlink transmissions on the scheduled LAA SCells may end at different times. For example, the downlink transmissions on SCell_i may end first and the downlink transmission on SCell_j may end last on or before subframe n (i≠j; 1≤i, j≤K). One or more cells may not have any downlink transmissions in one or more subframes before subframe n. In addition, there may be downlink transmissions on other LAA SCells that may not be scheduled for uplink transmission at subframe n. An example is shown in FIG. 13.

Due to hardware limitation, downlink on a LAA SCell may be disrupted by uplink transmission on any or a subset of the K scheduled LAA SCells. This limitation may be due to leakage of energy from uplink transmission of an LAA carrier on the received downlink signals of other LAA carriers.

Due to the above limitation, UE may start uplink transmission on a LAA SCell after downlink transmissions on all of or a subset of the K LAA SCells or other LAA SCells that may not be scheduled for uplink transmission end. For example, downlink transmission on all of or a subset of the K LAA SCells and/or other LAA SCells that have not been scheduled for uplink at subframe n may need to end before uplink transmission on any of the K LAA SCells could start at subframe n. In the example in FIG. 13, uplink transmission on any of the K scheduled carriers may start at subframe n after downlink burst on LAA SCell_j ends. In some other example (not shown here) downlink transmission on the cells may end before subframe n, and subframe n may be available to an uplink transmission (if LBT indicates a clear channel).

In addition, there may be constraints on the starting position(s) of an uplink reservation signal and/or data/control in a subframe. For example, allowed starting symbols for an uplink data/control transmission may be symbols 0 and 7 (slot boundaries). For example, allowed starting symbols for an uplink data/control transmission may be symbols 1 and 7. An eNB may transmit an RRC message comprising parameters indicating the allowed starting symbols for uplink transmissions of data/control in a subframe.

In an example, a UE may be able to transmit an uplink reservation signal on one or more cells to reserve the channel for uplink data/control transmission. In an example embodiment, reservation signal configuration parameters may include allowed starting positions, power, duration, format, RBs, and/or threshold parameters. An RRC message may include one more parameters indicating one or more of the reservation signal parameters.

These constraints (DL transmissions and/or configuration parameters) may limit the starting position of an uplink burst and/or the LBT process for uplink transmissions in a subframe. In one example, partial uplink subframe may start at the slot boundary. In another example, uplink partial subframe may start at one of several positions within a subframe.

A UE may transmit uplink transmission on any of the K scheduled LAA carriers after UE completes LBT on those carriers.

Figure 14:
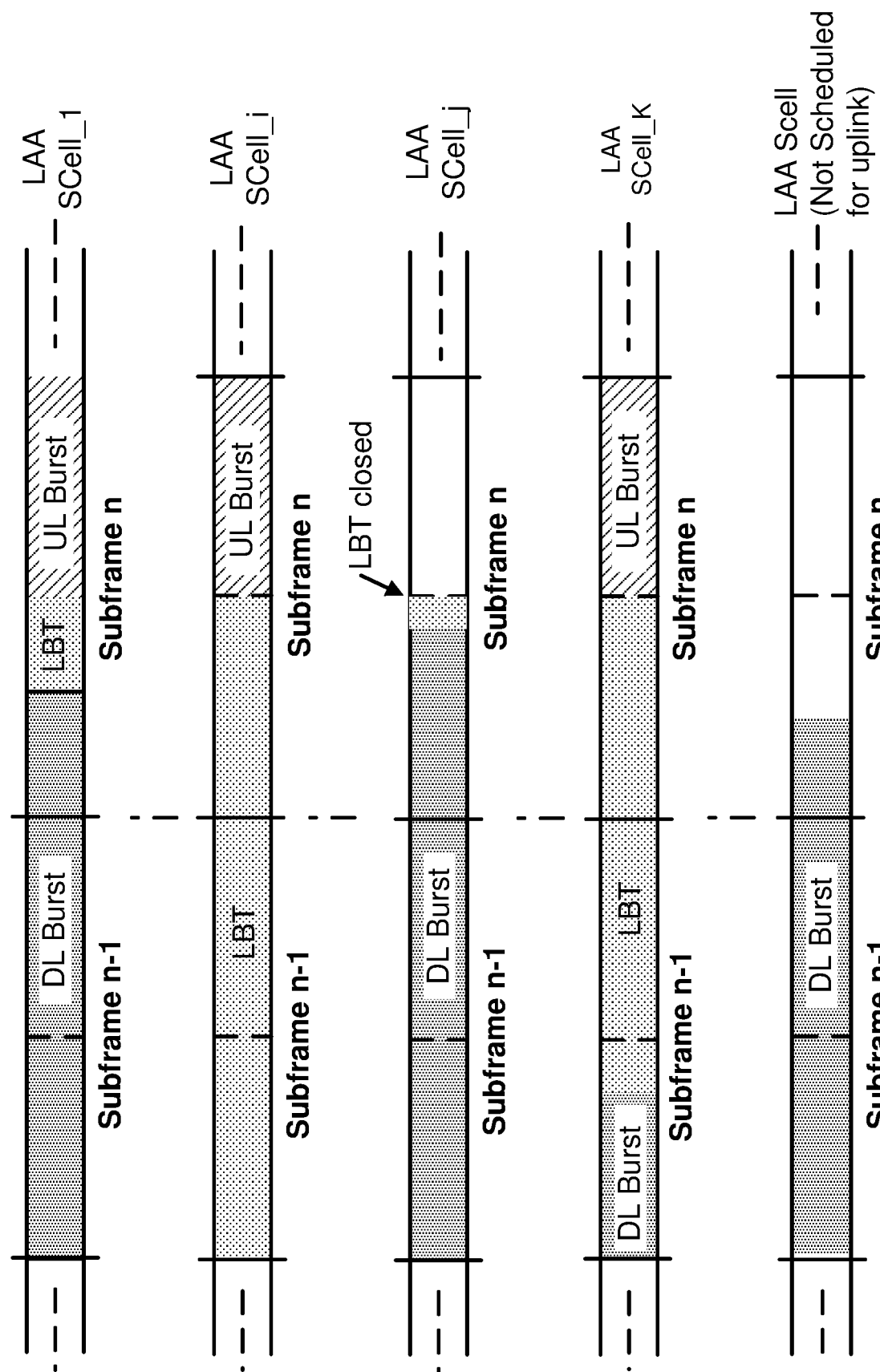
FIG. 14 is a diagram depicting an example multicarrier LBT procedure as per an aspect of an embodiment of the present disclosure.

In an example embodiment, a UE may start LBT on different carriers (on or before subframe n) at different times. For example, an uplink LBT on a carrier may start after the downlink data/control transmission on that carrier ends. A UE may continue listening and monitoring the channel status until it transmits on the carrier. An example is shown in FIG. 14.

In an example embodiment, a UE may start an LBT on different carriers (on or before subframe n) substantially at the same time. For example, an uplink LBT on carriers may start after the downlink data/control transmission on the carrier's end. A UE may continue listening and monitoring the channel status until it transmits on the carrier (See FIG. 15). The process in FIG. 15 may allow an LBT may start at a later time (e.g., after completion of downlink burst on all of the carriers). In an example and depending on the implemented LBT mechanism, an LBT may indicate a clear channel for less number of carriers compared to option in FIG. 14, for example when LBT duration is a random value.

Figure 15:
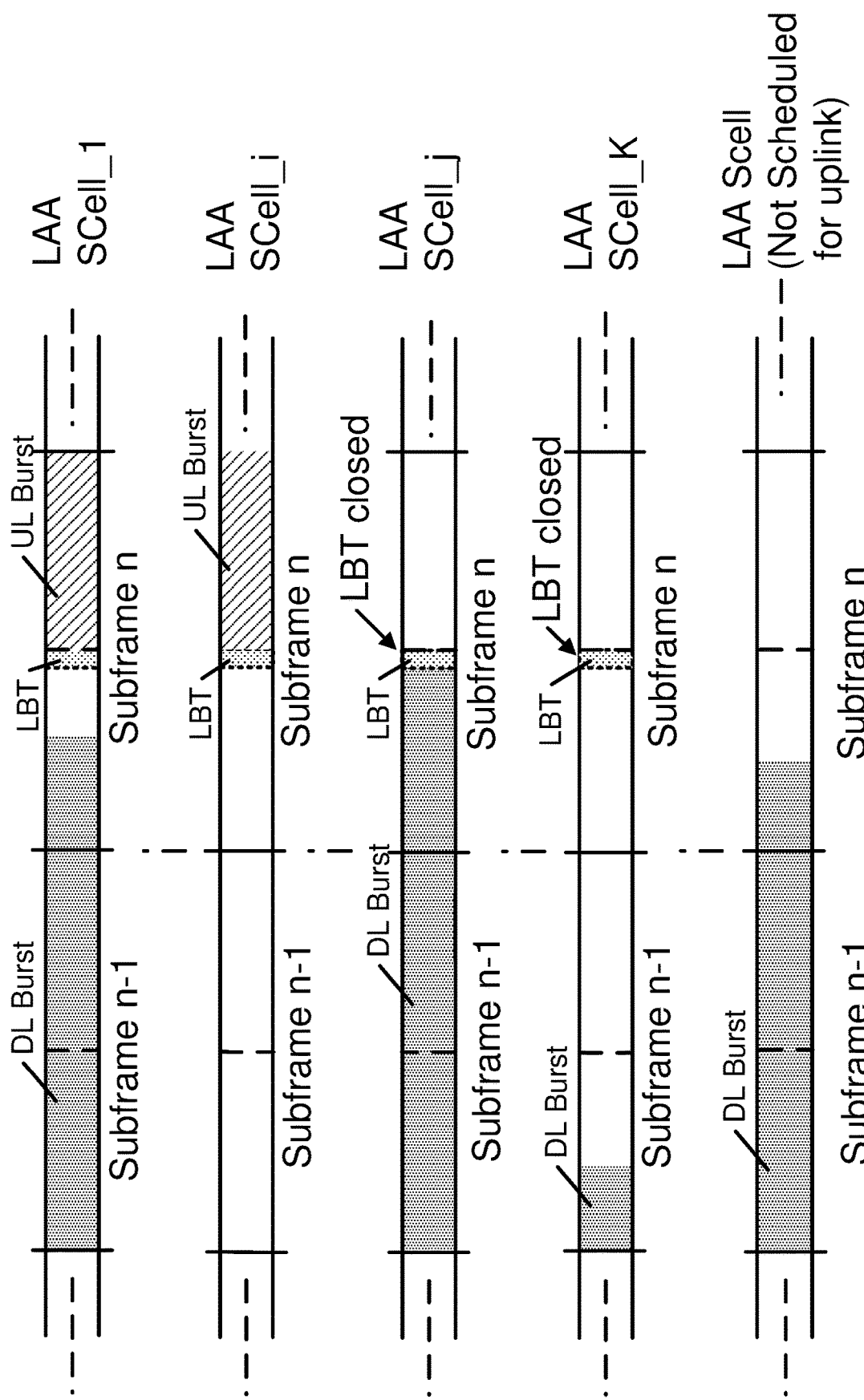
FIG. 15 is a diagram depicting an example multicarrier LBT procedure as per an aspect of an embodiment of the present disclosure.

In an example embodiment, for the scheduled carriers for which uplink data transmission lead to disruption on any of the carriers with ongoing downlink, LBT on a carrier may start after the UE receiving downlink burst ends on any of the carriers with ongoing downlink. An example is shown in FIG. 15.

In an example embodiment, no reservation signal may be transmitted and transmission of uplink data/control signals on different cells may start at the same symbol in a subframe. The transmission may start at a first allowed symbol (e.g., partial or full uplink subframe). For example, the UE may continue the LBT process on the carriers until LBT indicates a clear channel on one or more cells. In an implementation, a UE may continue an LBT for transmission in subframe n until the K scheduled cells indicate a clear channel for transmission of a partial or full subframe in subframe n. In an implementation, the UE may continue LBT for transmission in subframe n until the one or more scheduled cells indicate a clear channel for transmission of a partial or full subframe in subframe n starting from an allowed starting symbol. The allowed starting symbol may be the first allowed starting symbol in a subframe, the last allowed starting symbol in a subframe, the slot boundary, and/or the like. When an LBT for a cell does not indicate a clear channel before the allowed starting symbol, the UE may not transmit uplink data/control signals in subframe n in that cell.

In an example embodiment, no reservation signal may be transmitted and transmission of uplink data/control signals on different cells may be allowed to start at the same symbol or different symbols in a subframe. The transmission may start at a first allowed symbol (e.g., partial or full uplink subframe). For example, the UE may continue the LBT process on the carriers until an LBT indicates a clear channel on one or more cells. In an implementation, the UE may continue an LBT for transmission in subframe n until the LBT on the cell indicates a clear channel for transmission of a partial or full subframe in subframe n starting from an allowed starting symbol. When an LBT for a cell does not indicate a clear channel before the last allowed starting symbol, the UE may not transmit uplink data/control signals in subframe n in that cell. In this example, the UE may start uplink transmission of data/control in different subframe at different symbols. In an implementation, the LBT timing, process, and/or threshold of a first cell may be updated when an LBT is performed on the first cell and a second cell already started uplink transmission.

In an example embodiment, transmission of a reservation signal may be allowed so that a UE can reserve a channel when an LBT indicates a clear channel and before data/control transmission. Transmission of uplink reservation signals on different cells may start substantially at the same time (e.g., at the same symbol) in a subframe. The transmission may start at a first allowed symbol (e.g., partial or full uplink subframe). For example, the UE may continue the LBT process on the carriers until an LBT indicates a clear channel on one or more cells. Reservation signal configuration parameters may include allowed starting positions, power, duration, format, RBs, and/or threshold parameters. The starting time of reservation signal transmission may depend on reservation signal parameters. In an implementation, a UE may continue an LBT for transmission in subframe n until the K scheduled cells indicate a clear channel for transmission of a partial or full subframe in subframe n. In an implementation, the UE may continue an LBT for transmission in subframe n until the one or more scheduled cells indicate a clear channel for transmission of a partial or full subframe in subframe n starting from an allowed starting symbol. The allowed starting symbol may be the first allowed starting symbol in a subframe, the last allowed starting symbol in a subframe, the slot boundary, and/or the like. When an LBT for a cell does not indicate a clear channel before the allowed starting symbol, the UE may not transmit uplink reservation, and/or data/control signals in subframe n in that cell. A UE may transmit data/control signal after transmission of a reservation signal in subframe of a cell. A UE may start transmission of data/control from a first allowed symbol after transmission of a reservation signal. Transmission timing of data/control may start at the same symbol in different cells. Transmission timing of data/control at different cells may start at different starting symbols depending on cell configuration parameters. For example, different cells may have different allowed starting symbol configuration.

In an example embodiment, transmission of a reservation signal may be allowed so that a UE can reserve a channel when LBT indicates a clear channel and before data/control transmission. Transmission of uplink reservation signals on different cells may be allowed to start at the same time (e.g., at the same symbol, at the same time position) or at different times in a subframe. The transmission may start at a first allowed symbol (e.g., partial or full uplink subframe). For example, the UE may continue the LBT process on the carriers until the LBT indicates a clear channel on one or more cells. In an implementation, the UE may continue an LBT for transmission in subframe n until an LBT on the cell indicates a clear channel for transmission of a partial or full subframe in subframe n starting from an allowed starting-symbol/starting-time. Reservation signal configuration parameters may include allowed starting time positions, power, duration, format, RBs, and/or threshold parameters. The starting time of reservation signal transmission may depend on reservation signal parameters. When an LBT for a cell does not indicate a clear channel before the last allowed starting symbol, the UE may not transmit uplink reservation and/or data/control signals in subframe n in that cell. In this example, the UE may start uplink transmission of reservation signals in different subframes at different times (e.g. different symbols). In an implementation, the LBT timing, process, and/or threshold of a first cell may be updated when LBT is performed on the first cell and a second cell already started uplink transmission. A UE may transmit data/control signal after transmission of a reservation signal in subframe of a cell. A UE may start transmission of data/control from a first allowed symbol after transmission of a reservation signal. Transmission timing of data/control may start at the same symbol/time in different cells. Transmission timing of data/control at different cells may start at different starting symbols/times depending on cell configuration parameters. For example, different cells may have different allowed starting symbol and/or time configuration.

In an example embodiment, a UE may start transmission on one or more SCells that have completed an LBT at a first time within subframe n. After uplink transmission on carriers that have completed an LBT, the LBT may no longer indicate a clear channel for the other scheduled carriers due to energy leakage from ongoing uplink transmissions, and if the LBT threshold remain the same. UE may stop an LBT and may no longer transmit uplink signals in a subframe of a cell when uplink transmission on another cell has already started. This may imply that transmission on different cells may start at the same time (e.g. the same symbol). A UE may not transmit uplink signals on one or more cells when an LBT does not indicate a clear channel.

In an example embodiment, a UE may continue LBT on a cell when uplink transmission on another cell already started. A UE may employ an updated LBT process when transmission on another cell already started. The updated LBT process may include an updated detection mechanism, timing and threshold. For example, the updated LBT process may include some signal/interference cancelation mechanism taking into account the signals already being transmitted on other cells. The UE may know the signal, its power, wave shaping, etc. and may be able to consider this in its LBT process. Signal leakage of one or more cells may be cancelled to some degree. A UE may use a higher energy detection threshold for an LBT on scheduled carriers when another carrier is already transmitting. For example, if UE transmits on L out of K scheduled LAA SCells, the UE may continue an LBT on other scheduled carriers and adjust as much as $L \times \Delta_{uplink}$ dBm the energy detection threshold for LBT on the other carriers where $\Delta_{uplink}$ is energy detection threshold offset when uplink transmission on a single adjacent carrier is ongoing. In an example, the UE may change one or more LBT timing parameters or counter values for an updated LBT process. An RRC message may include one or more parameters indicating parameters of the updated LBT process. For example, one or more parameters may indicate a threshold adjustment parameter when another cell is transmitting data/control signals. One or more parameters may indicate a threshold adjustment parameter when another cell is transmitting reservation signals. Adjustment factors may depend on the number already transmitting cells. One or more parameters may indicate one or more timer values and/or one or more counter values of the updated LBT process. An RRC parameter $\Delta_{uplink}$ may be configurable by an eNB and through RRC configuration.

In an example embodiment, a UE may receive an uplink grant for transmission of uplink signals in subframe n+k (k>0) for a cell when the UE has already started transmission in prior subframes on another cell. The UE may employ the updated LBT process to start LBT for transmission in subframe n+k.

In a multi-carrier LBT process, the UE may start an LBT earlier on a lead LAA cell compared with other LAA cells. In an example, a UE may select (e g uniformly randomly) a cell from a plurality of cells in a group as a lead cell. A UE may start a first LBT process on the lead cell earlier, and after the first LBT process on the lead cell meets certain criteria, then the UE may start a second LBT process on other cells. The criteria for example, may be based on detecting no interference/signal during a one or more time durations, and/or a counter reaching certain value. The first LBT process may be different than the second LBT process. For example, the first LBT process may require a longer LBT period than the second LBT process. The second LBT process may include less number monitoring time intervals and/or shorter monitoring time intervals. The first LBT process may include a different threshold values compared with the second LBT process (for example a lower threshold). An RRC message may include one or more configuration parameters of the first LBT and/or second LBT.

In an example embodiment, the lead cell may be selected by UE according to a predefined rule. For example, the lead cell may be randomly selected (e.g. uniformly randomly), or be the cell with the lowest cell index. In an example, the eNB may indicate the lead cell to the UE along with the physical layer grant or other physical layer signals. The eNB may indicate the lead cell in a group via RRC message.

An eNB may access multiple channels on which LAA Scell(s) transmission(s) are performed. As described in the specification, cells may be grouped. Mechanisms described in example embodiments may be applicable to cells in a group of one or more cell groups. For example, the timings related to DL transmissions, reservation signals, and LBT process may be separately applied to cells of different groups. For example, LBT thresholds of a first cell in a first cell group may be adjusted based on other transmissions of a second cell in the same cell group. For example, LBT thresholds of a first cell in a first cell group may be independent or follow a different rule when other transmissions of a second cell of a different group. Some of the example embodiments shown below are illustrated for cells in one cell group. The examples may be applied to multiple groups considering that the mechanisms in one cell group may not change the operations of cells of another cell group or may change (based on a different mechanism) the operations of cells of another cell group. For example, a downlink transmission in a first cell of a first cell group may cause a change in downlink LBT threshold and/or timing in a second cell in the first cell group, may impact the LBT threshold and/or timing differently for a third cell of a second group, or may not impact the LBT threshold and/or timing differently for a third cell of a second group.

Two types of multi-carrier downlink channel access using one of the Type A or Type B procedures described below may be used.

Based on type A procedure, the eNB may perform channel access on each channel $c_i \in C$, where C is a set of channels (cells) in a cell group on which the eNB intends to transmit, and i=0,1, ... q−1, and q is the number of channels in a cell group on which the eNB intends to transmit. Based on type A procedure, the channel access on each channel $c_i \in C$ may be based on the following procedure. The eNB may transmit a transmission including PDSCH on a channel after sensing the channel to be idle during the slot durations of a defer duration $T_d$; and after the counter N is zero in Action 4 below. For example, the counter N may be adjusted by sensing the channel for additional slot duration(s) according to the Actions below:

1) set $N=N_{init}$, where $N_{init}$ is a random number uniformly distributed between 0 and $CW_p$; $CW_p$ is the contention window size for priority class p.
2) if N>0 and the eNB chooses to decrement the counter, set N=N−1.
3) sense the channel for an additional slot duration, and if the additional slot duration is idle, go to Action 4; else, go to Action 5.
4) if N=0, stop; else, go to Action 2.
5) sense the channel during the slot durations of an additional defer duration $T_d$.
6) if the channel is sensed to be idle during the slot durations of the additional defer duration $T_d$, go to Action 2; else, go to Action 5.

Based on type A multi-carrier channel access, the counter N may be determined independently for each channel $c_i$ and may be denoted as $N_{c_i}$. Alternatively, N may be determined for channel $c_j \in C$ where $c_j$ is the channel that has the largest $CW_p$ value and for each channel $c_i$, we may have $N_{c_i}=N_{c_j}$.

The channels may be grouped in multiple cell groups. The mechanisms described in the embodiments may be separately applicable to cells in a cell group of one or more cell groups. C is the set of cells in a cell group wherein eNB transmits to q cells in C. In an example, a second cell group may include a different set of cells D, in which eNB intends to transmit on p cells.

Based on type B multi-carrier channel access, a channel $c_j \in C$ may be selected by the eNB as follows: the eNB may select $c_j$ by uniformly randomly choosing $c_j$ from C before each transmission on multiple channels $c_i \in C$ or the eNB may select $c_j$ no more frequently than once every 1 second, where C is a set of channels on which the eNB intends to transmit, i=0,1, ... q−1, and q is the number of channels on which the eNB intends to transmit.

To transmit on channel $c_j$, the eNB may perform channel access on channel $c_j$ according to the procedures described above based on Actions 1-6.

To transmit on channel $c_i \neq c_j$, $c_i \in C$, for each channel $c_i$, the eNB may sense the channel $c_i$ for at least a sensing interval $T_{mc}=25$ us immediately before the transmitting on channel $c_j$, and the eNB may transmit on channel $c_i$ immediately after sensing the channel $c_i$, if the power detected by the eNB on channel $c_i$ during $T_{mc}$ is less than energy detection threshold.

Based on type B multi-carrier channel access procedure, LBT on multiple LAA carriers may complete at the same time and eNB may transmit data on all of the LAA carriers at the same time. Based on type A multi-carrier channel access procedure, LBT on multiple LAA carriers may not complete at the same time and therefore transmission on different LAA carriers may not start at the same time.

When LBT on multiple LAA carriers complete at different times and downlink transmission on different LAA carriers do not start at the same time, it is possible that downlink transmission on one or more LAA carriers lead to inaccurate LBT on the other carriers.

In one example embodiment, eNB may apply self-deferral on carriers that complete LBT earlier so that the transmission time on different carriers are aligned.

The example embodiments may be implemented for each cell group and access process may be independently managed for each cell group.

In one example embodiment, eNB may transmit on a carrier after LBT on the carrier indicates a clear channel. The eNB may continue an LBT on a cell, using an updated LBT process, when downlink transmission on another cell already started. The updated LBT process may include an updated detection mechanism, timing and threshold. For example, the updated LBT process may include some signal/interference cancelation mechanism taking into account the signals already being transmitted on other cells. The eNB knows the signal, its power, wave shaping, etc. and may be able to consider this in its LBT process. Signal leakage of one or more cells may be cancelled to some degree. An eNB may use higher energy detection threshold for LBT on a carrier when another carrier is already transmitting. For example, for other carrier(s) for which LBT is still ongoing, the eNB may consider adding an energy detection threshold offset $\Delta_{downlink}$ for any carrier with ongoing transmission that start earlier and lead to leaked energy to the other carrier(s) for which LBT is still ongoing.

Figure 16:
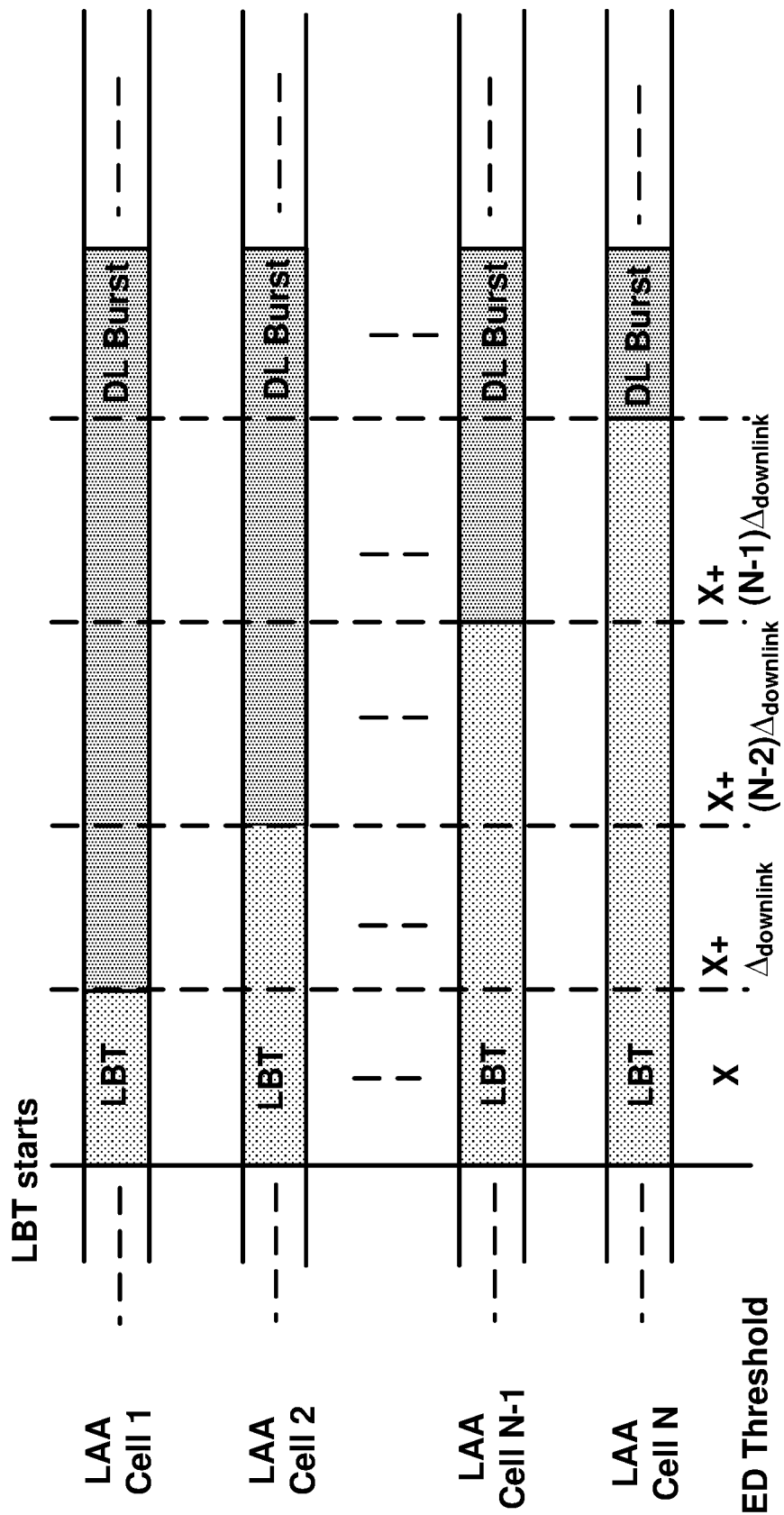
FIG. 16 is an example diagram depicting energy detection threshold adaptation as per an aspect of an embodiment of the present disclosure.

An example embodiment is shown in FIG. 16 where the LAA carriers 1 to N are sorted according to the times that their LBT opens. The energy detection (ED) threshold used for an LBT on any carrier may be dynamically offset as much as $L \times \Delta_{downlink}$ if L downlink transmission on L adjacent carriers start earlier. In this example, X is the energy detection threshold when no ongoing downlink transmission on adjacent carriers that lead to energy leakage takes place.

Figure 17:
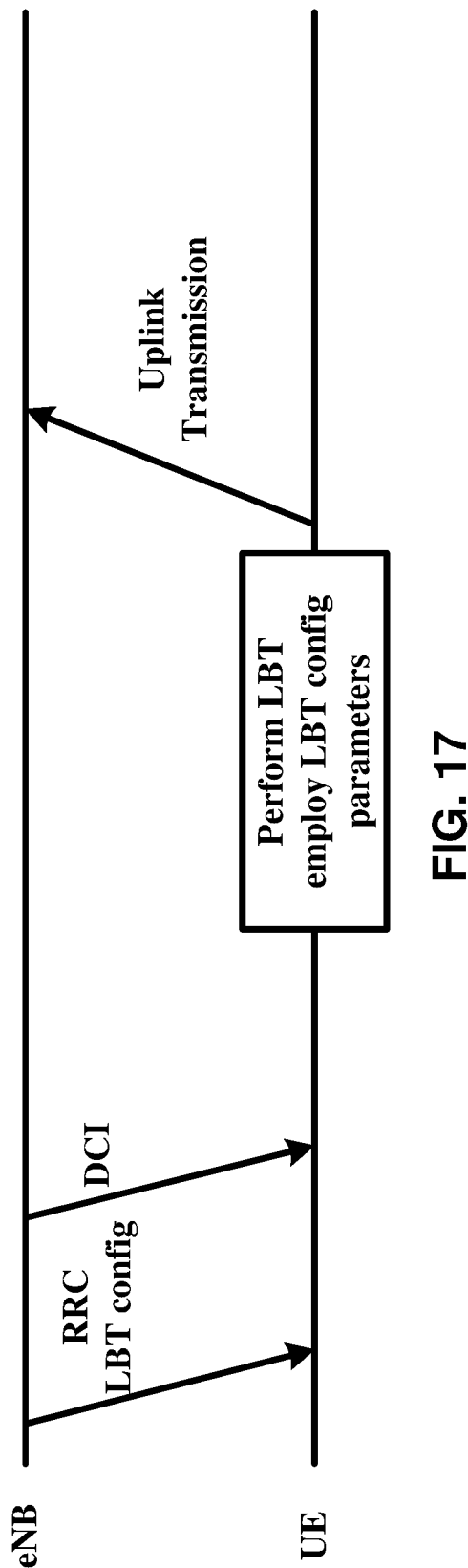
FIG. 17 illustrates an example LBT procedure as per an aspect of an embodiment of the present disclosure.

An example embodiment is shown in FIG. 17 where a UE receives one or more RRC messages comprising one or more LBT configuration parameters for one or more LAA cell. In an example, the one or more LBT configuration parameters may comprise one or more first energy detection thresholds. For example, the first energy detection threshold may be considered as a maximum energy detection threshold. The UE may employ an LBT threshold lower (or equal) than the maximum energy detection threshold to perform an LBT procedure. In an example, the one or more LBT configuration parameters may comprise one or more energy detection threshold offset values. In an example, the energy detection threshold offset value may indicate an offset to a default maximum energy detection threshold value.

The UE may receive one or more DCI comprising uplink grant parameters for one or more uplink transmission on an LAA cell. The one or more DCI may be transmitted using PDCCH and/or ePDCCH. In an example, a DCI may be received in a first subframe and the uplink grant may be for k subframes after the first subframe. The UE may attempt to transmit one or more uplink signals employing the parameters in the one or more DCI. The UE may generate one or more transport blocks employing the parameters in the one or more DCI. The one or more uplink signals may comprise one or more PUSCCH and/or one or more PUCCH and/or one or more SRS and or one or more random access preambles. The UE may determine an energy detection threshold employing the one or more LBT configuration parameters. In an example, the UE may determine the energy detection threshold to be lower than or equal to the first energy detection threshold. The UE may perform an LBT procedure employing the energy detection threshold. The UE may perform the one or more uplink transmission if the LBT procedure indicates a clear channel. In an example, a transmission may start at one of a plurality of pre-configured starting positions. In an example, the base station may indicate the one of a plurality of starting positions for the transmitting the one or more TBs. In an example, the LBT procedure may comprise sensing the LAA cell and comparing a detected power with the energy detection threshold.

In an example, the one or more RRC messages may comprise one or more LBT configuration parameters for each of a plurality of LAA cells. The UE may receive uplink grants for uplink transmissions on the plurality of LAA cells. The uplink transmissions may be configured to have the same starting position. The UE may determine an energy detection threshold for each of the plurality of LAA cells based, at least in part, on the corresponding one or more LBT parameters. The UE may select a first LAA cell uniformly randomly from the plurality of LAA cells and perform a first LBT procedure for the first LAA cell employing a long monitoring period. The UE may perform a second LBT procedure for a second LAA cell in the plurality of LAA cells employing a short monitoring period. If the first LBT procedure indicates a clear channel, the UE may transmit to the base station, one or more first transport blocks (TBs) on the first LAA cell. The UE may transmit, to the base station, one or more second TBs on the second LAA cell when the first LBT procedure and the second LBT procedure indicate a clear channel.

According to various embodiments, a device such as, for example, a wireless device, a base station and/or the like, may comprise one or more processors and memory. The memory may store instructions that, when executed by the one or more processors, cause the device to perform a series of actions. Embodiments of example actions are illustrated in the accompanying figures and specification.

Figure 18:
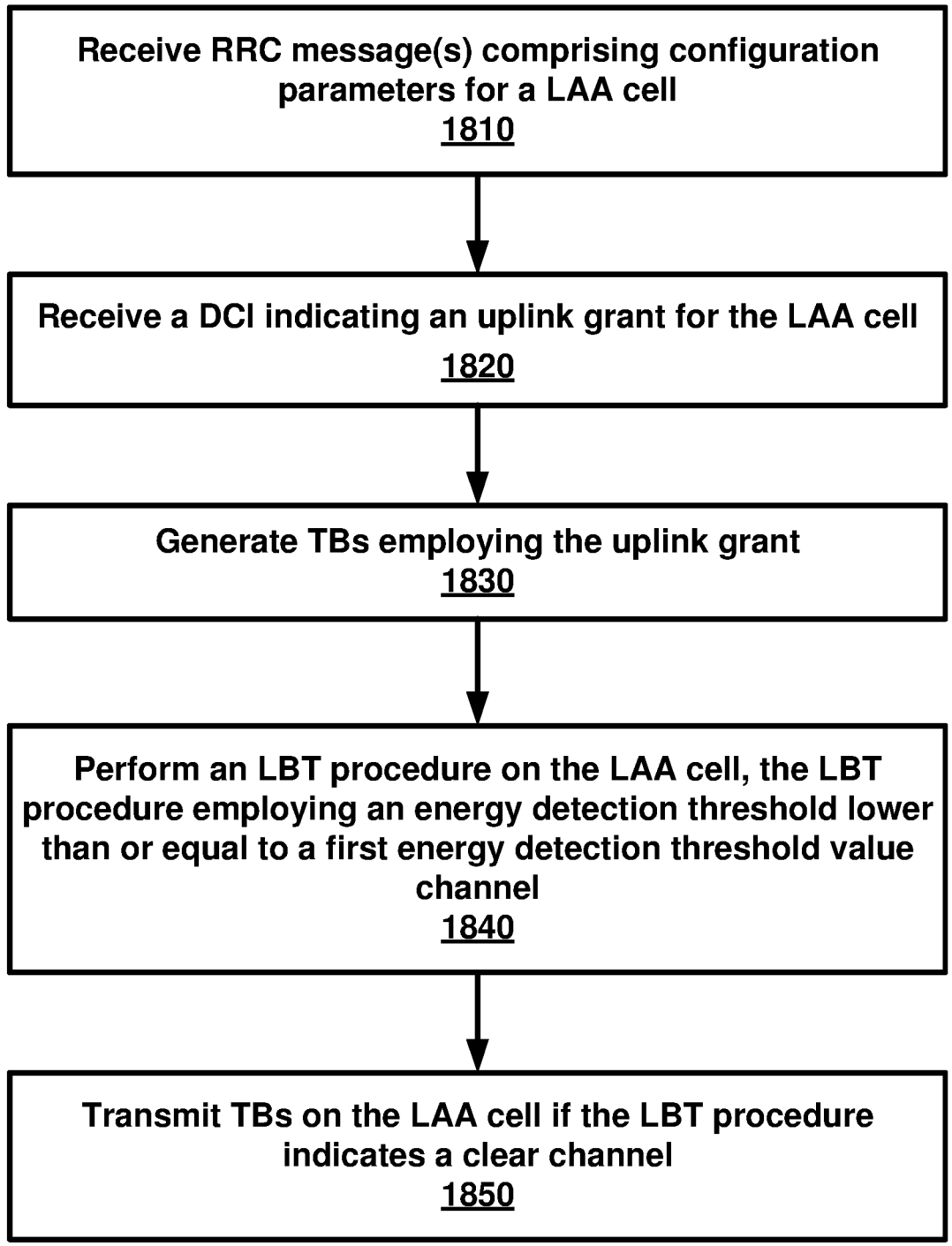
FIG. 18 is an example flow diagram as per an aspect of an embodiment of the present disclosure.

FIG. 18 is an example flow diagram as per an aspect of an embodiment of the present disclosure. At 1810, a wireless device may receive from a base station, one or more radio resource control (RRC) messages. The one or more RRC messages may comprise configuration parameters for a licensed assisted access (LAA) cell. The one or more RRC messages may comprise listen before talk (LBT) configuration parameters for the LAA cell. The LBT configuration parameters may comprise a first energy detection threshold value. At 1820, the wireless device may receive a downlink control information (DCI) indicating an uplink grant for the LAA cell. At 1830, the wireless device may generate one or more transport blocks (TB s) employing the uplink grant. At 1840, the wireless device may perform an LBT procedure on the LAA cell. The LBT procedure may employ an energy detection threshold lower than or equal to the first energy detection threshold value. At 1850, the wireless device may transmit the one or more TBs on the LAA cell if the LBT procedure indicates a clear channel.

The LAA cell may operate according to, for example, frame structure Type 3. The DCI may be received on, for example, the LAA cell. The DCI is received on, for example, a licensed cell. The DCI may be transmitted using, for example, a physical downlink control channel (PDCCH) or an enhanced physical downlink control channel (ePDCCH). The DCI may, for example, be received in a first subframe and the uplink grant may be for k subframes after the first subframe. The transmitting may start, for example, at one of a plurality of pre-configured starting positions. The base station may indicate, for example, one of a plurality of starting positions for the transmitting the one or more TBs. According to an embodiment, the LBT procedure may comprises sensing the LAA cell and comparing a detected power with the energy detection threshold.

Figure 19:
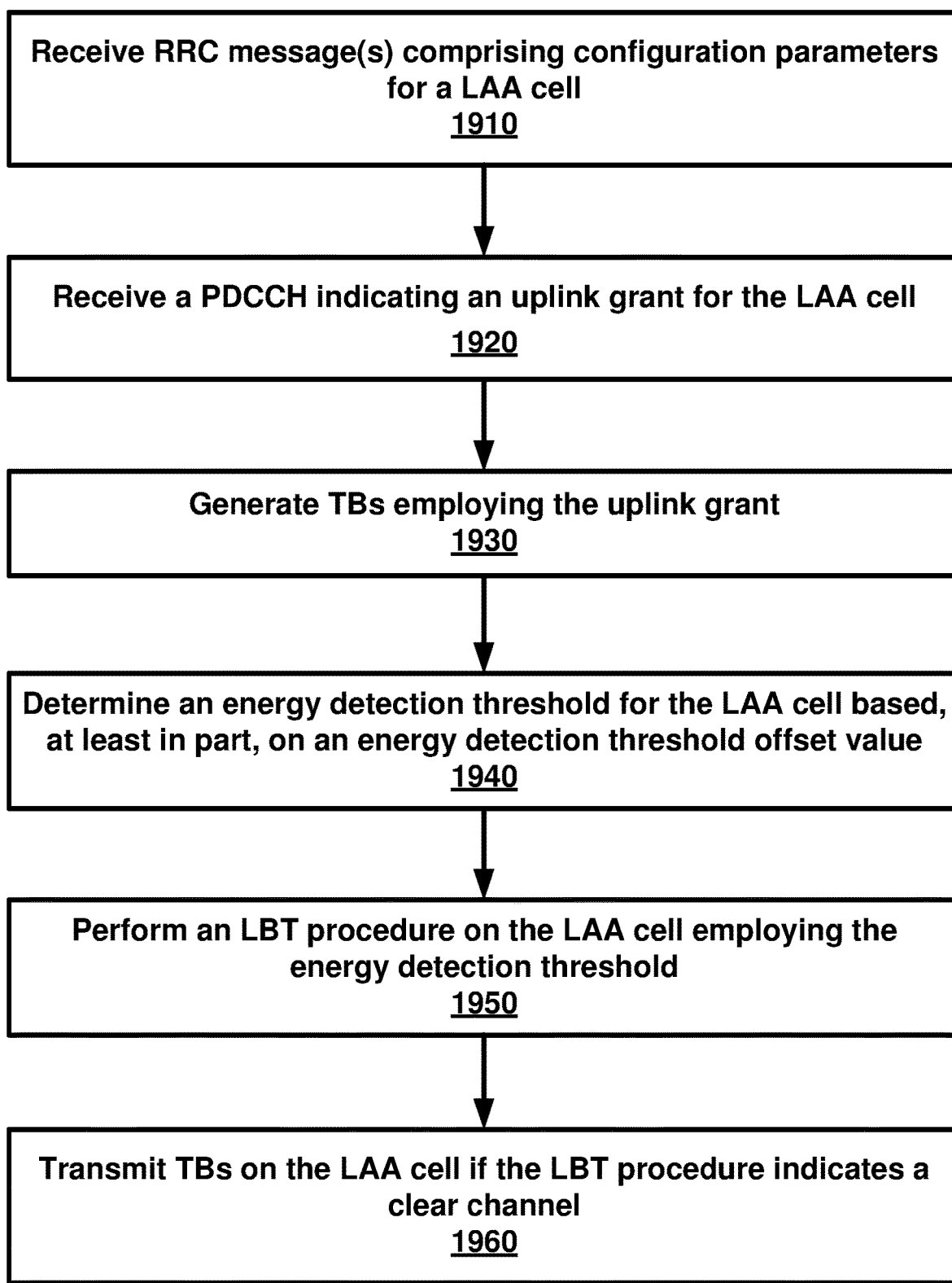
FIG. 19 is an example flow diagram as per an aspect of an embodiment of the present disclosure.

FIG. 19 is an example flow diagram as per an aspect of an embodiment of the present disclosure. At 1910, a wireless device may receive from a base station, one or more radio resource control (RRC) messages. The one or more RRC messages may comprise configuration parameters for a licensed assisted access (LAA) cell. The one or more RRC messages may comprise listen before talk (LBT) configuration parameters for the LAA cell. The LBT configuration parameters may comprise a first energy detection threshold offset value. At 1920, the wireless device may receive a physical downlink control channel (PDCCH) indicating an uplink grant for the LAA cell. One or more transport blocks (TBs) using the uplink grant may be generated at 1930. At 1940, the wireless device may determine an energy detection threshold for the LAA cell based, at least in part, on the energy detection threshold offset value. At 1950, the wireless device may perform an LBT procedure on the LAA cell employing the energy detection threshold. At 1960, the wireless device may transmit the one or more TBs on the LAA cell if the LBT procedure indicates a clear channel.

According to an embodiment, the determining the energy detection threshold may further comprise adjusting the energy detection threshold by the threshold offset value. The base station may indicate, for example, one of a plurality of starting positions for the transmitting the one or more TBs. The transmitting may at, for example, one of a plurality of pre-configured starting positions. The LBT procedure may comprise sensing the LAA cell and comparing a detected power with the energy detection threshold.

Figure 20:
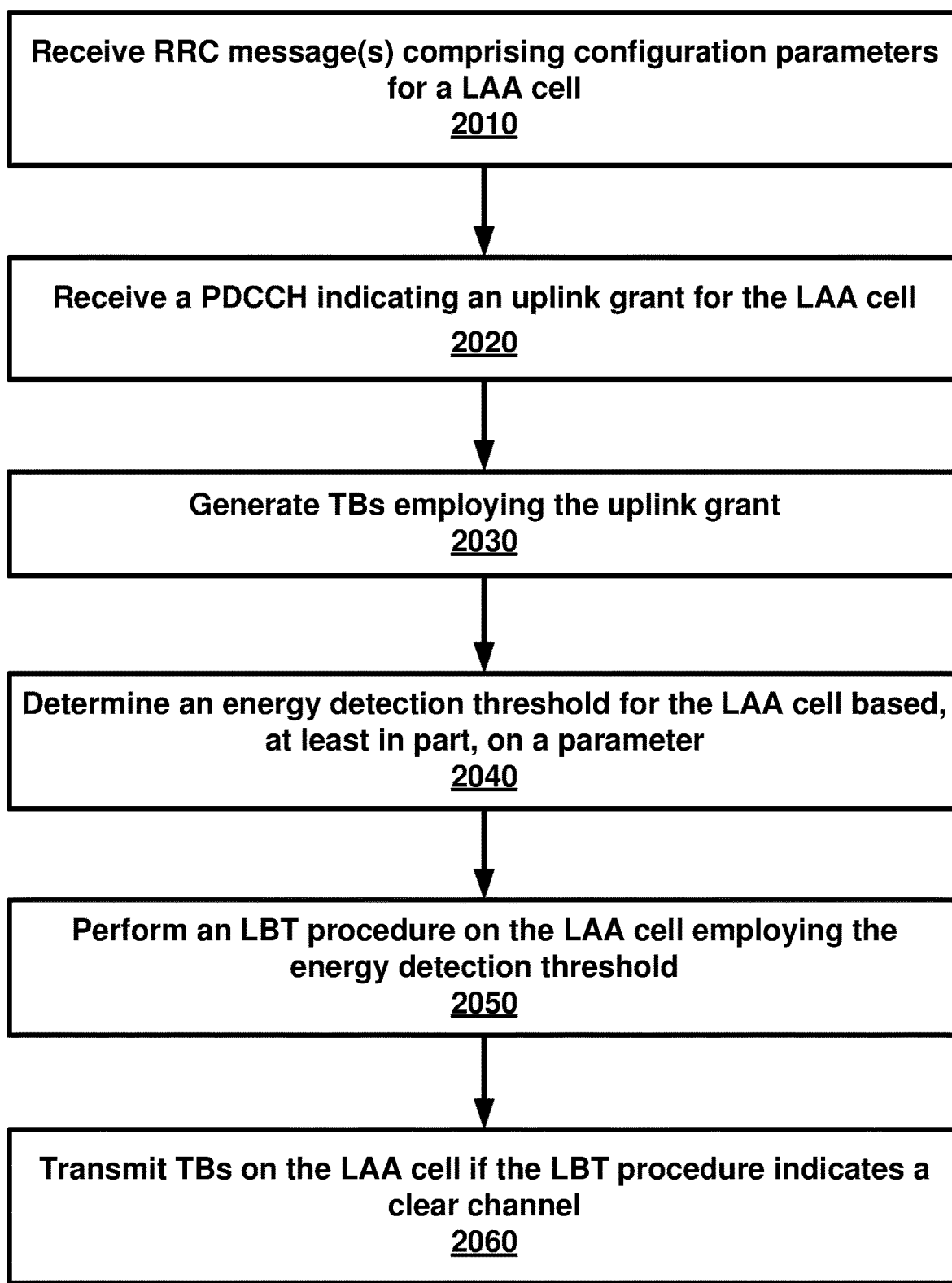
FIG. 20 is an example flow diagram as per an aspect of an embodiment of the present disclosure.

FIG. 20 is an example flow diagram as per an aspect of an embodiment of the present disclosure. At 2010, a wireless device may receive from a base station, one or more radio resource control (RRC) messages. The one or more RRC messages may comprise configuration parameters for a licensed assisted access (LAA) cell. The one or more RRC messages may comprise listen before talk (LBT) configuration parameters for the LAA cell. The LBT configuration parameters may comprise a first parameter. At 2020, the wireless device may receive a physical downlink control channel (PDCCH) indicating an uplink grant for the LAA cell. One or more transport blocks (TBs) using the uplink grant may be generated at 2030. At 2040, the wireless device may determine an energy detection threshold for the LAA cell based, at least in part, on the first parameter. At 2050, the wireless device may perform an LBT procedure on the LAA cell employing the energy detection threshold. At 2060, the wireless device may transmit the one or more TBs on the LAA cell if the LBT procedure indicates a clear channel.

Figure 21:
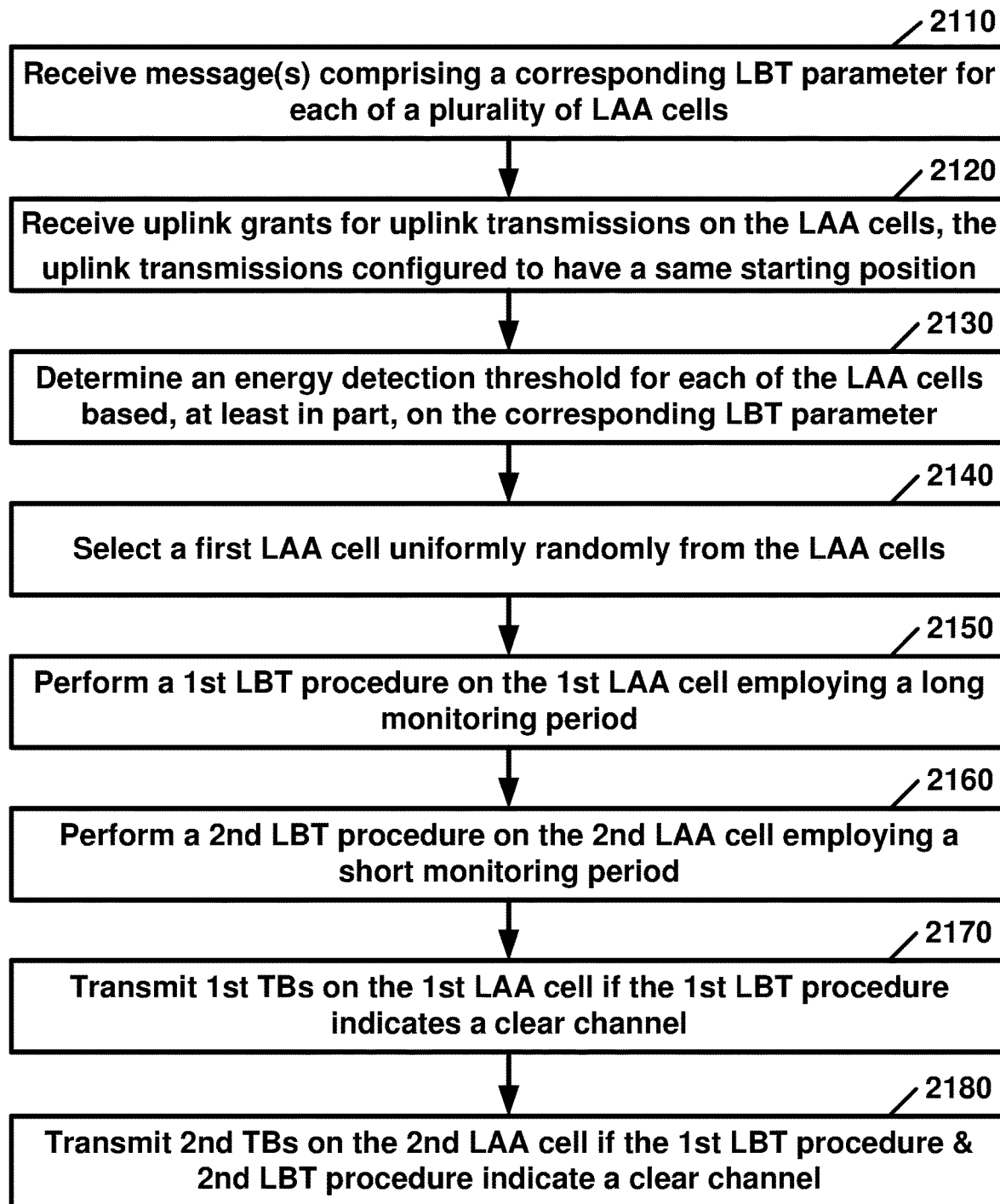
FIG. 21 is an example flow diagram as per an aspect of an embodiment of the present disclosure.

FIG. 21 is an example flow diagram as per an aspect of an embodiment of the present disclosure. At 2110, a wireless device may receive from a base station, one or more messages. The one or more messages may comprise a corresponding listen before talk (LBT) parameter for each of a plurality of licensed assisted access (LAA) cells. At 2120, the wireless device may receive uplink grants for uplink transmissions on the plurality of LAA cells. The uplink transmissions may be configured to have a same starting position. At 2130, the wireless device may determine an energy detection threshold for each of the plurality of LAA cells based, at least in part, on the corresponding LBT parameter. At 2140, the wireless device may select a first LAA cell uniformly randomly from the plurality of LAA cells. At 2150, the wireless device may perform a first LBT procedure for the first LAA cell employing a long monitoring period. At 2160, the wireless device may perform a second LBT procedure for a second LAA cell in the plurality of LAA cells employing a short monitoring period. At 2170, the wireless device may transmit to the base station, one or more first transport blocks (TB s) on the first LAA cell if the first LBT procedure indicates a clear channel. At 2180, the wireless device may transmit to the base station, one or more second TBs on the second LAA cell when the first LBT procedure and the second LBT procedure indicate a clear channel.

The plurality of LAA cells may operate according to, for example, frame structure Type 3. At least one of the uplink grants may be, for example, for one of the plurality of LAA cells. At least one of the uplink grants may be received, for example, on at least one licensed cell. Each of the uplink grants may be transmitted using, for example, a physical downlink control channel (PDCCH) or an enhanced physical downlink control channel (ePDCCH). Each of the uplink grants may be, for example: received in a first subframe; and for k subframes after the first subframe. The transmitting the one or more first TBs and the one or more second TBs may start at, for example, one of a plurality of pre-configured starting positions. The first LBT procedure may comprise, for example, sensing a corresponding LAA cell; and comparing a detected power with a corresponding energy detection threshold. The corresponding LBT parameter may indicate, for example, an energy detection threshold offset value. The corresponding LBT parameter may indicate, for example, a first energy detection threshold value.

Figure 22:
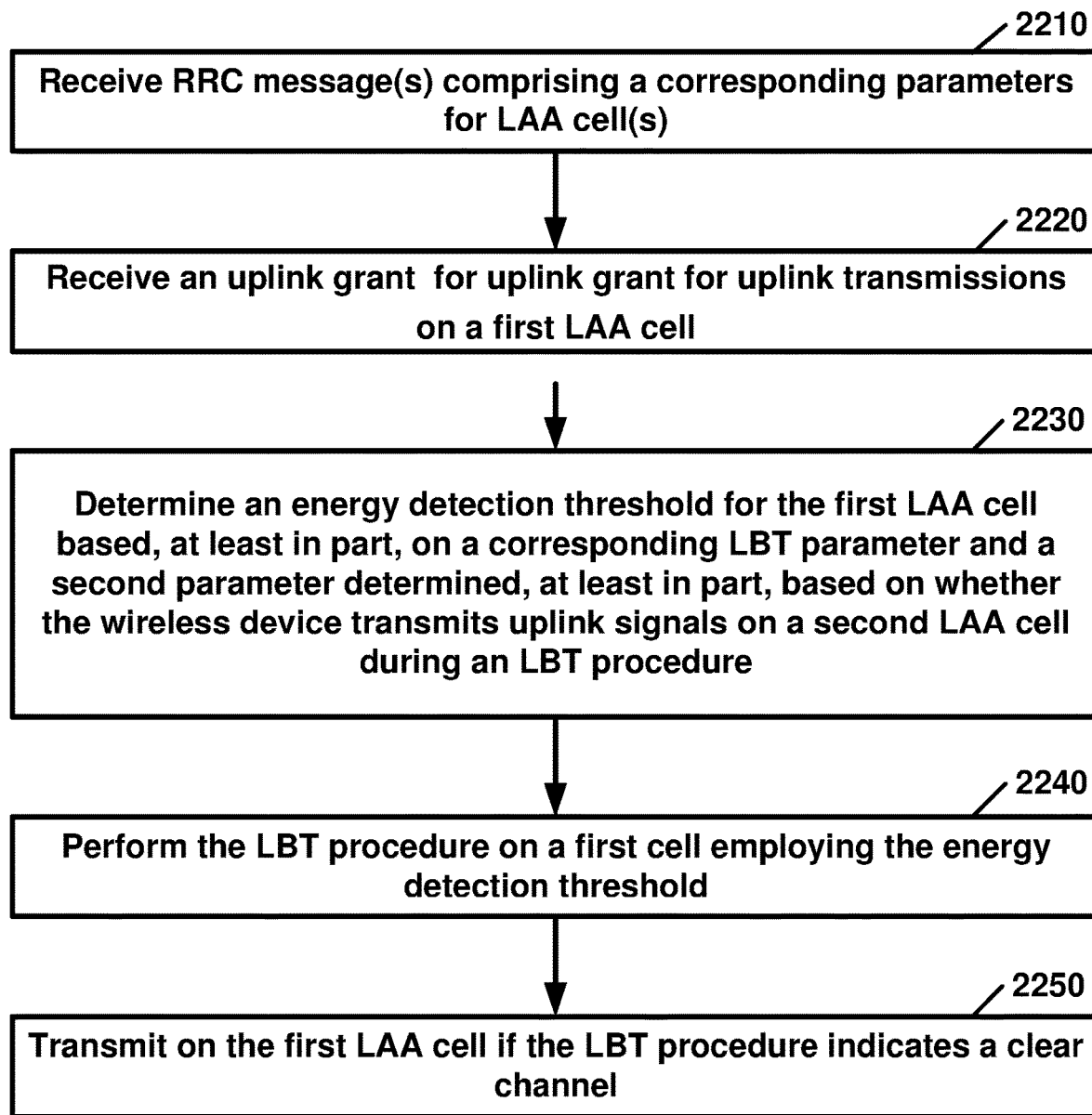
FIG. 22 is an example flow diagram as per an aspect of an embodiment of the present disclosure.

FIG. 22 is an example flow diagram as per an aspect of an embodiment of the present disclosure. At 2210, a wireless device may receive one or more radio resource control (RRC) messages comprising configuration parameters for a plurality of LAA cells. The configuration parameters may comprise a corresponding listen before talk (LBT) parameter for each of the plurality of LAA cells. At 2220, the wireless device may receive an uplink grant for uplink transmissions on a first LAA cell. At 2230, the wireless device may determiner an energy detection threshold for the first LAA cell based, at least in part, on a corresponding LBT parameter and a second parameter. The second parameter may be determined, at least in part, based on whether the wireless device transmits uplink signals on a second LAA cell during an LBT procedure. At 2240, the wireless device may perform, on a first cell, the LBT procedure employing the energy detection threshold. At 2250, the wireless device may transmit on the first LAA cell if the LBT procedure indicates a clear channel.

In this specification, "a" and "an" and similar phrases are to be interpreted as "at least one" and "one or more." In this specification, the term "may" is to be interpreted as "may, for example." In other words, the term "may" is indicative that the phrase following the term "may" is an example of one of a multitude of suitable possibilities that may, or may not, be employed to one or more of the various embodiments. If A and B are sets and every element of A is also an element of B, A is called a subset of B. In this specification, only non-empty sets and subsets are considered. For example, possible subsets of B={cell1, cell2} are: {cell1}, {cell2}, and {cell1, cell2}.

In this specification, parameters (Information elements: IEs) may comprise one or more objects, and each of those objects may comprise one or more other objects. For example, if parameter (IE) N comprises parameter (IE) M, and parameter (IE) M comprises parameter (IE) K, and parameter (IE) K comprises parameter (information element) J, then, for example, N comprises K, and N comprises J. In an example embodiment, when one or more messages comprise a plurality of parameters, it implies that a parameter in the plurality of parameters is in at least one of the one or more messages, but does not have to be in each of the one or more messages.

Many of the elements described in the disclosed embodiments may be implemented as modules. A module is defined here as an isolatable element that performs a defined function and has a defined interface to other elements. The modules described in this disclosure may be implemented in hardware, software in combination with hardware, firmware, wetware (i.e. hardware with a biological element) or a combination thereof, all of which are behaviorally equivalent. For example, modules may be implemented as a software routine written in a computer language configured to be executed by a hardware machine (such as C, C++, Fortran, Java, Basic, Matlab or the like) or a modeling/simulation program such as Simulink, Stateflow, GNU Octave, or LabVIEWMathScript. Additionally, it may be possible to implement modules using physical hardware that incorporates discrete or programmable analog, digital and/or quantum hardware. Examples of programmable hardware comprise: computers, microcontrollers, microprocessors, application-specific integrated circuits (ASICs); field programmable gate arrays (FPGAs); and complex programmable logic devices (CPLDs). Computers, microcontrollers and microprocessors are programmed using languages such as assembly, C, C++ or the like. FPGAs, ASICs and CPLDs are often programmed using hardware description languages (HDL) such as VHSIC hardware description language (VHDL) or Verilog that configure connections between internal hardware modules with lesser functionality on a programmable device. Finally, it needs to be emphasized that the above mentioned technologies are often used in combination to achieve the result of a functional module.

The disclosure of this patent document incorporates material which is subject to copyright protection. The copyright owner has no objection to the facsimile reproduction by anyone of the patent document or the patent disclosure, as it appears in the Patent and Trademark Office patent file or records, for the limited purposes required by law, but otherwise reserves all copyright rights whatsoever.

While various embodiments have been described above, it should be understood that they have been presented by way of example, and not limitation. It will be apparent to persons skilled in the relevant art(s) that various changes in form and detail can be made therein without departing from the spirit and scope. In fact, after reading the above description, it will be apparent to one skilled in the relevant art(s) how to implement alternative embodiments. Thus, the present embodiments should not be limited by any of the above described exemplary embodiments. In particular, it should be noted that, for example purposes, the above explanation has focused on the example(s) using FDD communication systems. However, one skilled in the art will recognize that embodiments of the disclosure may also be implemented in a system comprising one or more TDD cells (e.g. frame structure 2 and/or frame structure 3-licensed assisted access). The disclosed methods and systems may be implemented in wireless or wireline systems. The features of various embodiments presented in this disclosure may be combined. One or many features (method or system) of one embodiment may be implemented in other embodiments. Only a limited number of example combinations are shown to indicate to one skilled in the art the possibility of features that may be combined in various embodiments to create enhanced transmission and reception systems and methods.

In addition, it should be understood that any figures which highlight the functionality and advantages, are presented for example purposes only. The disclosed architecture is sufficiently flexible and configurable, such that it may be utilized in ways other than that shown. For example, the actions listed in any flowchart may be re-ordered or only optionally used in some embodiments.

Further, the purpose of the Abstract of the Disclosure is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The Abstract of the Disclosure is not intended to be limiting as to the scope in any way.

Finally, it is the applicant's intent that only claims that include the express language "means for" or "step for" be interpreted under 35 U.S.C. 112. Claims that do not expressly include the phrase "means for" or "step for" are not to be interpreted under 35 U.S.C. 112.

What is claimed is:

1. A method comprising:
receiving, by a wireless device, a plurality of uplink grants for a plurality of uplink transmissions via a plurality of cells, wherein each uplink transmission of the plurality of uplink transmissions has a same starting position;
performing, for a first cell of the plurality of cells, a first type of listen-before-talk (LBT) procedure associated with a first duration;
performing, for a second cell of the plurality of cells, a second type of LBT procedure associated with a second duration shorter than the first duration, wherein the second cell is different from the first cell; and
based on the first type of LBT procedure indicating a clear channel for the first cell and the second type of LBT procedure indicating a clear channel for the second cell, transmitting a transport block via the second cell.

2. The method of claim 1, wherein the plurality of cells operate according to frame structure Type 3.

3. The method of claim 1, wherein at least one uplink grant of the plurality of uplink grants is associated with a cell of the plurality of cells.

4. The method of claim 1, wherein the receiving the plurality of uplink grants comprises receiving, via a licensed cell, an uplink grant of the plurality of uplink grants.

5. The method of claim 1, wherein the receiving the plurality of uplink grants comprises receiving, via a physical downlink control channel (PDCCH) or via an enhanced physical downlink control channel (ePDCCH), an uplink grant of the plurality of uplink grants.

6. The method of claim 1, wherein:
the receiving the plurality of the uplink grants comprises receiving, in a first subframe, an uplink grant of the plurality of the uplink grants; and
the uplink grant is for k subframes after the first subframe.

7. The method of claim 1, wherein transmission of the transport block starts at a pre-configured starting position of a plurality of pre-configured starting positions.

8. The method of claim 1, wherein the performing the first type of LBT procedure comprises:
sensing a cell; and
comparing a detected power with an energy detection threshold.

9. The method of claim 1, further comprising receiving an indication of at least one of:
an energy detection threshold offset value; or
an energy detection threshold value.

10. The method of claim 1, further comprising selecting the first cell uniformly randomly from the plurality of cells.

11. The method of claim 1, further comprising determining an energy detection threshold for one or more cells of the plurality of cells.

12. The method of claim 11, wherein the determining the energy detection threshold for the one or more cells of the plurality of cells comprises determining an individual energy detection threshold for an individual cell of the plurality of cells.

13. The method of claim 1, wherein the transmitting the transport block via the second cell is after transmitting a second transport block via the first cell.

14. The method of claim 1, wherein the plurality of cells comprises at least one of:
an unlicensed cell; or
a license assisted access (LAA) cell.

15. The method of claim 1, further comprising, based on the first type of LBT procedure indicating a clear channel for the first cell of the plurality of cells, transmitting a second transport block via the first cell.

16. The method of claim 1, wherein:
the performing the first type of LBT procedure is based on a first uplink grant of the plurality of uplink grants; and
the performing the second type of LBT procedure is based on a second uplink grant of the plurality of uplink grants.

17. The method of claim 1, further comprising:
starting, based on the plurality of uplink grants, a plurality of types of LBT procedures comprising the first type of LBT procedure and the second type of LBT procedure; and
terminating, before terminating the first type of LBT procedure, the second type of LBT procedure.

18. A wireless device comprising:
one or more processors; and
memory storing instructions that, when executed by the one or more processors, cause the wireless device to:
receive a plurality of uplink grants for a plurality of uplink transmissions via a plurality of cells, wherein each uplink transmission of the plurality of uplink transmissions has a same starting position;

perform, for a first cell of the plurality of cells, a first type of listen-before-talk (LBT) procedure associated with a first duration;

perform, for a second cell of the plurality of cells, a second type of LBT procedure associated with a second duration shorter than the first duration, wherein the second cell is different from the first cell; and based on the first type of LBT procedure indicating a clear channel for the first cell and the second type of LBT procedure indicating a clear channel for the second cell, transmit a transport block via the second cell.

19. The wireless device of claim 18, wherein the plurality of cells operate according to frame structure Type 3.

20. The wireless device of claim 18, wherein at least one uplink grant of the plurality of uplink grants is associated with one of the plurality of cells.

21. The wireless device of claim 18, wherein an uplink grant of the plurality of uplink grants is received via a licensed cell.

22. The wireless device of claim 18, wherein the instructions, when executed by the one or more processors, cause the wireless device to receive the plurality of uplink grants by receiving an uplink grant of the plurality of uplink grants via a physical downlink control channel (PDCCH) or via an enhanced physical downlink control channel (ePDCCH).

23. The wireless device of claim 18, wherein the instructions, when executed by the one or more processors, cause the wireless device to receive the plurality of uplink grants by receiving, in a first subframe, an uplink grant of the plurality of uplink grants, wherein the uplink grant is for k subframes after the first subframe.

24. The wireless device of claim 18, wherein the instructions, when executed by the one or more processors, further cause the wireless device to transmit the transport block starting at a pre-configured starting position of a plurality of pre-configured starting positions.

25. The wireless device of claim 18, wherein the instructions, when executed by the one or more processors, cause the wireless device to perform the first type of LBT procedure at least by:
sensing a cell; and
comparing a detected power with an energy detection threshold.

26. The wireless device of claim 18, wherein the instructions, when executed by the one or more processors, further cause the wireless device to receive an indication of at least one of:
an energy detection threshold offset value; or
an energy detection threshold value.

27. The wireless device of claim 18, wherein the instructions, when executed by the one or more processors, further cause the wireless device to select the first cell uniformly randomly from the plurality of cells.

28. The wireless device of claim 18, wherein the instructions, when executed by the one or more processors, further cause the wireless device to determine an energy detection threshold for one or more cells of the plurality of cells.

29. The wireless device of claim 28, wherein the instructions, when executed by the one or more processors, cause the wireless device to determine the energy detection threshold for the one or more cells of the plurality of cells at least by determining an individual energy detection threshold for an individual cell of the plurality of cells.

30. The wireless device of claim 18, wherein the instructions, when executed by the one or more processors, cause the wireless device to transmit the transport block via the second cell after the wireless device transmits a second transport block via the first cell.

31. The wireless device of claim 18, wherein the plurality of cells comprises at least one of:
an unlicensed cell; or
a license assisted access (LAA) cell.

32. The wireless device of claim 18, wherein the instructions, when executed by the one or more processors, further cause the wireless device to, based on the first type of LBT procedure indicating a clear channel for the first cell of the plurality of cells, transmit a second transport block via the first cell.

33. The wireless device of claim 18, wherein the instructions, when executed by the one or more processors, cause the wireless device to:
perform, based on a first uplink grant of the plurality of uplink grants, the first type of LBT procedure; and
perform, based on a second uplink grant of the plurality of uplink grants, the second type of LBT procedure.

34. The wireless device of claim 18, wherein the instructions, when executed by the one or more processors, cause the wireless device to:
start, based on the plurality of uplink grants, a plurality of types of LBT procedures comprising the first type of LBT procedure and the second type of LBT procedure; and
terminate, before terminating the first type of LBT procedure, the second type of LBT procedure.

35. A non-transitory computer-readable medium storing instructions that, when executed, cause:
receiving a plurality of uplink grants for a plurality of uplink transmissions via a plurality of cells, wherein each uplink transmission of the plurality of uplink transmissions has a same starting position;
performing, for a first cell of the plurality of cells, a first type of listen-before-talk (LBT) procedure associated with a first duration;
performing, for a second cell of the plurality of cells, a second type of LBT procedure associated with a second duration shorter than the first duration, wherein the second cell is different from the first cell; and
based on the first type of LBT procedure indicating a clear channel for the first cell and the second type of LBT procedure indicating a clear channel for the second cell, transmitting a transport block via the second cell.

36. The non-transitory computer-readable medium of claim 35, wherein the plurality of cells operate according to frame structure Type 3.

37. The non-transitory computer-readable medium of claim 35, wherein the instructions, when executed, further cause transmitting the transport block starting at a pre-configured starting position of a plurality of pre-configured starting positions.

38. The non-transitory computer-readable medium of claim 35, wherein the instructions, when executed, further cause receiving an indication of at least one of:
an energy detection threshold offset value; or
an energy detection threshold value.

39. The non-transitory computer-readable medium of claim 35, wherein the instructions, when executed, cause the transmitting the transport block via the second cell after transmitting a second transport block via the first cell.

40. The non-transitory computer-readable medium of claim 35, wherein:
the performing the first type of LBT procedure is based on a first uplink grant of the plurality of uplink grants; and the performing the second type of LBT procedure is based on a second uplink grant of the plurality of uplink grants.

41. The non-transitory computer-readable medium of claim 35, wherein the instructions, when executed, further cause:
starting, based on the plurality of uplink grants, a plurality of types of LBT procedures comprising the first type of LBT procedure and the second type of LBT procedure; and
terminating, before terminating the first type of LBT procedure, the second type of LBT procedure.

42. A system comprising:
a base station configured to transmit a plurality of uplink grants for a plurality of uplink transmissions via a plurality of cells, wherein each uplink transmission of the plurality of uplink transmissions has a same starting position; and
a wireless device configured to:
perform, for a first cell of the plurality of cells, a first type of listen-before-talk (LBT) procedure associated with a first duration;
perform, for a second cell of the plurality of cells, a second type of LBT procedure associated with a second duration shorter than the first duration, wherein the second cell is different from the first cell; and
based on the first type of LBT procedure indicating a clear channel for the first cell and the second type of LBT procedure indicating a clear channel for the second cell, transmit a transport block via the second cell.

43. The system of claim 42, wherein the plurality of cells operate according to frame structure Type 3.

44. The system of claim 42, wherein at least one uplink grant of the plurality of uplink grants is associated with one of the plurality of cells.

45. The system of claim 42, wherein an uplink grant of the plurality of uplink grants is received via a licensed cell.

46. The system of claim 42, wherein the base station is configured to transmit the plurality of uplink grants by transmitting an uplink grant of the plurality of uplink grants via a physical downlink control channel (PDCCH) or via an enhanced physical downlink control channel (ePDCCH).

47. The system of claim 42, wherein the base station is configured to transmit the plurality of uplink grants by transmitting, in a first subframe, an uplink grant of the plurality of uplink grants, wherein the uplink grant is for k subframes after the first subframe.

48. The system of claim 42, wherein the wireless device is configured to transmit the transport block starting at a pre-configured starting position of a plurality of pre-configured starting positions.

49. The system of claim 42, wherein the wireless device is configured to perform the first type of LBT procedure at least by:
sensing a cell; and
comparing a detected power with an energy detection threshold.

50. The system of claim 42, wherein the wireless device is configured to receive an indication of at least one of:
an energy detection threshold offset value; or
an energy detection threshold value.

51. The system of claim 42, wherein the wireless device is configured to select the first cell uniformly randomly from the plurality of cells.

52. The system of claim 42, wherein the wireless device is configured to determine an energy detection threshold for one or more cells of the plurality of cells.

53. The system of claim 52, wherein the wireless device is configured to determine the energy detection threshold for the one or more cells of the plurality of cells at least by determining an individual energy detection threshold for an individual cell of the plurality of cells.

54. The system of claim 42, wherein the wireless device is configured to transmit the transport block via the second cell after the wireless device transmits a second transport block via the first cell.

55. The system of claim 42, wherein the plurality of cells comprises at least one of:
an unlicensed cell; or
a license assisted access (LAA) cell.

56. The system of claim 42, wherein the wireless device is configured to:
based on the first type of LBT procedure indicating a clear channel for the first cell of the plurality of cells, transmit a second transport block via the first cell.

57. The system of claim 42, wherein the wireless device is configured to:
perform, based on a first uplink grant of the plurality of uplink grants, the first type of LBT procedure; and
perform, based on a second uplink grant of the plurality of uplink grants, the second type of LBT procedure.

58. The system of claim 42, wherein the wireless device is configured to:
start, based on the plurality of uplink grants, a plurality of types of LBT procedures comprising the first type of LBT procedure and the second type of LBT procedure; and
terminate, before terminating the first type of LBT procedure, the second type of LBT procedure.

* * * * *

UNITED STATES PATENT AND TRADEMARK OFFICE
CERTIFICATE OF CORRECTION

PATENT NO. : 11,330,627 B2
APPLICATION NO. : 16/922783
DATED : May 10, 2022
INVENTOR(S) : Babaei et al.

Page 1 of 2

It is certified that error appears in the above-identified patent and that said Letters Patent is hereby corrected as shown below:

On the Title Page

Page 3, Column 1, Other Publications, Line 20:
Delete "Tille:" and insert --Title:-- therefor Page 3, Column 2, Other Publications, Line 8:
Delete "Aclivation" and insert --Activation-- therefor Page 4, Column 1, Other Publications, Line 30:
Delete "Netowrk" and insert --Network-- therefor Page 5, Column 1, Other Publications, Line 5:
Delete "Consideations" and insert --Considerations-- therefor In the Drawings Sheet 7 of 22, Fig. 7:
Delete "DL-SCH of SCH" and insert --DL-SCH of SCG-- therefor Sheet 7 of 22, Fig. 7:
Delete "UL-SCH of SCH" and insert --UL-SCH of SCG-- therefor In the Specification Column 10, Detailed Description of Embodiments, Line 57:
After "running", insert --.-- therefor Column 22, Detailed Description of Embodiments, Line 4:
Delete "(TB s)" and insert --(TBs)-- therefor Signed and Sealed this
Twenty-ninth Day of August, 2023

Katherine Kelly Vidal
*Director of the United States Patent and Trademark Office*

Column 23, Detailed Description of Embodiments, Line 27:
Delete "(TB s)" and insert --(TBs)-- therefor